(12) United States Patent
Schmieta et al.

(10) Patent No.: US 7,282,642 B2
(45) Date of Patent: Oct. 16, 2007

(54) SHAPED WALL PLATE FOR WIRING DEVICE

(75) Inventors: Gerd Schmieta, Boston, MA (US); Michael Meyer, Boston, MA (US); Dennis A. Oddsen, Eatons Neck, NY (US); Anthony Tufano, North Massapequa, NY (US); Leslie Lindenstraus, New York, NY (US); James J. Sherman, Jericho, NY (US); Tim Langfit, Nappa, CA (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 0 days.

(21) Appl. No.: 10/852,812

(22) Filed: May 25, 2004

(65) Prior Publication Data

US 2005/0122666 A1    Jun. 9, 2005

Related U.S. Application Data

(63) Continuation-in-part of application No. 10/236,406, filed on Sep. 6, 2002, now abandoned, which is a continuation-in-part of application No. 10/163,488, filed on Jun. 6, 2002, now abandoned.

(51) Int. Cl.
*H02G 3/14* (2006.01)
(52) U.S. Cl. ............................ 174/66; 174/67; 220/241
(58) Field of Classification Search ................ 174/66, 174/67, 48, 57, 53; 220/3.7, 3.92, 241, 242; 33/528; D13/177; D8/353
See application file for complete search history.

(56) References Cited

U.S. PATENT DOCUMENTS

| | | |
|---|---|---|
| 3,609,268 A | 9/1971 | Sanchez |
| 3,713,071 A | 1/1973 | Pollak |
| 3,890,026 A | 6/1975 | Gartland, Jr. |
| 4,300,026 A | 11/1981 | Bull |
| 4,733,330 A | 3/1988 | Tanaka et al. |
| 4,835,343 A | 5/1989 | Graef et al. |
| 4,865,556 A | 9/1989 | Campbell et al. |
| 4,870,230 A | 9/1989 | Osika et al. |
| 4,899,018 A | 2/1990 | Sireci |
| 5,036,168 A | 7/1991 | Kikuchi et al. |
| 5,041,706 A | 8/1991 | Osika et al. |
| 5,073,681 A | 12/1991 | Hubben et al. |
| 5,107,072 A | 4/1992 | Morgan |
| 5,135,816 A | 8/1992 | Audett |

(Continued)

*Primary Examiner*—Dhiru R. Patel
(74) *Attorney, Agent, or Firm*—Paul J. Sutton

(57) ABSTRACT

There is disclosed a wall plate for a wiring device. The wall plate has a single opening for receiving one or a gang of two or more wiring devices within the single opening. The wall plate has along its vertical axis, a surface of positive first differential and zero second differential, comprised of a combination of splines drawn between points of varying distance from a datum plane. The surface has zero second differential when the rate of height increase of individual splines is constant. The wall plate, when composed of non-conducting material, has a conductive coating on its front surface, on its back surface or on both its front and back surfaces. When the wiring device is a switch, the surface of the switch face follows that of the wall plate. When the wiring device is a receptacle, the surface along the receptacle face is flat in one plane to allow for the proper seating of an inserted plug.

8 Claims, 38 Drawing Sheets

U.S. PATENT DOCUMENTS

| | | |
|---|---|---|
| 5,136,132 A | 8/1992 | Kitchen |
| 5,180,886 A | 1/1993 | Dierenbach et al. |
| 5,189,259 A * | 2/1993 | Carson et al. .................. 174/66 |
| 5,191,971 A | 3/1993 | Hakkarainen et al. |
| 5,382,768 A | 1/1995 | Kurek et al. |
| 5,500,498 A | 3/1996 | Kurek et al. |
| 5,669,488 A | 9/1997 | Burger |
| D387,267 S | 12/1997 | Brown |
| 5,720,379 A | 2/1998 | Schwartz et al. |
| D392,873 S | 3/1998 | Scherer et al. |
| 5,723,817 A | 3/1998 | Arenas et al. |
| 5,743,387 A | 4/1998 | Hung |
| 5,744,750 A | 4/1998 | Almond |
| 5,783,787 A | 7/1998 | Data |
| 5,826,710 A | 10/1998 | Kurek et al. |
| 5,831,213 A | 11/1998 | Wright et al. |
| 5,835,980 A * | 11/1998 | Houssian ..................... 174/67 |
| D406,047 S | 2/1999 | Scherer et al. |
| 5,895,888 A * | 4/1999 | Arenas et al. ................. 174/66 |
| 5,941,372 A | 8/1999 | Johnston |
| 5,955,701 A | 9/1999 | Schockner et al. |
| 5,981,871 A * | 11/1999 | Trumble et al. ....... 174/35 GC |
| 6,023,021 A | 2/2000 | Matthews et al. |
| 6,031,196 A | 2/2000 | Johnston |
| 6,051,787 A * | 4/2000 | Rintz .......................... 174/66 |
| 6,066,805 A | 5/2000 | Bordwell et al. |
| 6,095,279 A | 8/2000 | Adamson |
| 6,118,234 A | 9/2000 | Marcellus et al. |
| 6,184,466 B1 | 2/2001 | Eder et al. |
| 6,281,438 B1 | 8/2001 | Desilets et al. |
| 6,384,354 B1 | 5/2002 | Shotey et al. |
| D461,113 S | 8/2002 | Capella |
| D476,628 S | 7/2003 | Millar |
| 6,593,530 B2 | 7/2003 | Hunt |
| 6,875,940 B2 | 4/2005 | Endres et al. |
| 6,923,663 B2 | 8/2005 | Oddsen et al. |
| 6,979,790 B2 | 12/2005 | Endres et al. |
| 6,979,791 B2 | 12/2005 | Endres et al. |
| 7,019,241 B2 | 3/2006 | Grassl et al. |
| 7,026,564 B1 | 4/2006 | Savicki et al. |
| 7,030,318 B2 | 4/2006 | Tufano et al. |
| 7,034,236 B2 | 4/2006 | Endres et al. |
| 7,049,538 B2 | 5/2006 | Camillo |
| 7,170,021 B2 | 1/2007 | Sorenson |
| 7,202,431 B2 | 4/2007 | Gauzin |
| 2001/0019013 A1 | 9/2001 | Weber |
| 2006/0152888 A1 | 7/2006 | Kurek et al. |

\* cited by examiner

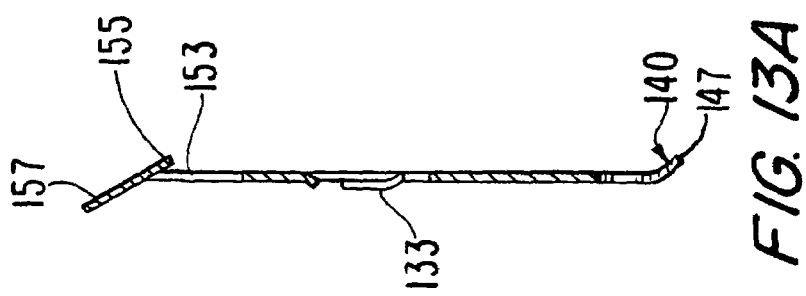
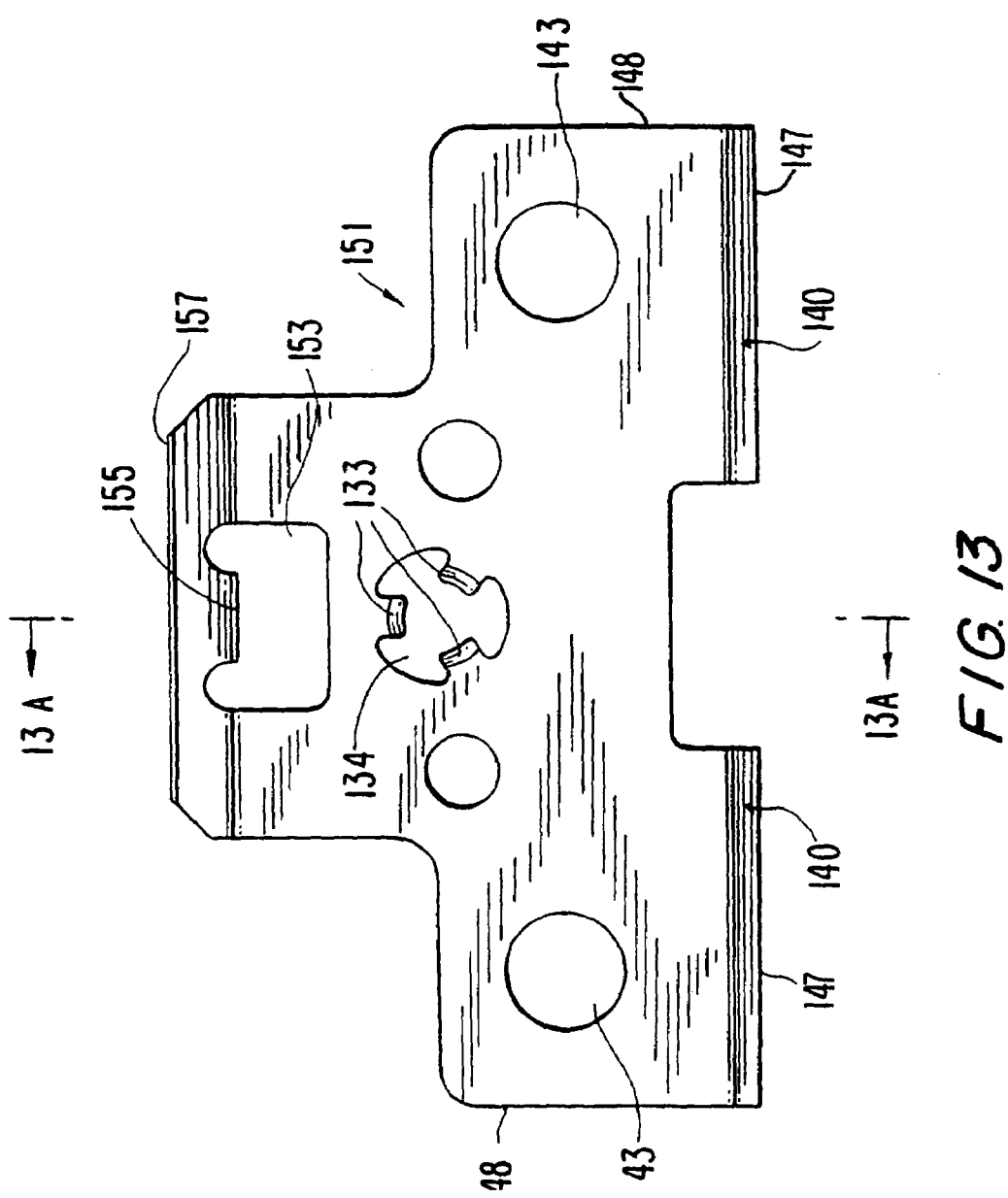

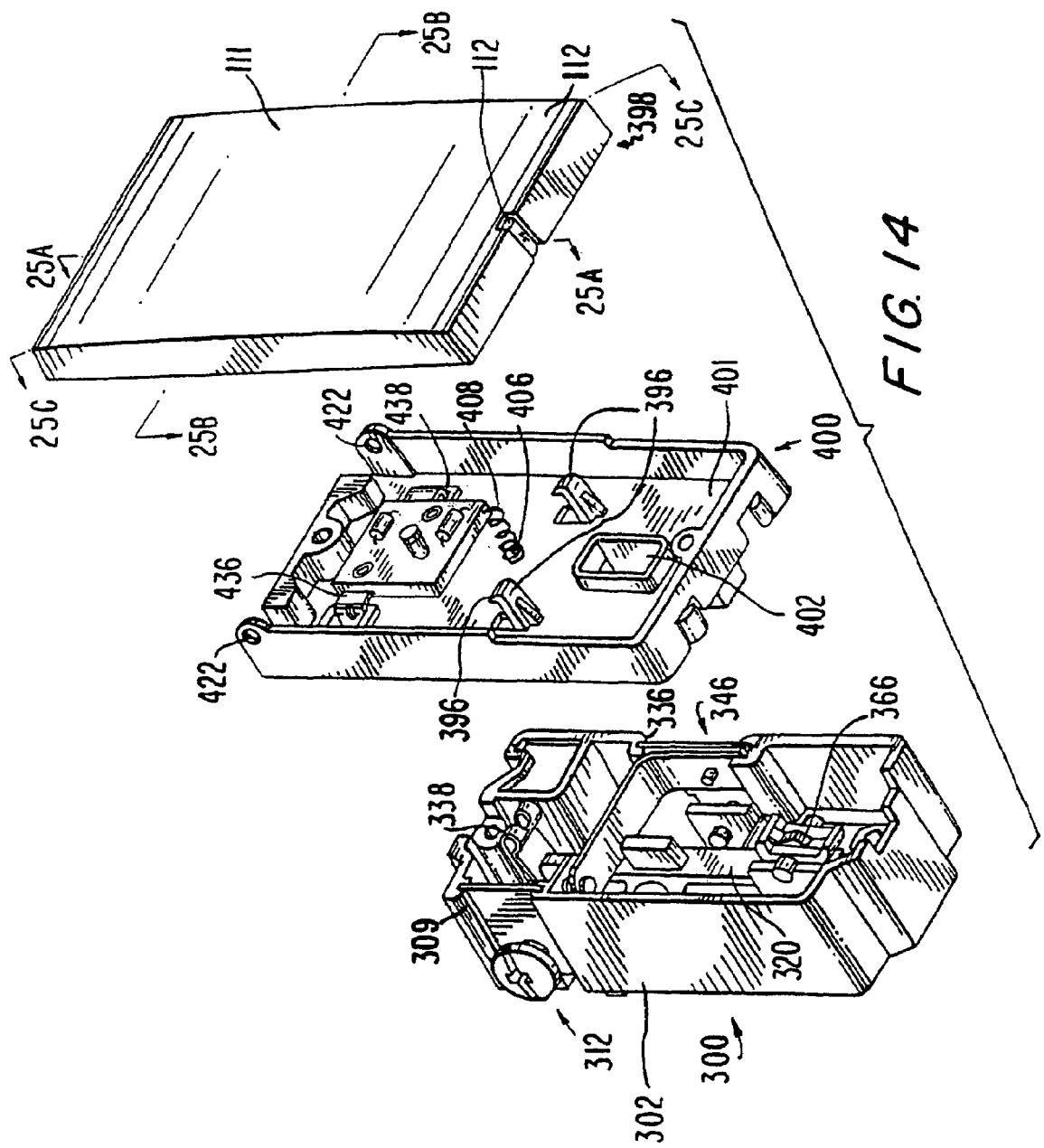

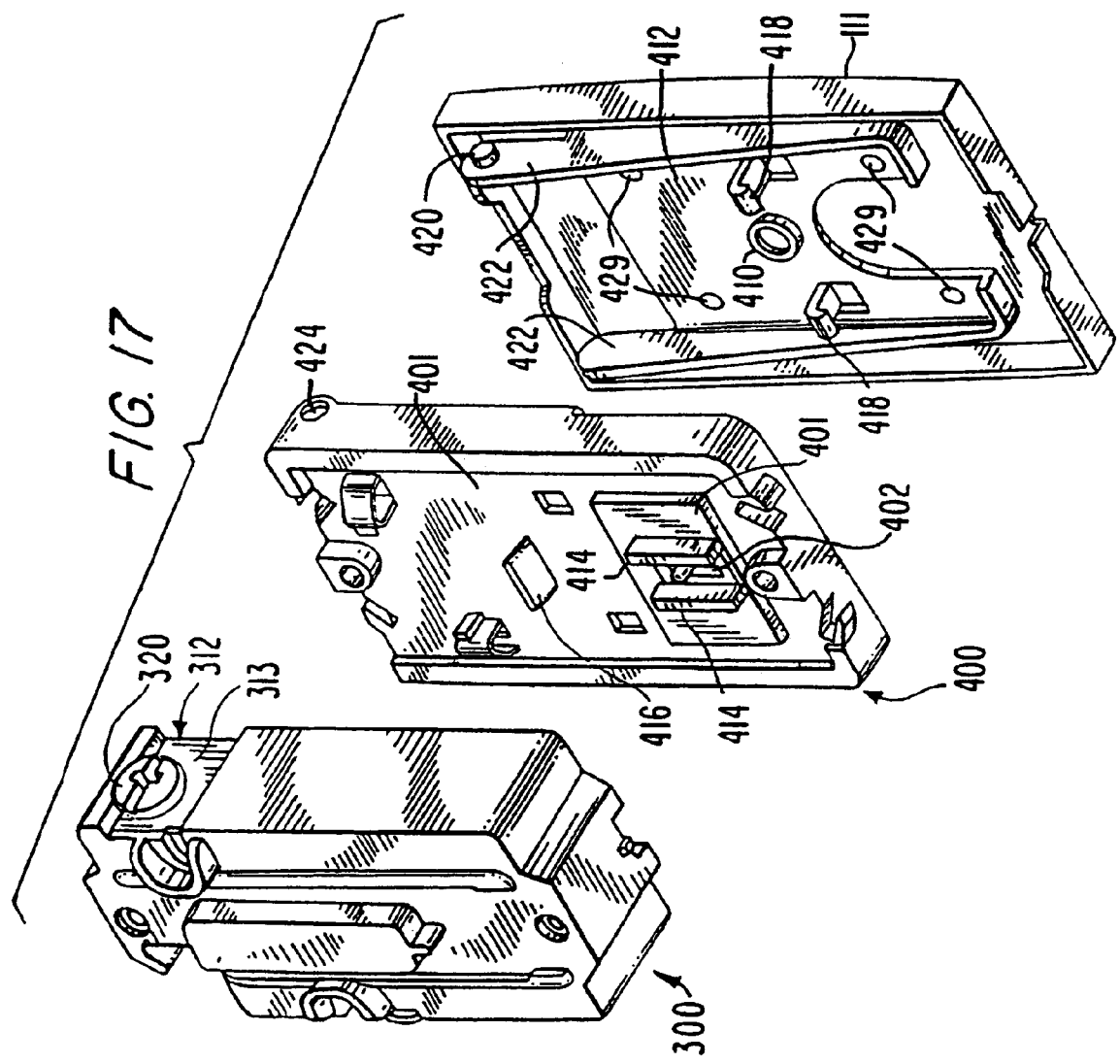

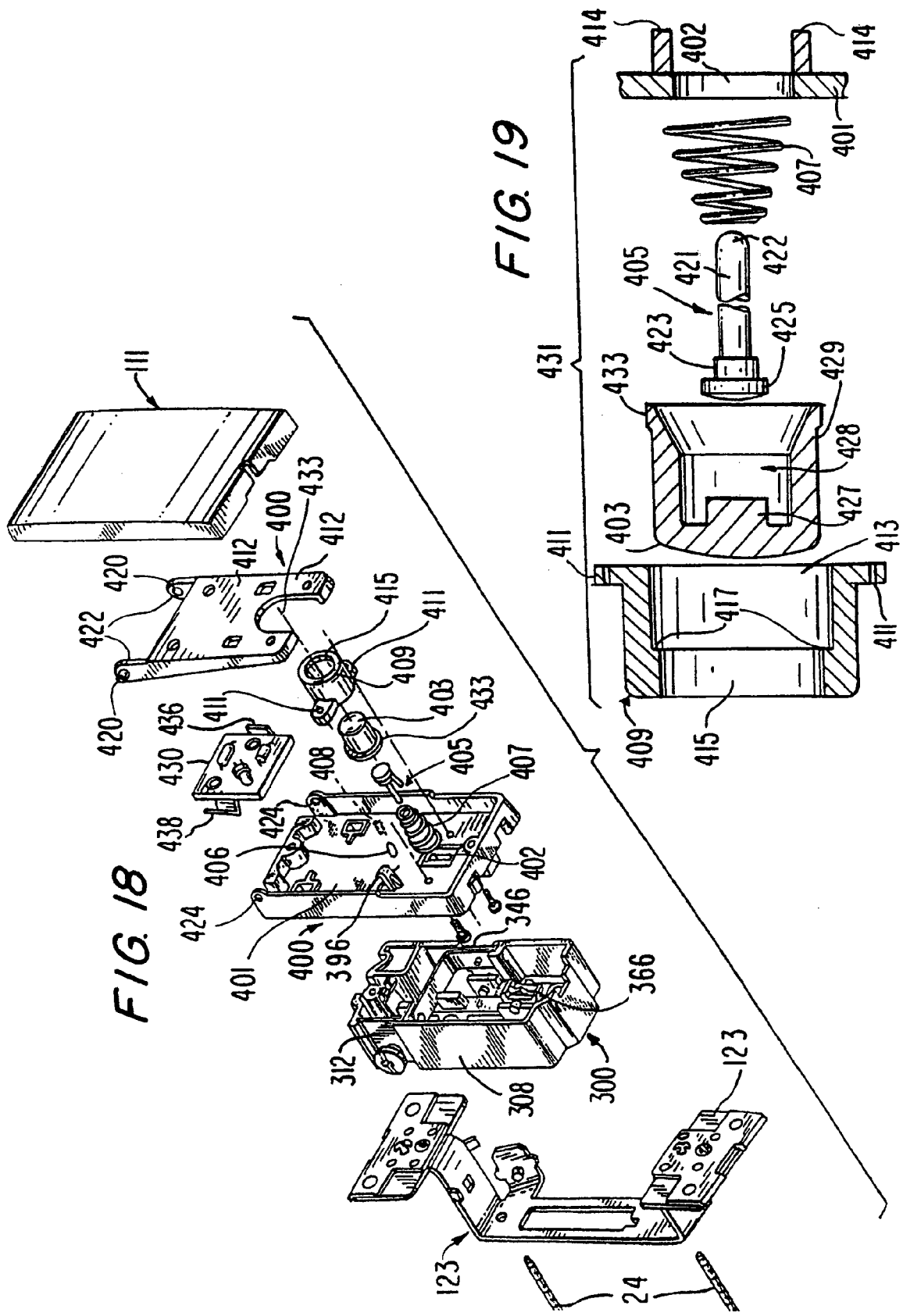

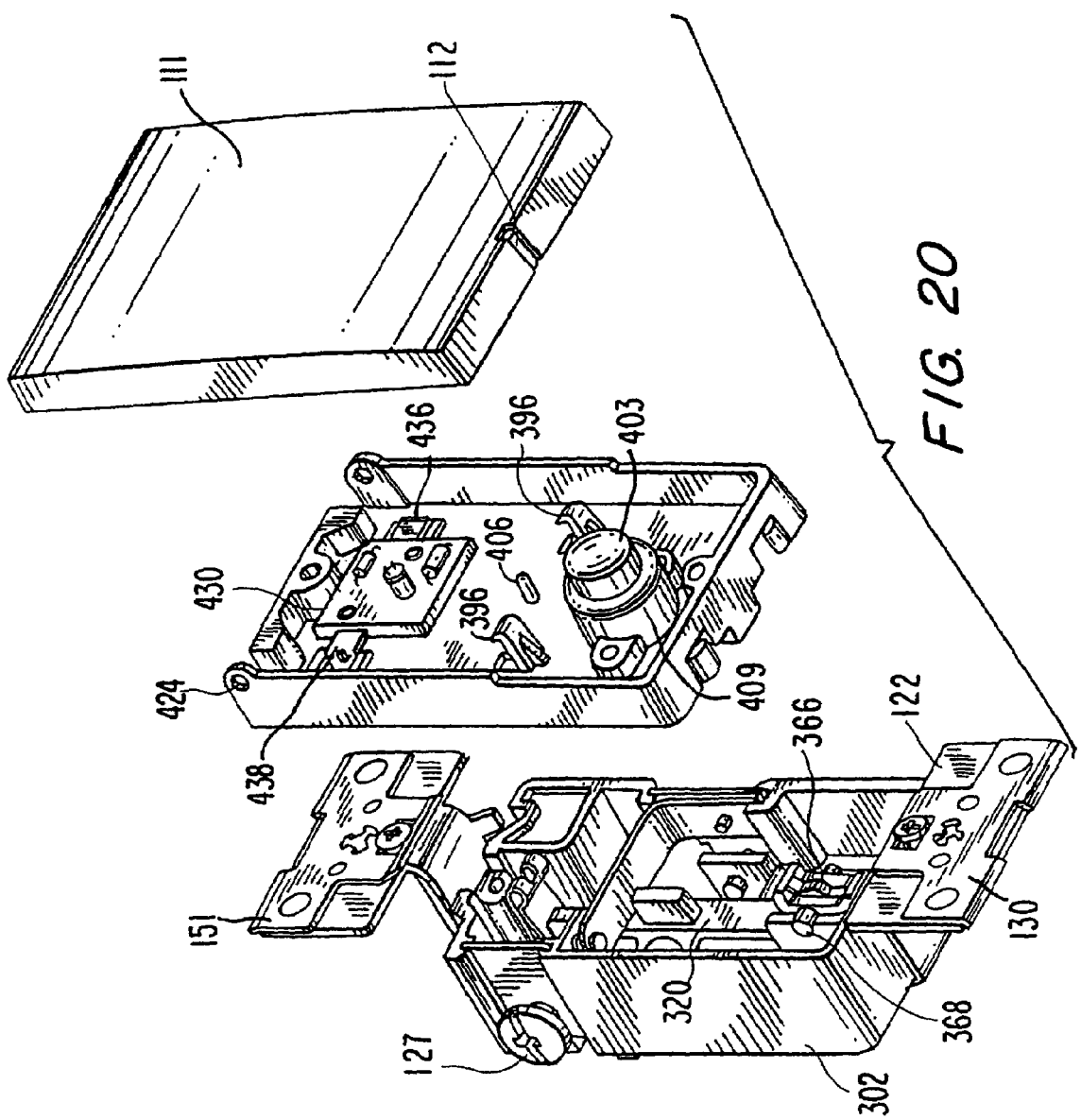

SHAPED WALL PLATE FOR WIRING DEVICE

This application is a continuation in part of application Ser. No. 10/236,406, filed Sep. 6, 2002 now abandoned, which is a continuation in part of application Ser. No. 10/163,488 filed Jun. 6, 2002 now abandoned.

BACKGROUND OF THE INVENTION

1. Field of the Invention

The present invention relates generally to the field of electrical wiring devices such as, by way of example, electrical switches and/or receptacles and accessories for said switches and/or receptacles of the type installed in building walls.

2. Description of the Related Art

When modifying the wiring in an existing building, whether public, commercial or residential by adding a wiring device such as a switch, a receptacle or a combination of switches and receptacles, it is necessary to cut a hole in a wall of the building, install a box within the hole, attach the box to a vertical stud and install the wiring device(s) into the box. In new construction, the box is attached to a stud of an open wall and, thereafter, the wall, which may be sheet rock having an opening for access to the box, is placed over the studs. The conventional wall box has pairs of mounting ears for mounting the wiring devices to the box. After the wiring devices are connected to the various conductors which they will service, each is fastened with threaded fasteners such as screws to a pair of ears on the box. The process of connecting a wiring device to various conductors and then attaching the wiring device with the attached wires to the box is done for each wiring device located within the box. Thereafter, a wall plate is typically positioned around each wiring device in the box.

Typical installations can include one or multiple wiring devices positioned side by side in a common box. In installations where there are multiple wiring devices in a common box, the installation of the wall plate can be time consuming. The wiring devices must be aligned with each other, must be positioned parallel to each other and must be spaced from each other by a distance dictated by the spacing between the openings or windows in the wall plate. Misalignment and positioning problems are often caused by wall boxes that are skewed relative to the wall or by walls which may not be flat. It is only after all of the wiring devices are accurately positioned relative to each other that a wall plate can be installed around the wiring devices.

A common type of electrical wiring device in use today is the rocker type Decora-branded electrical switch whose activating member pivots about a centrally located horizontal axis and is flat in its horizontal plane. The trademark "Decora" is owned by the assignee of the present invention. To operate the switch, the rocker paddle (the actuating member) is pushed in at the top to supply electricity to a load such as a light, and is pushed in at the bottom to disconnect the source of electricity from the load. Thus, with two or more rocker type switches positioned side by side in a box, the actuating members or paddles of the switches can be in opposite positions at any one time. For example, with two or more rocker type switches positioned side-by-side in a box, the top edges of the paddles of the switches will not always be in alignment when they are not all in their "on" or "off" positions. The in-out positioning of adjacent switches can also occur when all the switches are in their on or off state if one of the switches is a 3-way or 4-way switch. The irregular in-out positioning of adjacent switches, particularly with 3-way and 4-way switches, can cause visual inconsistency in the mind of the user as to which switch is on and which switch is off when subsequent activation or deactivation of less than all of the rocker switches is desired by a user. Another type of wiring device in use today is a receptacle having a flat face. In normal use, it is not uncommon to gang a receptacle with a switch. A receptacle with a flat face, when ganged with a switch which is not flat in one plane, typically presents a visual discontinuous array of wiring devices which homeowners seem to find visually objectionable.

SUMMARY OF THE INVENTION

The present invention discloses a structure which overcomes the deficiencies with respect to the prior art devices by providing a wiring device such as a switch having an actuating paddle which pivots about its upper end and is biased with a spring to assume the same at-rest position when either in its on position or its off position. Repeated pressing and releasing of the lower portion of the face of the rocker paddle alternately closes and opens a set of contacts within the switch to alternately connect and disconnect a load such as a light from a source of electricity each time the paddle is so pressed. Thus, regardless of whether adjacent switches of a gang of switches are on-off switches or 3-way switches, they will always be in alignment. An on-off indicator such as a small light may be provided in the paddle to indicate to a user when the contacts of the switch are opened and closed.

The paddle of the switch has a length-width ratio dimension that is proportioned to provide a finger contact surface of increased area to allow a user to more easily and quickly identify and operate a particular switch. The vertical axis of the switch has a surface of positive first differential, comprised of splines drawn between points of varying distance from a datum plane, and has along the horizontal axis a surface of a positive first differential and negative second differential, comprised of a combination of splines drawn between points of varying distance from the datum plane.

A wall plate according to the present invention is located around the switch and has a single opening for accommodating one or more switches, with no dividing or separating members dividing the single opening, for receiving one or a gang of two or more wiring devices. The shape of the wall plate around the switch along a section which runs along its vertical axis defines a surface of positive first differential and zero second differential, comprised of a combination of splines drawn between points of varying distance from a datum plane. The surface has zero second differential when the rate of height increase of individual splines is constant. The wall plate, when composed of non-conducting material, can have a conductive coating on one of its surfaces to help provide a conductive path to a ground.

When the wiring device is a receptacle, the face of the receptacle across its width is flat in one plane and has a substantially constant radius along its length to allow for the proper seating of an inserted plug.

The present invention teaches an alignment plate which is capable of accommodating one or more electrical wiring devices. The conventional difficulties encountered with respect to mounting and visually positioning a plurality of wiring devices such as one or more receptacles and/or switches in a wall box and then attaching a wall plate are overcome with the use of the alignment plate of the present invention. Such difficulties have included attempting to position the wiring devices to be in alignment with each other, attempting to position the wiring devices to be parallel to each other, attempting to adjust the spacing between the different devices to be relatively equal and uniform, and attempting to fix all of the devices to be flat against the wall. The alignment plate of the present invention has a single centrally located opening sized to receive one or more wiring devices and a set of alignment pins for each wiring device. Each set of alignment pins on the alignment plate is located along a vertical axis which defines the longitudinal centerline for a wiring device, and each wiring device is equipped at or proximate the ends of its associated ground/mounting strap with a multi-function clip for frictionally receiving and holding captive an alignment pin on the alignment plate. The alignment pins accurately position, align and locate all of the wiring devices relative to each other and, together with the multi-function clips, establishes a conductive path to ground. Thereafter the alignment plate and wiring devices attached to the alignment pins on the alignment plate can be attached to a box with mounting screws. The alignment pins accurately position, align and locate the wiring devices and the alignment plate positions all of the wiring devices to a flat plane.

In one embodiment of the switch according to the present invention, an articulated cam driver coupled to the rocker paddle of the switch causes a cam to rotate first in a clockwise direction and then in a counter clockwise direction each time the rocker paddle is depressed. Alternate rotation of the cam drives a slider member back and forth along a linear axis to open and close a set of contacts. A leaf spring of predetermined shape cooperates with a cam follower on the slider member to assist in the movement of the slider and to determine its rest positions. A spring, acting through the rigid member, urges the rocker paddle to always be in its out position when the switch is in its on position and its off at-rest position. An indicator such as an LED located in the paddle indicates the state of conduction of the switch.

In another embodiment of the switch according to the present invention, the cam driver coupled to the rocker paddle of the switch comprises an initially flat ribbon of flexible material such as spring steel formed with a blunt end having a generous radius which drives the cam. A spring urges the rocker paddle to always be in its out position when the switch is in its on and off at-rest position.

In still another embodiment of the switch according to the present invention, the cam driver coupled to the rocker paddle of the switch is a closely wound spring of, for example, piano wire coupled to a conical shaped tip which can be of plastic, metal or the like which drives the cam. A spring urges the rocker paddle to always be in its out position when the switch is in its on and off at-rest position.

The foregoing has outlined, rather broadly, a preferred blending feature, for example, of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which similar elements are given similar reference numerals.

FIG. 13 is a plan view of multi-function clip normally attached to the top end of the ground/mounting strap;

FIG. 13A is a sectional view of the multi-function clip of FIG. 13 taken along line 13A—13A;

FIG. 14 is an exploded perspective view of structure of the switch of FIG. 4;

FIG. 17 is another exploded perspective view of the switch according to the present invention;

FIG. 18 is still another exploded perspective view of the switch according to the present invention;

FIG. 19 is a partial sectional exploded view of the cam driver of the switch of FIG. 18;

FIG. 20 is a perspective exploded view of the switch of FIG. 18 including a printed circuit board;

DESCRIPTION OF A PREFERRED EMBODIMENT

Figure 1:
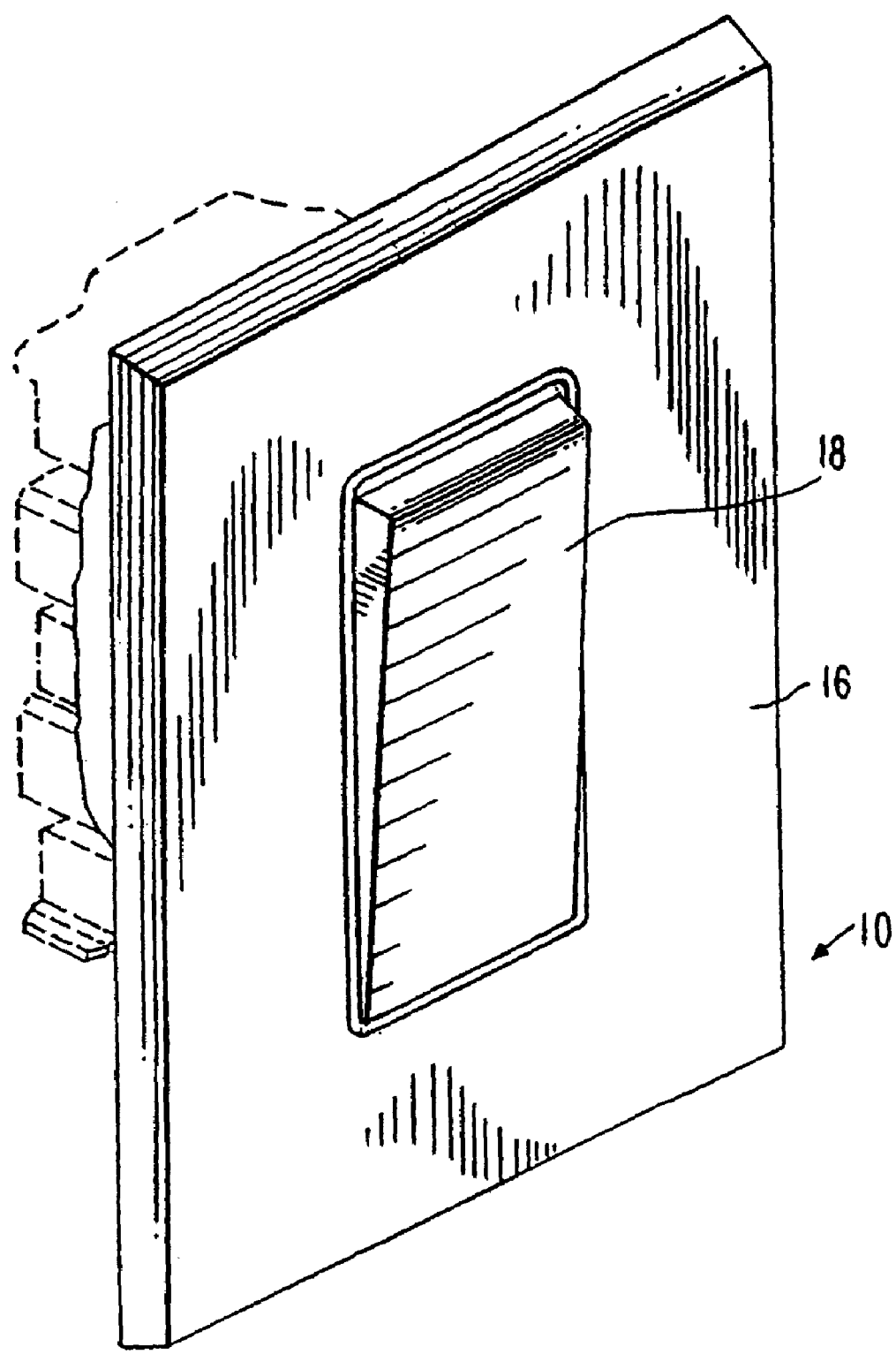
FIG. 1 is a front perspective view of a prior art switch and wall plate.
Figure 2:
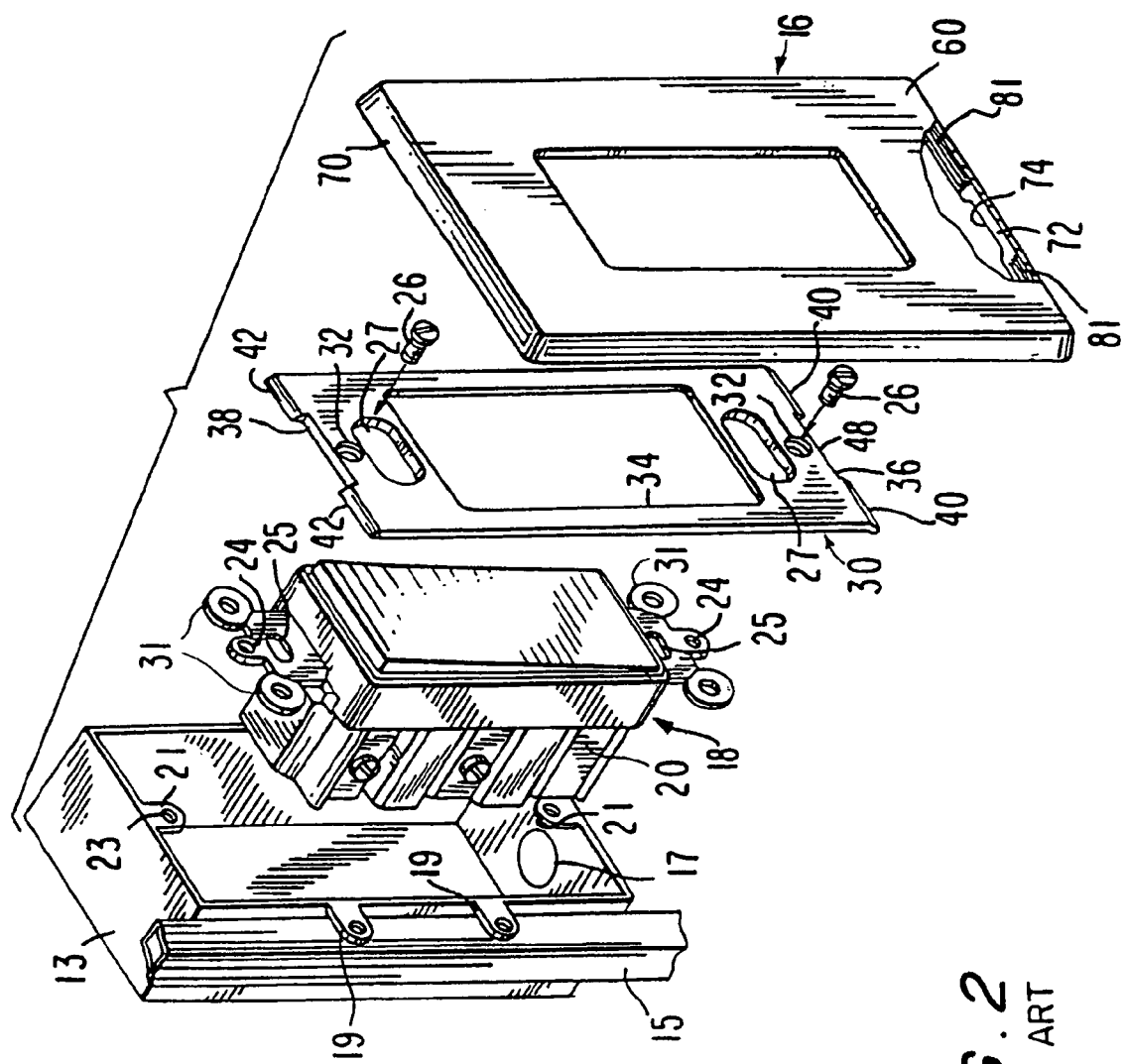
FIG. 2 is a perspective exploded view of a prior art switch, attachment plate and wall plate, and a box for receiving said prior art device.

Referring to FIG. 1, there is illustrated a front perspective view of a prior art "Decora" type electrical wall-type switch 18 and wall plate 16 forming assembly 10. Referring to FIG. 2, there is shown a perspective exploded view of a box 13 and the prior art switch 18, wall plate 16 and attachment plate 30. A suitable aperture is cut into a wall (where there is an existing wall and this installation is not a new construction) to provide access to the box 13 mounted to a stud 15, or to permit installation of a suitable box directly to the material of the wall (such as plasterboard). The box 13 is chosen to be large enough to accept as many wiring devices as are to be mounted therein. The box 13 is made of metal or plastic, depending upon local electrical Code requirements, and has one or more openings in its sides or back to permit the introduction of electrical wiring or cables into the interior of the box 13. Box 13 has mounting means 19 to permit the box to be anchored to an adjacent stud 15. The box is formed with a pair of mounting ears 21 for each wiring device that is to be mounted within the box. Each mounting ear contains a threaded aperture 23 for receiving a mounting screw of an associated wiring device such as, for example, switch 18 or a receptacle (not shown in FIG. 2). In the normal order of assembly, electrical cables are passed through knock out openings 17, for example, to the interior of the box. The ends of the electrical cables are stripped of insulation and attached to terminals (contacts) on the side or rear of the body 20 of the switch 18 or a receptacle. After the electrical cables are attached to terminals on the side or rear of the body 20 of the switch (or receptacle), the switch is pushed into the box and is held in position within the box by screws (not shown) that pass through clearance openings such as elongated mounting slots 25 formed in the mounting strap of the switch and thereafter into threaded engagement with threaded apertures 23 of ears 21, thereby securing switch 18 within and to the box 13. Thereafter, a conventional attachment plate 30 is positioned around the front of the switch and secured to the switch with mounting screws 26 which pass through clearance openings 32 in the attachment plate and are threaded into openings 24 formed in the ground/mounting strap of the wiring device. Attachment plate 30 contains a main aperture 34 of a shape complimentary with the profile of the front of the switch 18, which extends through it. Main aperture 34 is rectangular to accept the front of the switch 18 or a receptacle. The head of the screw which passes through elongated mounting slot 25 of switch 18 and engages threaded aperture 23 of mounting ears 21 is larger than the inner dimension of slot 25 and, therefore, holds switch 18 or a receptacle captive to the box 13 and to a wall surface (not shown). In a similar manner, the head of the screw which passes through clearance opening 32 of the attachment plate 30 and engages threaded opening 24 of the ground/mounting strap of the switch is larger than the diameter of clearance opening 32 and, therefore, holds attachment plate 30 captive to switch 18.

At each of the ends 36, 38 respectively, of attachment plate 30 are two latching pawls 40, 42 which are formed as extensions of attachment plate 30 but which are relatively thinner in cross-section. A narrow projection 48 located between the latching pawls 40 and bent at about a 45 degree angle with respect to the horizontal edge of end 36 of wall plate 30 is used to help release an attached wall plate.

Wall plate 16 is proportioned to fit over attachment plate 30 and box 13 into which the single wiring device, such as switch 18, or a receptacle, is placed and to which it is fastened.

To attach wall plate 16 to attachment plate 30, latching pawls 40, 42 which are a part of attachment plate 30 are made to engage saw-tooth shaped racks 81 on the inner surfaces of end walls 70 and 72 of wall plate 16 as the wall plate is pushed on.

Figure 3:
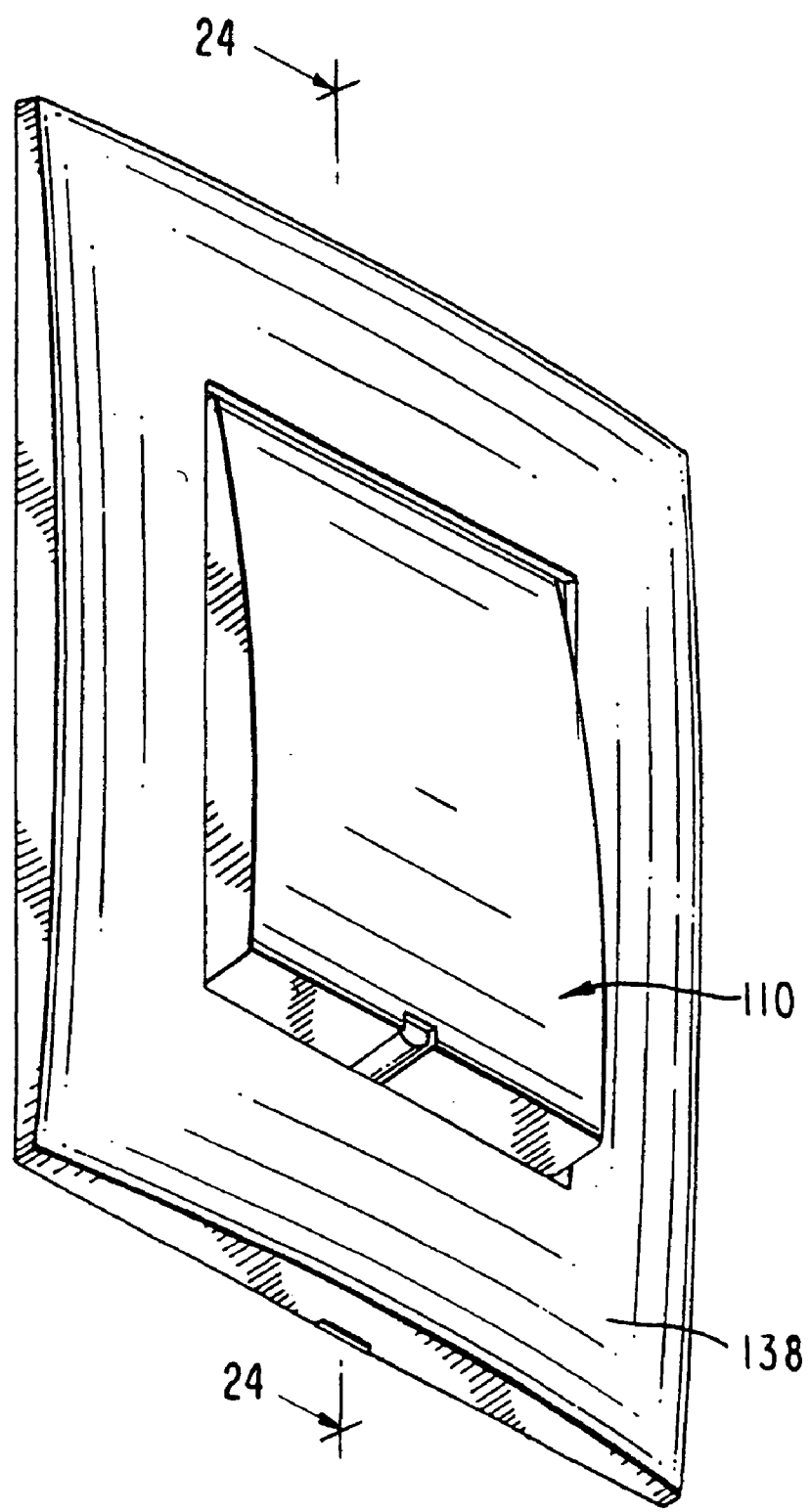
FIG. 3 is a front perspective view of a switch and wall plate in accordance with the principles of the invention.
Figure 4:
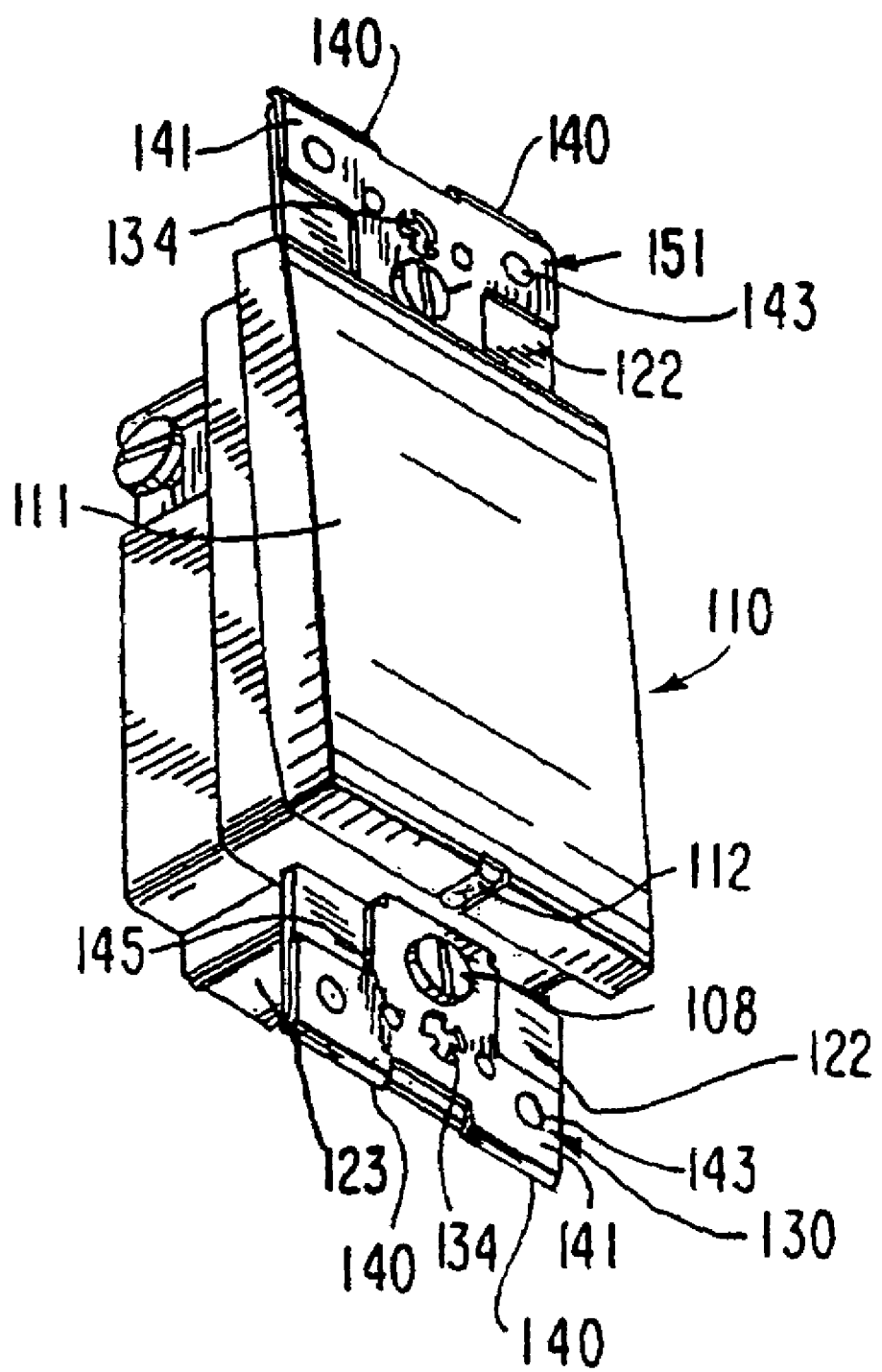
FIG. 4 is a front perspective view of the switch shown in FIG. 3 showing the ground/mounting strap and multi-function clips.
Figure 5:
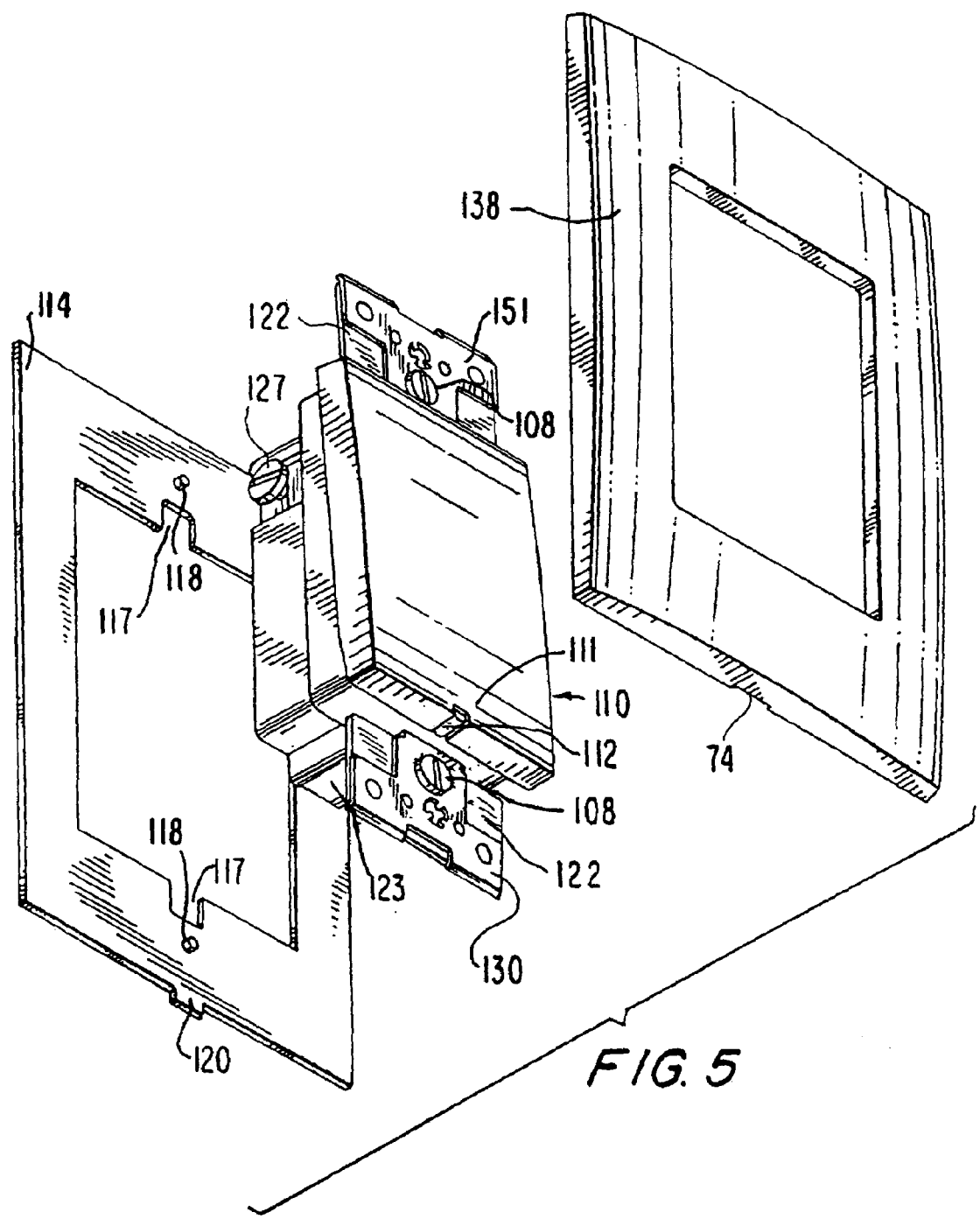
FIG. 5 is an exploded view of alignment plate, a switch fitted with multi-function clips on its ground/mounting strap, and a wall plate, all according to the present invention.

FIG. 3 is a front perspective view of a wiring device such as switch 110 and wall plate 138 in accordance with the principles of the present invention; FIG. 4 is a front perspective view of the switch 110 of FIG. 3 showing the ground/mounting strap 123 and multi-function clips 130, 151; and FIG. 5 is an exploded view of FIG. 3 showing alignment plate 114, switch 110 with multi-function clips 130, 151 secured on ground/mounting strap 123 and wall plate 138. Referring to FIGS. 4 and 5, the switch 110 has an actuating rocker paddle 111 which pivots about an axis at its upper end and is biased by an internally located spring member to assume the same at-rest position when in both its "on" and "off" position. Repeated pressing and releasing on the face of the rocker paddle 111 of the switch alternately closes and opens a set of contacts within the switch body to alternately connect and disconnect a load such as a light to a source of electricity each time the paddle is pressed and released. Thus, regardless of whether ganged switches are on-off switches, 3-way switches or 4-way switches, the top and bottom edges of each switch will always be aligned with the top and bottom edges of all the other switches that are ganged together. An on-off indicator such as a light 112 may be provided in the rocker paddle 111 to indicate to a user when the switch 110 is in its on position or off position. For example, when the light 112 is on, the switch will be in its off position, and when the light is off, the switch will be in its on position. Light 112 also serves the purpose of permitting the user to locate the switch 110 in the dark. The rocker paddle 111 of the switch 110 is not located within a frame and aesthetically complements the wall plate 138. The rocker paddle 111 of the switch 110 has a length-width ratio dimension and surface configuration which provides a robust finger contact surface of increased size which is easier to identify and use.

The switch 110 is attached to a ground/mounting strap 123 having ends 122 which provide increased surface area for contact with the surface of a wall and provides support for multi-function clips 130, 151 attached to the ends 122 by fastener means such as screws, rivets, spot welds, pressure bonding, TOX process or the like.

Figure 10:
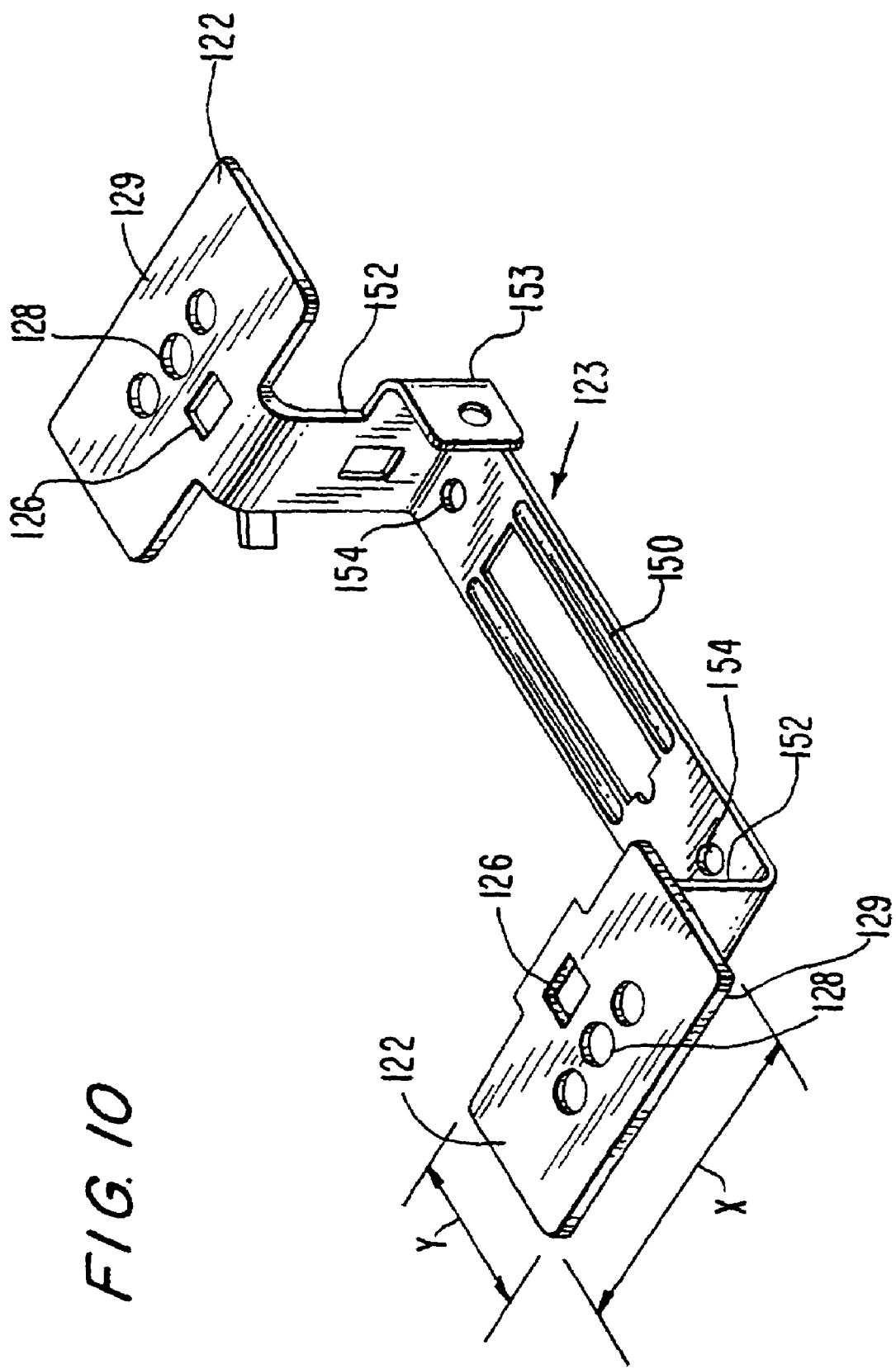
FIG. 10 is a perspective view of ground/mounting strap for a wiring device.
Figure 11:
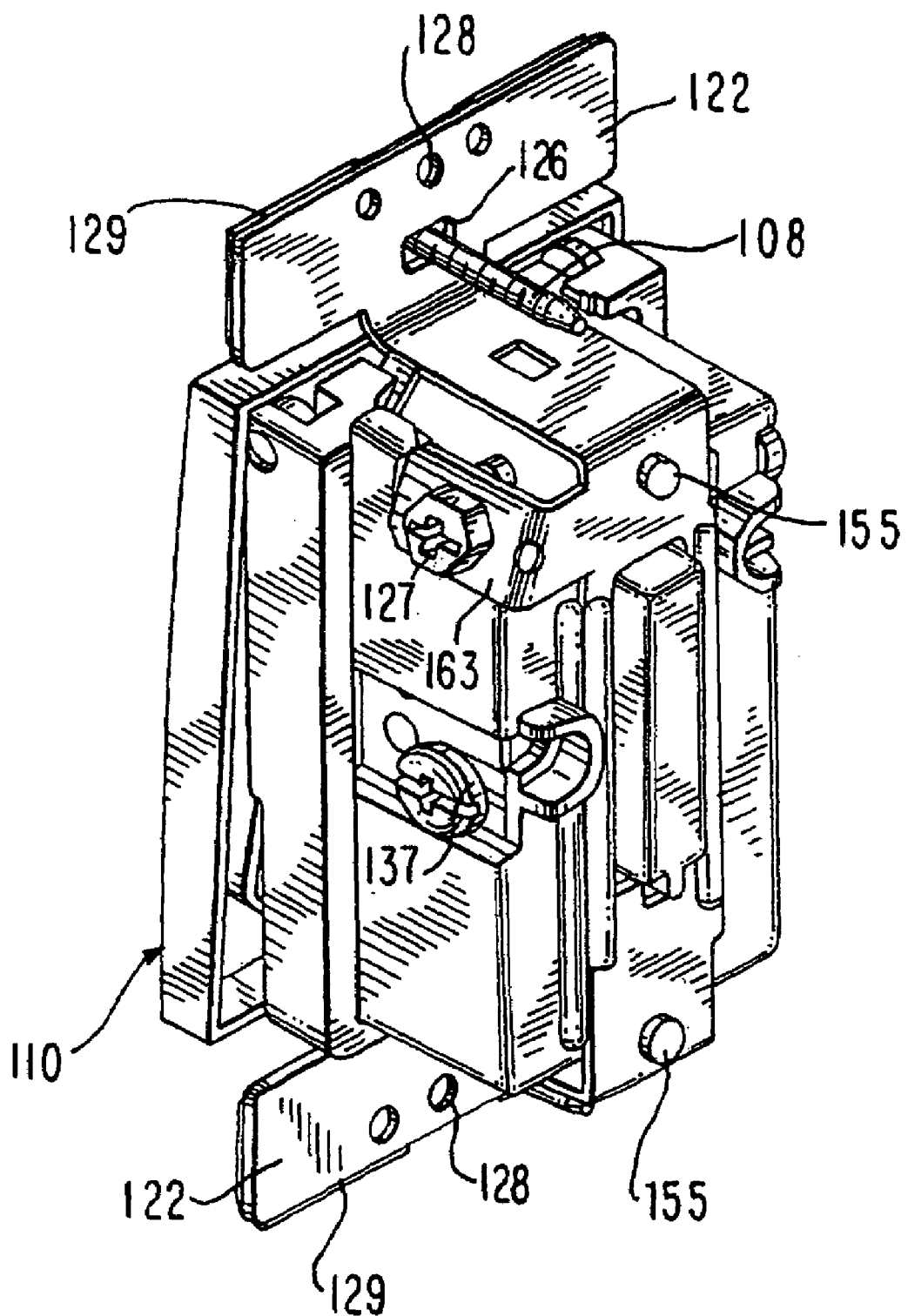
FIG. 11 is a bottom perspective view showing ground/mounting strap attached to a switch.

Referring to FIG. 10, there is shown a perspective view of the ground/mounting strap 123 for a wiring device such as switch 110. Ground/mounting strap 123 has a base support member 150 located between two intermediate support members 152 bent at right angles with respect to the base support member 150 and each of which terminates in an outward projecting end 122 of the ground/mounting strap. The two intermediate support members 152 and the base support member 150 cradle and are securely attached to the wiring device, such as switch 110, with rivets, screws or the like 155 (see FIG. 11 which is a bottom perspective view showing ground/mounting strap attached to a switch) which pass through openings 154 in the base support member 150. A ground terminal 163 which projects out from the ground/mounting strap 123 and having a threaded opening for receiving a screw 127 (see FIG. 5) is provided for connection to a ground wire. Each end 122 of the strap 123 is substantially rectangular in shape and has two openings 126 and 128. Opening 126 can be circular, oval, square or rectangular and is a clearance opening for mounting screws 108 (FIG. 8) which are normally provided by the manufacturer of the wiring device for attaching the wiring device to a box. The distance between centers of openings 126 in ends 122 of the ground/mounting strap is equal to the distance between the centers of threaded apertures 23 in mounting ears 21 of box 13 (see FIG. 2) to allow mounting screws 108 to engage and be held captive by threaded apertures 23. Opening 128 in each end 122 of the ground/mounting strap is a clearance opening for an alignment pin which is a part of and is located on an alignment plate. Additional openings can be provided in the ends 122 for attaching and/or aligning a multi-function clips 130, 151 to the ends of the ground/mounting strap. The ends 122 are substantially flat rectangular members which provide an increased area for increased contact with a wall surface. See FIG. 2 which shows the relatively small ends of the prior art ground/mounting strap where, if the scored washers 31 are removed from the strap, the only surface left for contact with a wall surface is the material around the threaded opening 24 in the ground/mounting strap.

Returning to FIG. 10, the ends 122 of ground/mounting strap 123 has a width "X" of about 1.563 inches and a depth "Y" of about 0.318 inches. These dimensions are not critical. However, the distance between the edges 129 of the ends 122 of the ground/mounting strap 123 are preferably not greater than about 4.6 inches to allow a wall plate to fit over and cover the ground/mounting strap. The ground/mounting strap 123 can be of conducting material such as steel, etc., and is secured to the switch with screws, rivets or any convenient fastening means. Screw terminals 137 located on either side of the body of the switch (see FIG. 11) are provided to receive phase and neutral wire conductors.

Figure 12A:
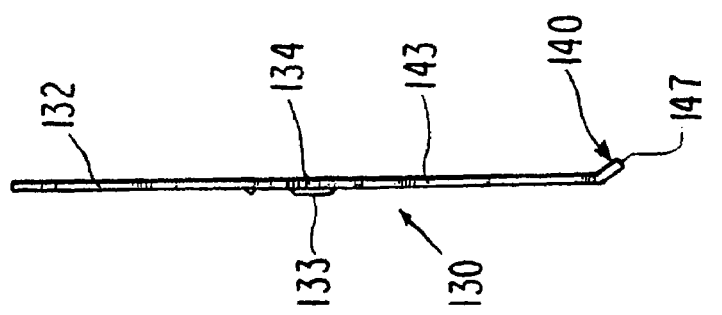
FIG. 12A is a side view of the multi-function clip of FIG. 12.
Figure 12:
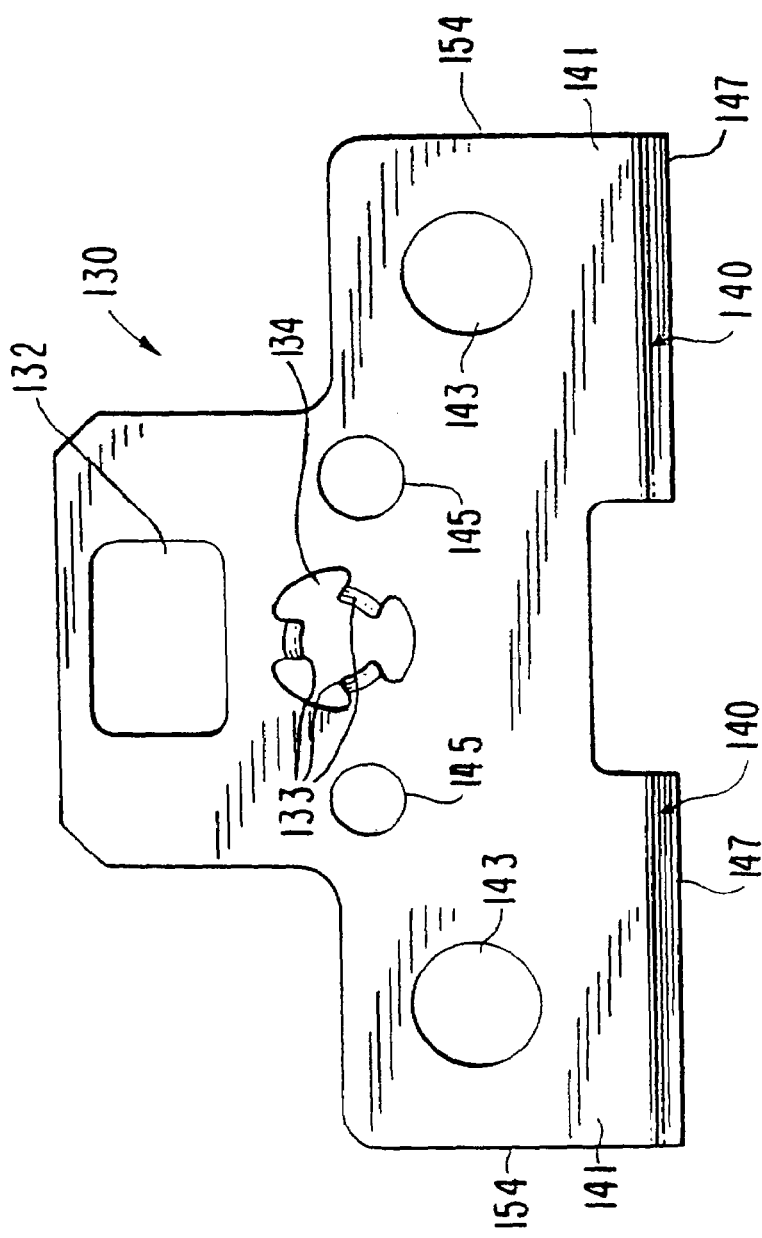
FIG. 12 is a plan view of a multi-function clip according to the present invention, which is normally attached to the bottom end of the ground/mounting strap.

Multi-function clips 130, 151 according to the present invention are attached to the ends 122 of the ground/mounting strap. The multi-function clips can be composed of phosphor bronze, spring brass, spring steel or the like. Referring to FIG. 12, there is shown a plan view of multi-function clip 130 normally attached to the bottom end of the ground/mounting strap, and FIG. 12A is a side view of the multi-function clip 130 of FIG. 12. Multi-function clip 130 is attached to the bottom end 122 of ground/mounting strap 123 and has openings 132 and 134. When multi-function clip 130 is attached to the end 122 of ground/mounting strap, opening 132 is aligned with opening 126 of the ground/mounting strap, and opening 134 is aligned with opening 128 in the strap end 122. Opening 132 is a clearance opening for a threaded fastener such as screw 108 (see FIGS. 5 and 8) used to couple the wiring device to a box. Opening 132 can be round, square, oval or rectangular to allow the threaded fastener to be moved in all directions to allow the threaded fastener 108 to be aligned with the threaded aperture in the box when attaching the wiring device to the box.

Looking at FIG. 12, opening 134 in multi-function clips 130 and 151 is generally circular but for three inwardly projecting members 133 which are formed upwardly at an angle of between 10 degrees and 30 degrees. An angle of 20 degrees was found to be preferred. The inner ends of the three inwardly projecting members 133 form an opening slightly smaller than the outer diameter of an alignment pin 118 on an alignment plate 121 (see FIG. 9) and flex or bend upwardly as the alignment pin enters the opening 134 from the rear. The ends of the projecting members 133 frictionally engage and hold captive the alignment pin 118 to prevent undesired disengagement of the wiring device from the alignment plate. It is to be noted that the projecting members 133, by physically contacting and holding captive the alignment pins 118 on the alignment plate 121 (see FIG. 9), provide the desired alignment. Located at the end 147 of multi-function clip 130 are two latching pawls 140 each slightly more than one-half of an inch in length. The end 147 of each latching pawl 140 is bent downward at an angle of between 20 degrees and 60 degrees and is used to engage tooth shaped racks 80 on the inside surface of the ends of a wall plate to hold the wall plate captive (see FIG. 35). The ends 147 of the latching pawls 140 capture and securely hold the wall plate when the downward bend of the latching pawl 140 relative to the ground/mounting strap is between 20 degrees and 60 degrees, and where a bend of about 40 degrees was found to be preferable (see FIG. 35). The multi-function clips 130 and 151 are just that, clips which perform a combination of a plurality of functions not found in the prior art, including accurately aligning one or more wiring devices when the multi-function clip of the wiring device engages the alignment pins on the alignment plate; and, holding a wall plate to the wiring device and against a wall, even when a wall is not perfectly flat.

The openings 143 in the multi-function clip can be provided for attaching the clip to the end of the ground/mounting strap with, for example, rivets, screws, the TOX process etc. Openings 145 can be provided for alignment purposes when attaching the clip to the end 122 of the ground/mounting strap 123. The distance between the side edges 154 of the multi-function clip should preferably not exceed 1.533 inches to allow the clip to be attached to the end of the ground/mounting strap without extending over the side edges of the strap 123. The clip shown in FIGS. 12 and 12A is the clip that is attached to the bottom end of the ground/mounting strap and is slightly different from the multi-function clip that is attached to the top end of the ground/mounting strap.

Referring to FIG. 13, there is shown a plan view of the multi-function clip 151 normally attached to the top end of the ground/mounting strap and FIG. 13A is a sectional side view of the multi-function clip along line 13A—13A of FIG. 13. The clip 151 shown in FIGS. 13 and 13A is similar to the clip 130 shown in FIGS. 12 and 12A except that end 157 of clip 151 is bent upward and opening 153 for the threaded fastener 108 (see FIG. 5) has a fastener engaging tab 155 which extends into opening 153, and is bent at a slight downward angle toward the back of the switch. Engaging tab 155 is provided to engage and hold captive the threaded body of threaded fastener 108 and, in addition, helps to provide a good electrical connection between the multi-function clip, the ground/mounting strap, the alignment plate and the box as the threaded fastener is tightened. As with multi-function clip 130, openings 153 in multi-function clip 151 and opening 126 in the ground/mounting strap are aligned with each other during assembly to permit the threaded fastener 108 to be aligned with the threaded aperture in the box as the switch is being attached to the box. The distance between the side edges 148 of the multi-function clip should preferably not exceed 1.533 inches to allow the multi-function clip to be attached to the end 122 of the ground/mounting strap and not extend over the side edges of the ends 122 of the ground/mounting strap 123.

Figure 6:
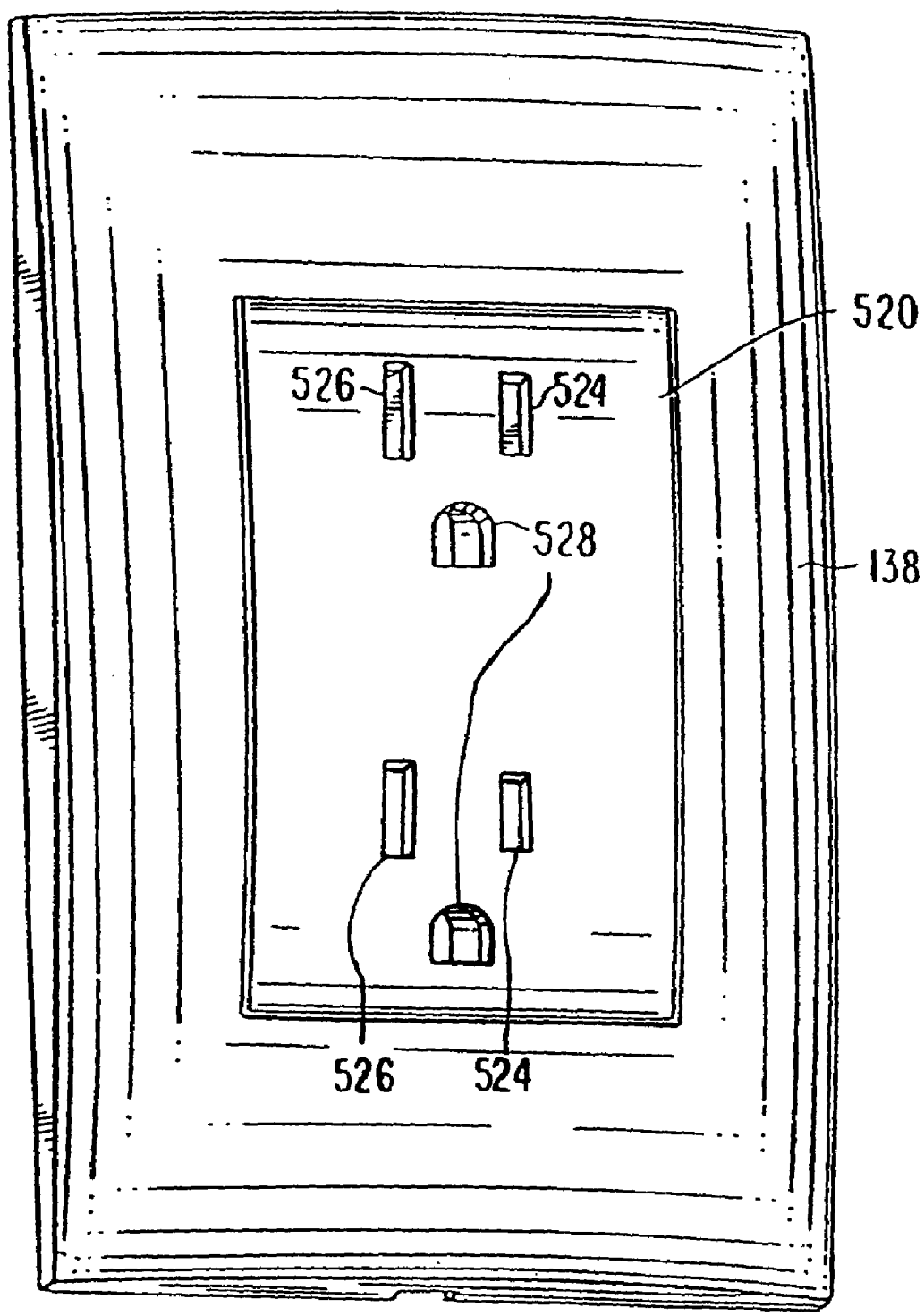
FIG. 6 is a front view of a receptacle and wall plate.
Figure 7:
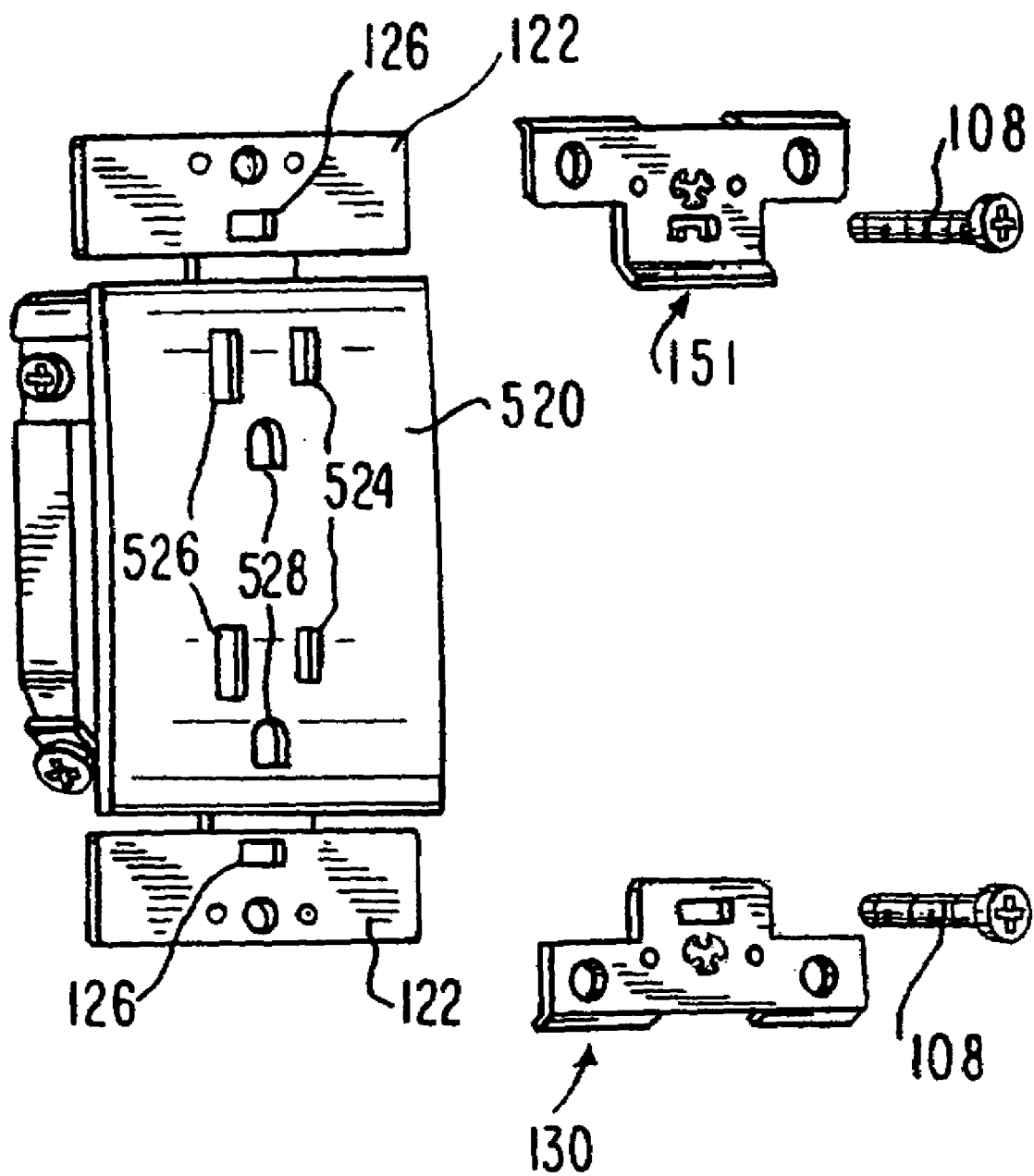
FIG. 7 is a front perspective view of the receptacle of FIG. 6 showing an exploded view of the ground/mounting strap and multi-function clips.
Figure 8:
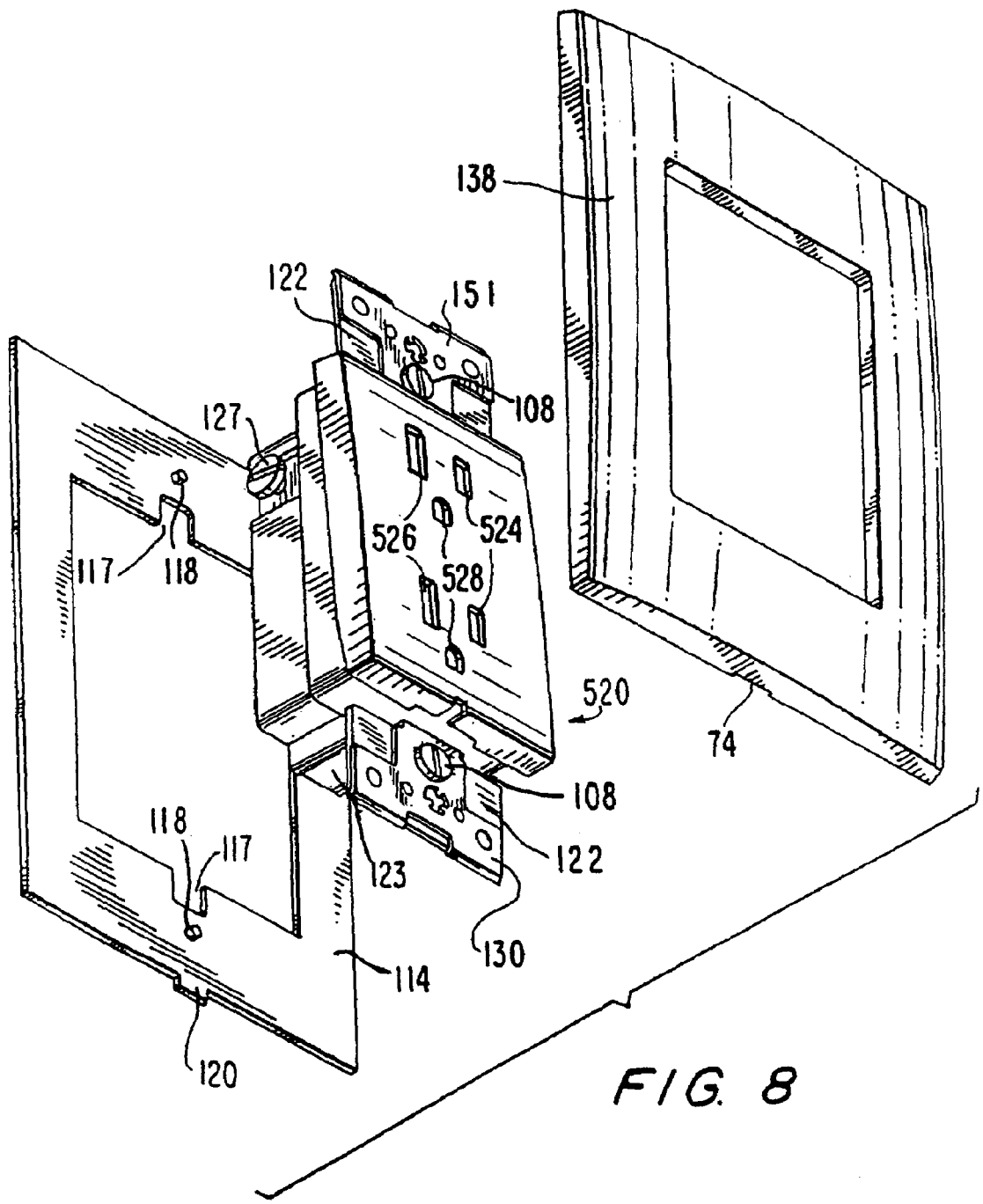
FIG. 8 is an exploded view of alignment plate, receptacle and wall plate.

Referring to FIG. 6, there is shown a front view of a receptacle 520 with its face located within wall plate 138; FIG. 7 is a front perspective partial exploded view of the receptacle 520 of FIG. 6 showing the ends 122 of ground/mounting strap 123 and multi-function clips 130, 151; and FIG. 8 is a perspective exploded view of FIG. 6 showing alignment plate 114, receptacle 520 and wall plate 138. Referring to FIGS. 7 and 8, the receptacle 520 is intended for 15 Amp. 125 V to 20 Amp. 125 V where, according to NEMA specification 5-15R, each individual receptacle has two slot openings 524 and 526 for receiving the flat blades of a suitable plug and a semi-circular ground blade opening 528. Opening 526 is larger than the opening 524 to allow a two blade plug to be inserted in only one way to maintain correct electrical polarization. The contact in the larger slot is connected to the neutral conductor and, by maintaining the correct polarization, the external metal parts of appliances such as toasters, TV's etc. can be grounded through the neutral conductor. The semi-circular ground blade is normally connected to a ground and prevents a plug from making a reverse polarity connection with the receptacle and connects it to the ground conductor which provides a ground path for the plug-connected equipment.

Receptacle 520 is attached during assembly to a ground/mounting strap 123 as shown in FIG. 10 having ends 122 which provide increased surface area for contact with the surface of a wall and provides support for multi-function clips 130, 151 (more fully shown in FIGS. 12, 12A, 13 and 13A) attached to the ends 122 of ground/mounting strap 123 by fastening mean such as screws, rivets, spot welds, pressure bonding, TOX process or the like.

Referring to FIG. 10, as stated above, there is shown a perspective view of the ground/mounting strap 123 for a wiring device such as a receptacle (not shown), and (see FIGS. 12, 12A, 13 and 13A) multi-function clips attached to the ends of the ground/mounting strap. Ground/mounting strap 123 and the multi-function clips 130, 151 for a receptacle are similar to the ground/mounting strap and multi-function clips shown and described above for a switch and, therefore, in the interest of brevity, the detailed description of the ground/mounting strap shown in FIG. 10 and of the multi-function clips shown in FIGS. 12, 12A, 13 and 13A for use with a receptacle will not again be here repeated. The multi-function clips can be composed of phosphor bronze, spring brass, spring steel or the like.

Figure 9:
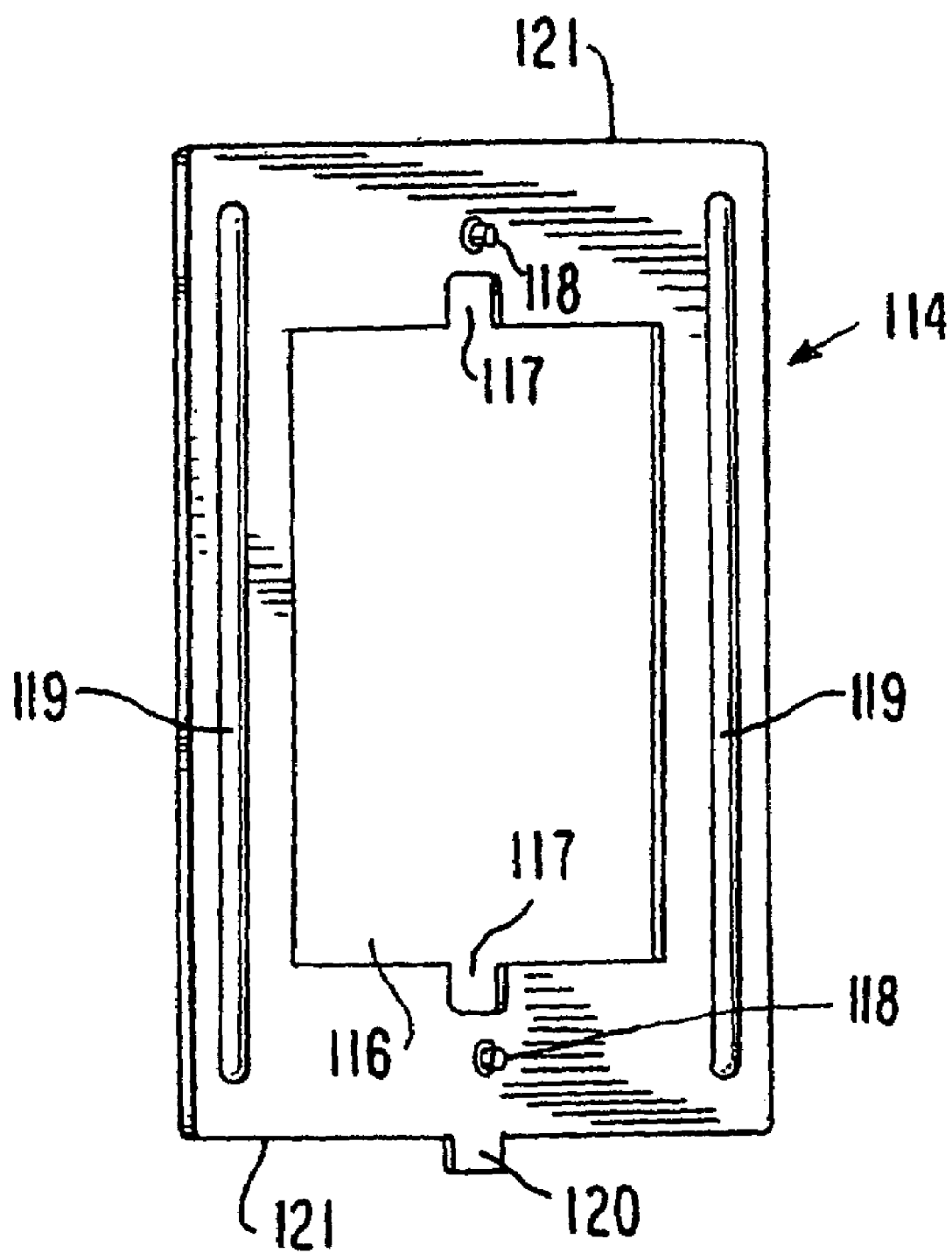
FIG. 9 is a front perspective view of alignment plate for a single wiring device.

Referring to FIG. 9, there is shown a front perspective view of alignment plate 114 for a single wiring device such as a switch or a receptacle. Alignment plate 114, which can be composed of any suitable material such as brass, aluminum, cold rolled steel, plastic, a plastic coated with a conducting material, etc., has a centrally located opening 116 sized to accept the body of a wiring device. Centrally located at opposite top and bottom ends of opening 116 and either opening into or separated from opening 116 are two clearance openings 117 for threaded fasteners 108 used to secure the wiring device (a switch or a receptacle) and the alignment plate 114 to box 13 and wall surface. When the wiring device is attached to the box, the alignment plate 114 is sandwiched between the ground/mounting strap of the wiring device and the box. Located between the outer edge of each clearance opening 117 and the edge 121 of alignment plate 114 is an alignment pin 118. Clearance openings 117 in alignment plate 114 can have an open end as shown in FIG. 9 or an opening fully encircled by material. When the alignment plate is attached to the ground/mounting strap, openings 128 at the ends 122 of the ground/mounting strap are clearance openings for alignment pins 118 and are aligned with openings 134 in multi-function clips 130,151. Thus, the alignment pins 118 are positioned to enter openings 134 in multi-function clips 130, 151 attached to the lower and upper ends 122 of the ground/mounting strap 123 of the wiring device as the wiring device, either a switch or a receptacle, is being attached to an alignment plate. Alignment plate 114 can have two ribs 119 and a downwardly extending tab 120. Tab 120 extends from the bottom edge of the alignment plate and is used to facilitate removal of a wall plate from around the face of a wiring device. The two ribs 119 are present to provide an alignment plate that resists flexing and is an optional feature which is not required as shown for the alignment plate 114 of FIG. 8. The alignment plate 114, when attached to a wiring device, substantially covers the box in which the wiring device is installed. The alignment plate 114 shown in FIGS. 8 and 9 is for a single wiring device.

The alignment plate 114 helps to overcome difficulties encountered with respect to mounting and positioning wiring devices such as one or more switches, a switch and/or a receptacle, or one or more receptacles to a box prior to placing a wall plate around the wiring devices. Prior to mounting a wall plate, various difficulties can be encountered such as aligning the wiring devices with each other, positioning the wiring devices to be parallel to each other, adjusting the spacing between the wiring devices to be equal and uniform and fixing all of the wiring devices to be flat against the wall. These difficulties are overcome with alignment plate 114 which has a single opening 116 and a pair of alignment pins 118 in combination with the multi-function clips on the wiring devices of each wiring device that is to be mounted to the alignment plate in side by side relationship. The opening 116 in the alignment plate is sized to receive one or a gang of wiring devices positioned side by side in a box and the alignment plate has a pair of alignment pins 118 for each wiring device which engage the multi-function clips on each wiring device to hold and accurately position each wiring device relative to each other and along a flat plane. Each set of alignment pins on the alignment plate is located on a vertical axis which defines the center for a wiring device and each wiring device has a multi-function clip at each end of the ground/mounting strap for frictionally receiving and holding captive the alignment pins on the alignment plate. When being assembled, the wiring devices, normally after being connected to the electrical wires, may first be attached to the alignment plate and the alignment plate, which now holds captive the wiring devices, is attached to a wall box and wall surface by means of threaded fasteners. Thereafter, a wall plate is positioned around the wiring devices without requiring any further adjustments on the part of a user by simply pressing the wall plate in toward the wall to allow the latching pawls 140 at the end 147 of the multi-function clips to engage tooth shaped racks 80 on the inside ends of the wall plate.

The multi-function clips, in addition to clamping the wall plate to the ground/mounting strap, helps to overcome various difficulties encountered with respect to mounting and positioning one or more electrical wiring devices to a box to allow a wall plate to be quickly and easily positioned around one or more wiring devices and to also be flat against the wall. Each wiring device according to the present invention has at each end of the ground/mounting strap a multi-function clip that has locating openings 134 for receiving and engaging alignment pins 118 on the alignment plate 114. The pins on the alignment plate, when engaged by the openings 134 in the multi-function clips, accurately positions each wiring device vertically and horizontally on the alignment plate, and the alignment plate itself positions the wiring device along a flat plane to allow a wall plate to be positioned around a single wiring device or a gang of two or more wiring devices without any further adjustments being required. Each pair of alignment pins on the alignment plate is located on a substantially vertical axis which accurately defines the center of a wiring device, although it is within the scope of the present invention to provide other alignments, as well. The opening 134 in combination with the projecting members 133 in each multi-function clip receives and holds captive an alignment pin 118. The multi-function clips, in cooperation with the alignment pins, accurately positions and aligns all wiring devices, either singly or a gang relative to each other, and to the alignment plate. As noted previously, the opening 116 in the alignment plate can be made to receive one or more wiring devices. After the wiring device(s) are attached to the alignment plate, the wiring device(s), together with the alignment plate are attached to a wall box and wall surface by means of threaded fasteners such as screws which pass through openings 132 and 153 of multi-function clips 130 and 151, openings 126 in the ground/mounting strap and openings 117 in alignment plate 114. The alignment plate 114 provides a substantially flat rigid support for the wiring devices, and the alignment pins 118, in combination with the multi-function clips insures that all the wiring devices are accurately positioned relative to each other when two or more are ganged together to allow a wall plate to be placed around the wiring devices without requiring any further adjustment.

When assembling wiring devices to a wall mounted box, the electrical cables that have been fed through openings to the confines of the box are stripped of insulation and attached to terminals on the side or back of the wiring device, such as a switch and/or receptacle that is to be mounted in the box. After the wires are attached to the wiring device, the alignment plate may be positioned behind the wiring device by threading the wiring device through the opening in the alignment plate. The alignment plate may have adhesive strips or the like to facilitate temporary positioning to the wall surface. The back face of the ends of the ground/mounting strap is now moved toward the front face of the alignment plate. As the wiring device moves toward the alignment plate, the alignment pins 118 on the alignment plate enter openings 128 in the ground/mounting strap and openings 134 in the multi-function clips 130, 151. As the alignment pins enter the openings 134, they force the upwardly bent projections 133 to resiliently move upward and spread slightly apart to allow the alignment pins to fully enter openings 134. The ends of the upwardly bent projections 133 engage and hold captive alignment pins 118 and resist backward movement and withdrawal of the pins from the openings 134. The body of the switch or receptacle which is now attached to the alignment plate and connected to the electrical wires, is pushed into the box. As the wiring device is pushed into the box, threaded fasteners 108 located in openings 132 and 153 in the multi-function clip 130 and opening 153 of multi-function clip 151 and clearance openings 117 in alignment plate 114 are aligned with and are threaded into threaded apertures 23 in mounting ears of box 13 to hold both the alignment plate and wiring device(s) to the box and wall surface. The head of the threaded fasteners which pass through opening 126 in the ends of the ground/ mounting strap of the wiring device and openings 132, 153 in the multi-function clips are larger than either opening and, therefore, holds the wiring device and alignment plate 114 firmly to the box and wall.

The wall plate is now placed over the installed wiring devices. It is to be noted (see FIGS. 3, 4 and 5) when the wiring device is a switch, as here disclosed, the rocker paddle 111 of switch 110 is frameless, it is not located within a frame. Thus, the switch must be accurately positioned within the wall plate to insure that the paddle is free to move without touching either the wall plate or a side surface of an adjacently positioned wiring device.

Each multi-function clip 130, 151 contains two side-by-side latching pawls 140. See FIGS. 12 and 13. Each latching pawl 140 is bent downward toward the back of the wiring device at an angle of about 40 degrees more or less. After the wiring device is attached to the alignment plate, the two latching pawls 140 at the ends 147 of the multi-function clip 130 attached to the bottom end of the ground/mounting strap straddle downwardly extending tab 120 on the alignment plate. Tab 120 (see FIG. 36) which is a part of alignment plate 114 functions as a tool pivot point to allow a wall plate 138 to be easily removed from around a switch or receptacle. A slot 74, FIG. 5, in the lower edge of the wall plate 138 provides access for the insertion of a small flat tool such as a screw driver to facilitate removal of the wall plate from the wiring device.

Wall plate 138 is proportioned to fit over alignment plate 114, the ends 122 of the ground/mounting strap 123 and the box within which the wiring device is located. The wall plate 138 is located around the wiring device and locked in position by pushing the wall plate toward the wiring device until the ends of the latching pawls on the multi-function clips 130, 151 engage the tooth shaped racks 80 on the inside wall of the top and bottom edges of the wall plate.

Figure 15:
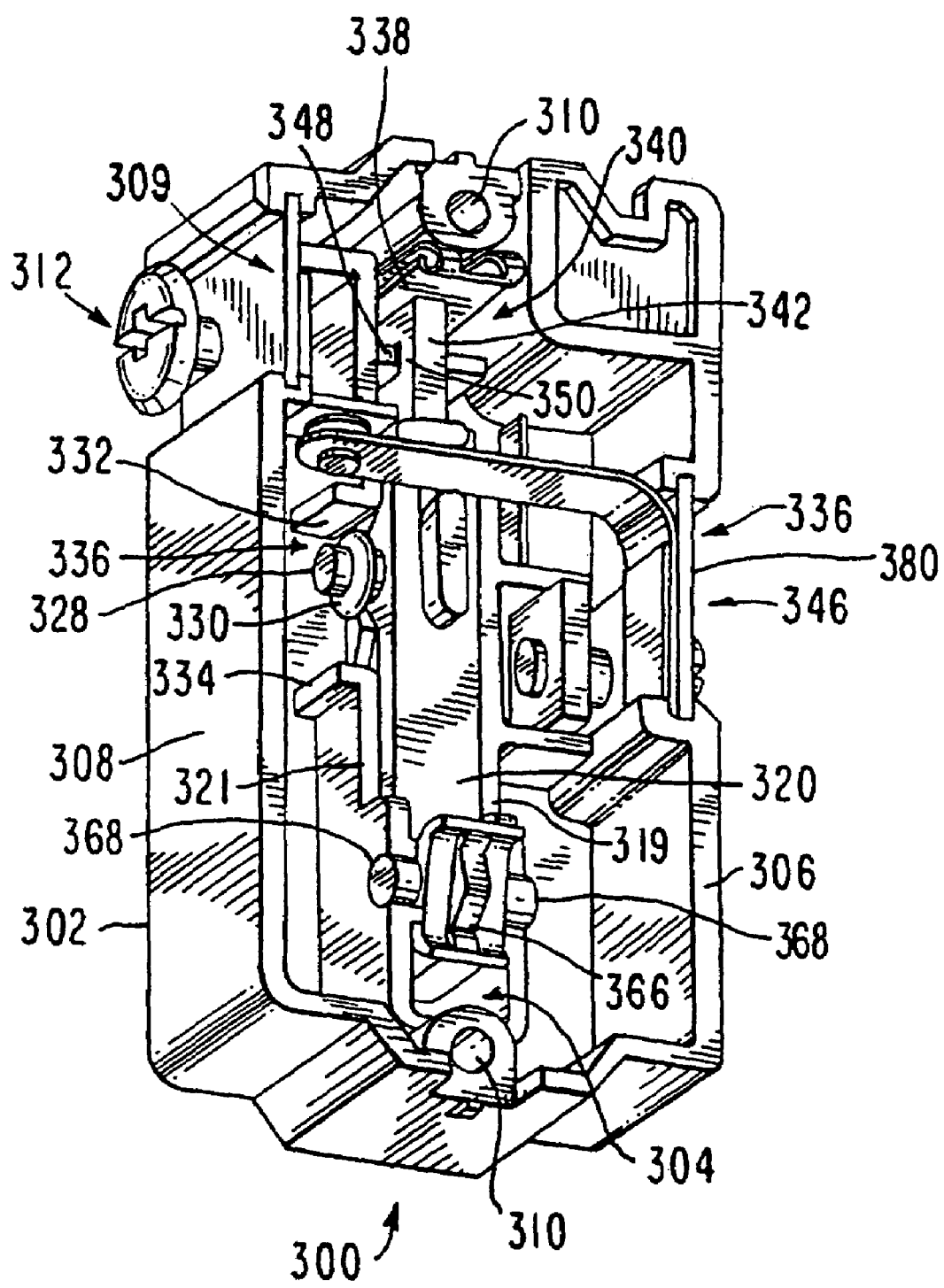
FIG. 15 is a perspective view of the base assembly of the switch of FIG. 14.
Figure 16:
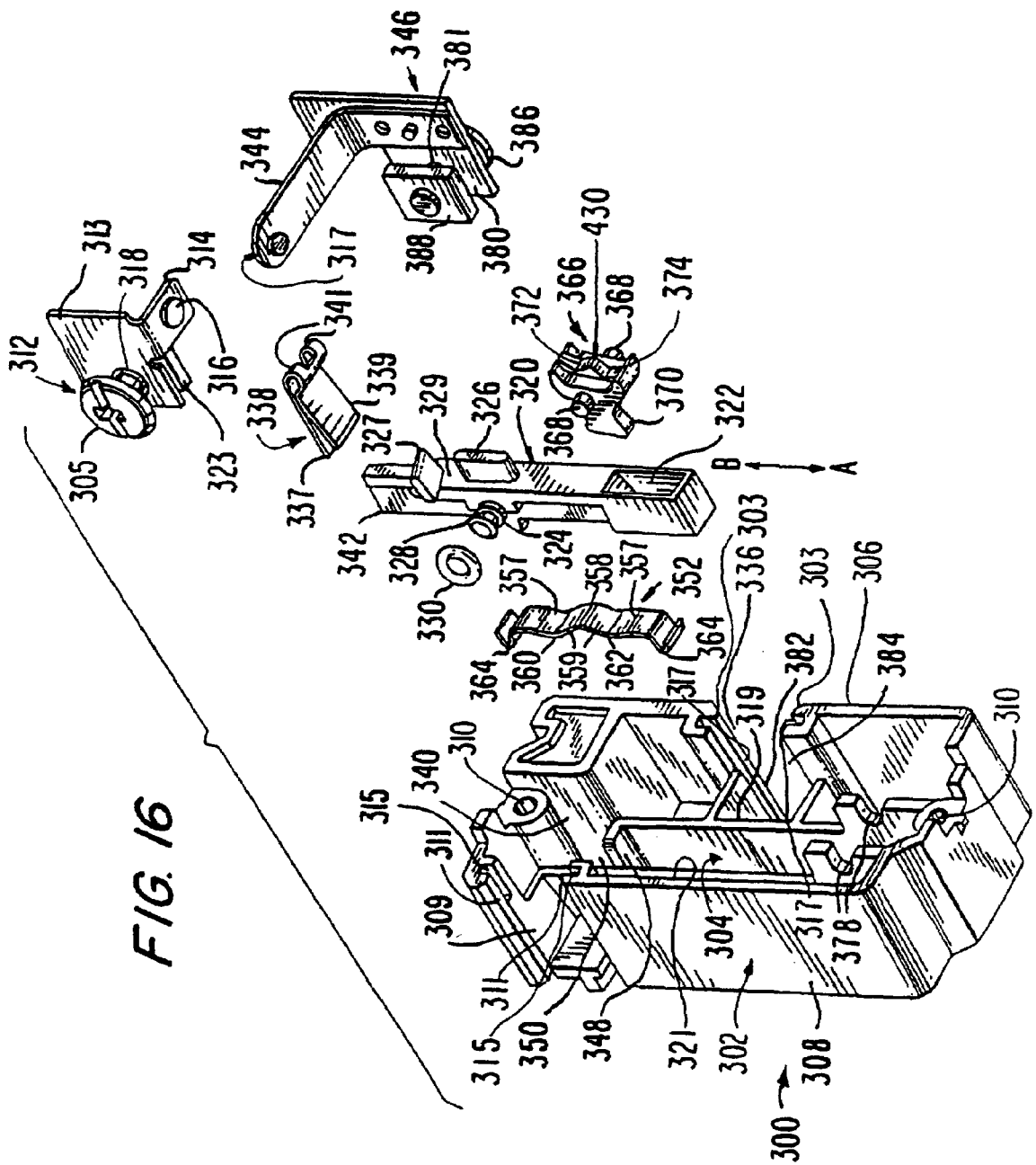
FIG. 16 is an exploded perspective view of the structure of the base assembly of FIG. 15.
Figure 21A:
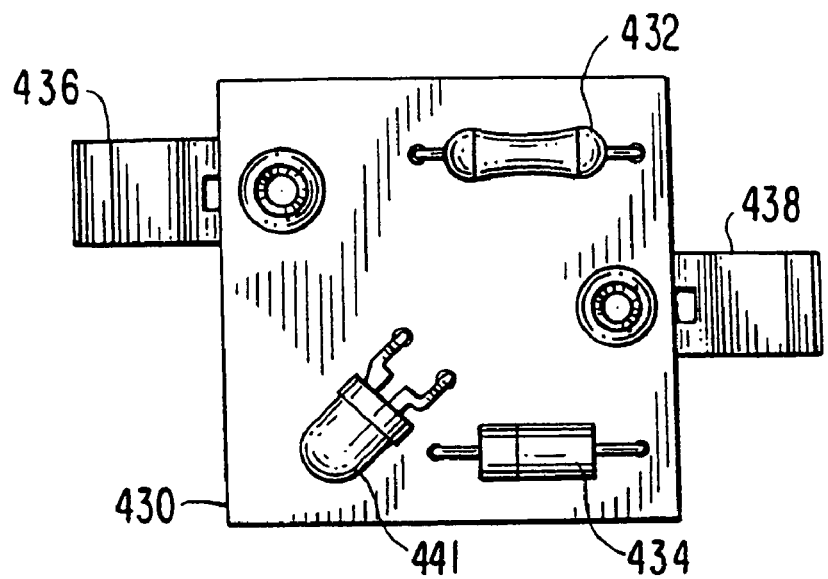
FIG. 21A is a plan view of the printed circuit board of FIG. 20.
Figure 21B:
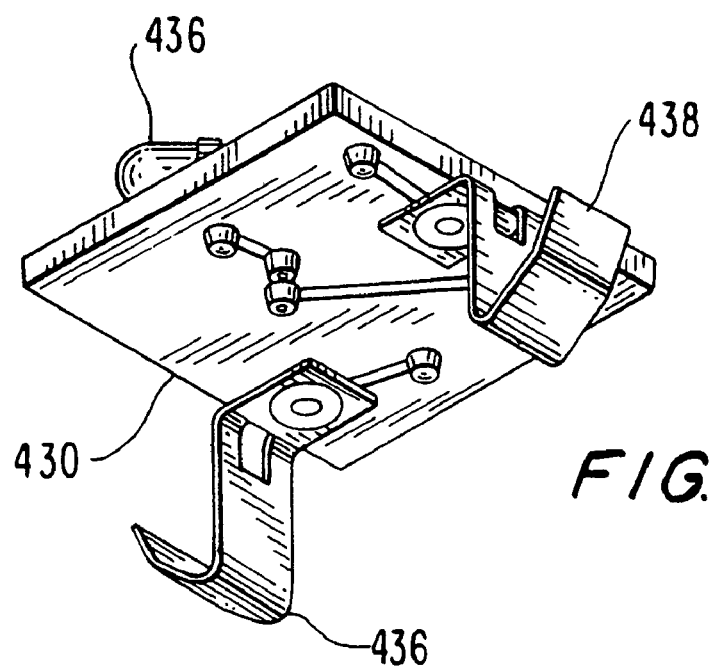
FIG. 21B is a bottom perspective view of the printed circuit board of FIG. 21A.
Figure 22:
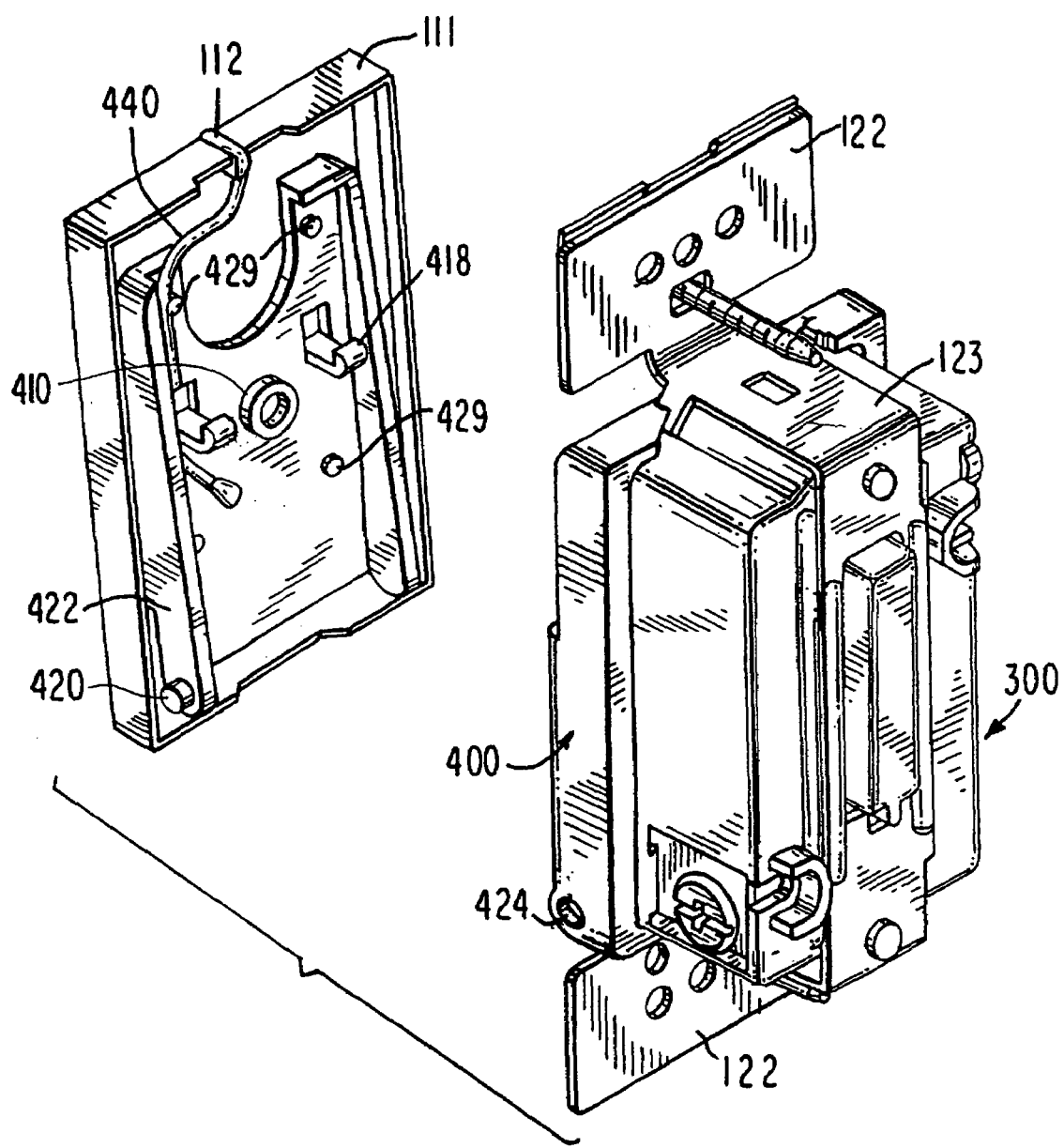
FIG. 22 is a perspective exploded view showing a light pipe in the paddle of the switch.
Figure 23:
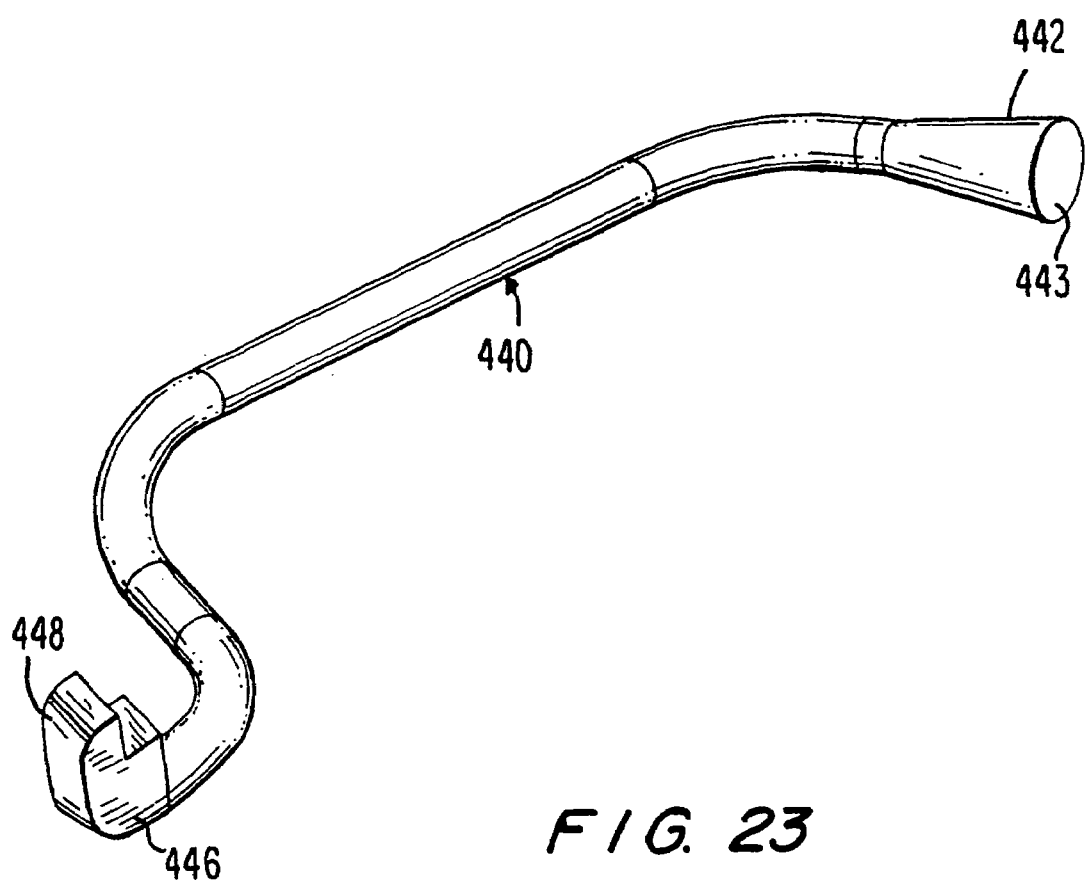
FIG. 23 is a perspective view of the light pipe.
Figure 24:
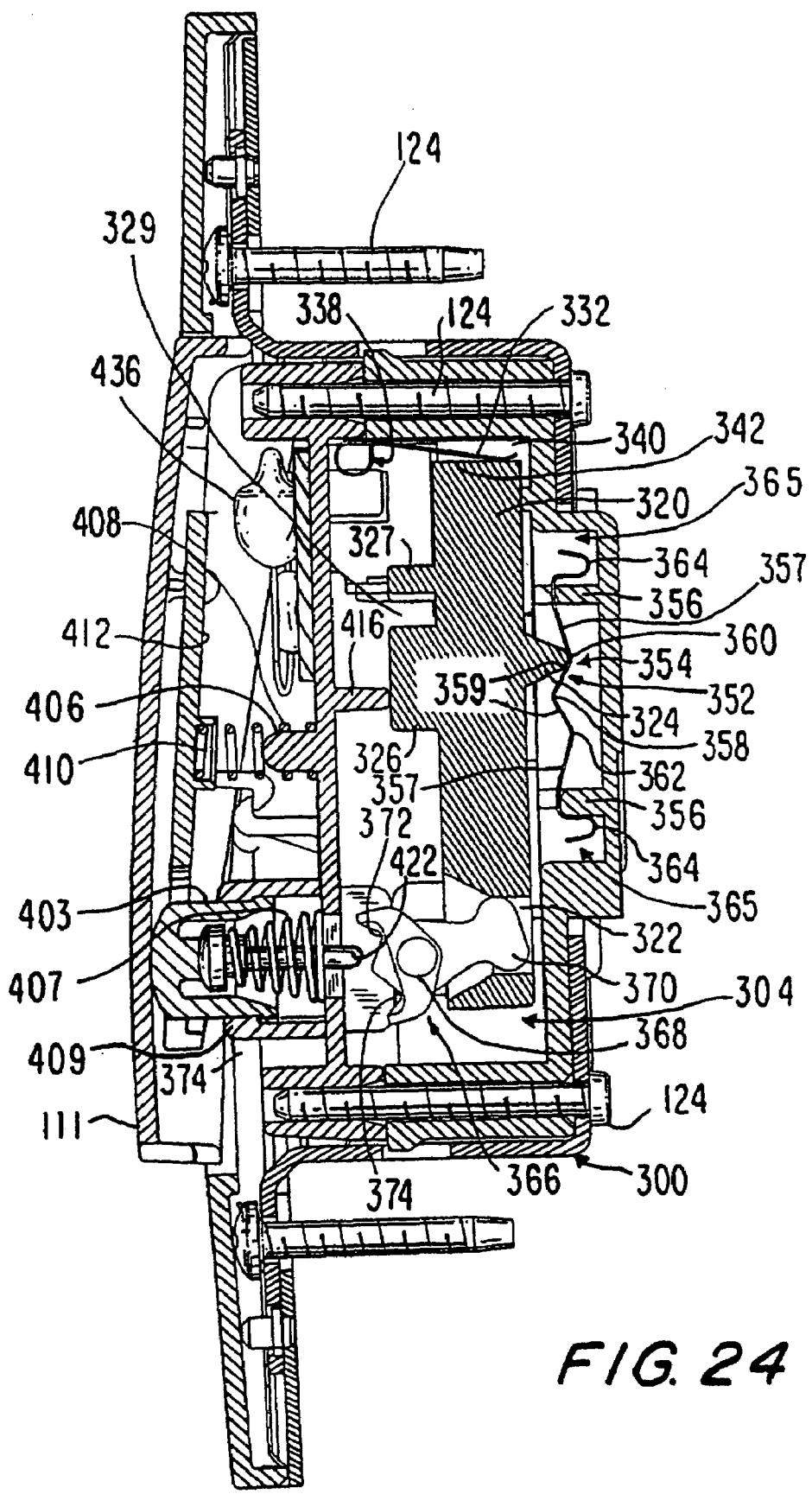
FIG. 24 is a sectional view taken along the line 24—24 of the switch of FIG. 3.

Referring to FIGS. 14–24, there is shown views of the switch shown generally in FIGS. 3–5 where FIG. 14 (which illustrates one of several construction embodiments of the present invention, shows a flexible actuator, as opposed to an alternative embodiment where a plunger/joystick mechanism may be used) is a exploded perspective view of the switch; FIG. 15 is a perspective view of the base assembly of the switch of FIG. 14; FIG. 16 is an exploded perspective view of the base assembly of FIG. 15; FIG. 17 is another exploded perspective view of the switch; FIG. 18 is still another exploded perspective view of the switch; FIG. 19 is a partial sectional exploded view of the cam driver of the switch; FIG. 20 is a perspective exploded view of the switch including a printed circuit board; FIG. 21A is a plan view of the printed circuit board; FIG. 21B is a bottom perspective view of the printed circuit board; FIG. 22 is a perspective exploded view showing a light pipe in the paddle of the switch; FIG. 23 is a perspective view of the light pipe; and, FIG. 24 is a sectional view along the line 24—24 of the switch of FIG. 3.

Referring to FIGS. 14 and 17, there is shown exploded views of base assembly 300 and frame assembly 400 which, when joined together and coupled to the rocker paddle 11 forms the single pole switch 110. FIG. 15 shows a perspective top view of the various parts in base assembly 300 of switch 110. Base assembly 300 includes shell member 302 composed of electrically insulating material and having a longitudinal channel 304 which extends along the length of shell member 302 and is centrally located between the side walls 306, 308 of member 302. Channel 304 is sized to receive a slider 320 (more fully shown in FIG. 16) which can slide back and forth in channel 304. Located in shell member 302 and beyond each end of channel 304 are clearance openings 310 for receiving fastening means 124 (see FIG. 18) such as rivets, screws or the like which secures the ground/mounting strap 123, the base assembly 300 and the frame assembly 400 to each other. Side wall 308 of the shell member 302 has an opening 309 (see FIG. 16) adapted to receive a stationary terminal assembly 312, and side wall 306 has an opening 384 for receiving brush terminal assembly 346, each more fully shown in FIG. 16.

Referring to FIG. 16, stationary terminal assembly 312 which is of conducting material such as brass, etc. consists of a rectangular plate 313 and a substantially non-yielding contact bearing arm 314 bent at a right angle to the plate and having a contact 316. A slot 318 located in rectangular plate 313 is a clearance opening for terminal screw 305 which threads into pressure plate 323 located behind rectangular plate 313. In operation, as terminal screw 305 is tightened, the bottom surface of the head of terminal screw 305 and pressure plate 323 move toward each other to clamp the rectangular plate 313. Stationary terminal assembly 312 is provided for connection to an electrical conductor by either placing a turn of electrical conductor such as a wire under the head of the terminal screw 305 or by inserting a straight end of the conductor between the pressure plate 323 and the rectangular plate 313, and then tightening terminal screw 305 to lock the conductor between plates 313 and 323, or the plate 313 and the head of the screw 305. Looking at side wall 308 of shell member 302, each of the two side edges 311 of opening 309 has a vertical slot or rail 315 for receiving and holding the side edges of rectangular plate 313 of the stationary terminal assembly. Sliding the rectangular plate 313 down into the slots or rails 315 in the edges of the opening 309 positions and holds the stationary terminal assembly 312 in position within opening 309 of side wall 308 of shell member 302.

Brush terminal assembly 346 includes a rectangular plate 380 composed of electrical conducting material such as brass etc., which supports a yieldable contact bearing arm 344 having a contact 307. A slot 381 located in rectangular plate 380 is a clearance opening for terminal screw 386 which freely passes through the slot 381 and threads into pressure plate 388. Tightening terminal screw 386 clamps the rectangular plate 380 between the bottom surface of the head of the terminal screw 386 and the pressure plate 388. Brush terminal assembly 346 is provided for connection to an electrical conductor by either placing a turn of the conductor under the head of the screw or inserting a straight end of the conductor between the pressure plate 388 and the rectangular plate 380. Tightening the screw 386 locks the conductor between the screw head and rectangular plate 380, or between plate 380 and pressure plate 388. Looking at side wall 306 of shell member 302, the two edges 303 of opening 384 each has a narrow vertical slot or rail 317 for receiving and holding the side edges of rectangular plate 380. Sliding rectangular plate 380 of brush terminal assembly 346 down into slots or rails 317 in the edges 303 of opening 384 positions and holds the brush terminal assembly in opening 384 of the side wall 306 of the shell member 302.

The stationary terminal assembly 312 and the brush terminal assembly 346 are made of conductive material so that a circuit can be completed between the conductive wires connected to screw terminals 305 and 386. Preferably, the conductive components of the switch are all of substantial grade, good quality electrical materials so that substantial currents, for example 10 to 20 amperes, can repeatedly be carried for extended periods of time without significant heat generation, electrical losses or excessive arcing. Such materials can include silver alloys for the contacts, beryllium copper alloy for the brush arm and brass for the remaining conductive components.

Referring to FIGS. 15 and 16, slider 320, when positioned within longitudinal channel 304 can freely slide back and forth between the side walls 319, 321 from one end of the channel to the other end of the channel. Slider 320 has, at one end, a rectangular funnel shaped slot opening 322 which extends completely through the slider and is provided to receive cam follower 370 of cam 366. It is understood that the rectangular funnel shaped slot opening 322 is not restricted to an end of the slider, but can be located anywhere along the slider. Projecting downward from the bottom surface of slider 320 and about mid-way between the ends of the slider is a triangular shaped cam follower 324. Projecting upward from the top surface of the slider 320 and about mid-way between the slider ends is a hold down projection 326. Also projecting upward from the top surface of the slider is a brush terminal control projection 327. The space 329 between hold down projection 326 and brush terminal control projection 327 is provided to receive yieldable contact arm 344 of brush terminal assembly 346. When yieldable contact arm 344 is positioned in space 329, arm 344 is stressed in direction A and, therefore, pushes against projection 327 and urges the slider to move in direction B. Movement of the slider 320 in direction "A" will cause projection 327 to urge yieldable contact arm 344 to bend in direction A and move away from stationary contact 316. Movement of the slider 320 in direction "B" causes brush terminal control projection 327 to move in direction B which allows yieldable contact arm 344 to spring back and allow contact 327 to make electrical contact with stationary contact 316. A bumper support member 328 which projects outward from the side of the slider 320 provides support for a rubber O ring 330. With the slider located in longitudinal channel 304, O ring 330 moves back and forth between stops 332, 334 of opening 336 in side wall 321 (see FIG. 15) as the slider is driven from one end of channel 304 to the other. The O ring 330 is used to cushion the stopping of the slider 320 by contacting stops 332, 334 located at the ends of opening 336 in wall 321. Contact 317 of brush terminal assembly 346 (see FIG. 16) is biased by yieldable contact arm 344 to move toward stationary contact 316. To help offset some of the force exerted by arm 344 which urges slider 320 in direction B, a helper spring 338 is provided. Helper spring 338 also helps to balance the feel of the rocker paddle 111 as the switch is operated.

Yieldable contact arm 344 of brush terminal assembly 346 is spring biased to move contact 317 toward stationary contact 316. Therefore, more force is needed by the slider 320 to move contact 317 on yieldable contact arm 344 out of engagement with stationary contact 316 than is needed to close the contacts. Referring to FIG. 16, helper spring 338 is used to help overcome this force. Helper spring 338 is a strip of flat spring metal folded about its center with a generous radius to have two legs 337, 339 which form an inverted V. The inverted V shaped helper spring 338 fits in chamber 340 at one end of channel 304 (see FIGS. 15 and 16) with the apex of the V being at the top of the chamber. As slider 320 is moved in direction B, the spring bias of yieldable contact arm 344 assists in closing contacts 316, 317. As the slider continues to move and the contacts close, the end 342 of slider 320 contacts leg 339 of helper spring 338 and urges it to move toward leg 337. At this time, helper spring 338 is compressed and biases slider 320 to move in direction A. When the contacts 316, 317 are being opened, helper spring 338 urges slider 320 to move against the force of the yieldable contact arm 344. Thus, helper spring 338 helps to overcome the force exerted by the yieldable contact arm 344 of the brush terminal assembly 346 as the yieldable contact arm 344 is being moved in direction A by the slider 320 to open contacts 316, 317.

Wall 348 at an end of chamber 340 contains a slot opening 350 which allows the end 342 of slider 320 to enter chamber 340 and engage and move leg 339 toward leg 337 of helper spring 338. Wall 348 helps to keep helper spring 338 within the chamber 340.

As seen in FIG. 24, located directly beneath longitudinal channel 304 and opening into channel 304 is spring chamber 354. Spring chamber 354 is elongated, has a rectangular cross-section and contains a flat cam shaped leaf spring 352. The spring chamber 354 can be centrally and symmetrically disposed in the base assembly 302 and has support bars 356 spaced from each end for supporting flat cam shaped leaf spring 352. Located beyond each support bar 356 is an end pocket 365. The overall length of spring chamber 354 is determined by the length of the flat cam shaped leaf spring 352.

Flat cam shaped leaf spring 352 can be formed from a flat strip of spring steel to form a flat cam shaped leaf spring having a profile substantially similar to that shown in FIGS. 16 and 24. The flat cam shaped leaf spring 352 has a profile that is symmetrical about a center apex 358. Moving along the spring 352 from the apex 358 to an end, the spring has a short down sloping cam portion 359 on each side of the apex 358 which, together with support sections 357 forms a valley 360, 362 at each side of the apex. The support sections 357 rest on support bars 356 and terminate in U shaped outer end portions 364 which resides in end pockets 365. The apex 358, the centrally located rise of the spring and the short down sloping cam portions 359 on each side of the apex and joined by support sections 357 provide a surface discontinuity rather than a smooth transition for the cam follower 324 as it travels over the apex 358.

Continuing with FIGS. 16 and 24, cam 366 is used to urge the slider 320 to move back and forth in longitudinal channel 304 to open and close the contacts 316,317 of the switch. Cam 366 has two cylindrical shaped projections 368 aligned with each other and which extend out from the sides to form a support shaft rotatably received by support bearing openings 378 located in side walls 319, 321 of the longitudinal channel 304. In operation, cam 366 rocks back and forth in a clockwise and counterclockwise direction about the axel defined by the projections 368. Extending downward and below the cylindrical shaped projections 368 is cam follower 370 which fits in the rectangular funnel shaped slot opening 322 in slider 320 with minimum clearance. Extending upward from projections 368 is cam control surface 430 (see FIG. 16) having a first pocket 374 located at the left of the cam, and a second pocket 372 located at the right of the cam, see FIG. 24. Looking at the profile of the cam 366 as shown in FIG. 24, pocket 372 is at the right side of the axes of rotation of the cam, and pocket 374 is at the left side of the axes of rotation of the cam. Thus, when the slider is at its right hand position, application of a downward force on pocket 372 will cause the cam follower 370 to rotate in a clockwise direction to cause slider 320 to move to the left. In a similar way, application of a downward force on pocket 374, when the slider is at its left hand position, will cause the cam follower 370 to rotate in a counterclockwise direction to cause the slider to move to the right. Thus, pressing down on pocket 372 causes the cam to rotate clockwise which causes the cam follower 370 to move the slider to the left. Thereafter, pressing down on pocket 374 will now cause the cam to rotate counterclockwise to cause the cam follower to move the slider to the right. Alternately pressing on pockets 372 and 374 will cause the slider to move back and forth, first in one direction and then in the other direction.

Referring to FIGS. 14, 17 and 18, projecting upward from the bottom floor member 401 of frame assembly 400, and of the same material as the floor member, are two hook shaped members 396 which are provided to engage and pivotly hold cooperating hook members 418 (see FIG. 17) which project down from subplate 412 attached to rocker paddle 111. Frame assembly 400 includes a clearance opening 402 located in floor member 401 which is aligned with the top of cam 366 and through which an actuator 405 (See FIGS. 18 and 19) of cam driver 431 projects to engage and operate cam 366. The opening 402 is at the bottom of an upwardly projecting cylinder and is adapted to receive a cover plate 404 (see FIG. 19) having an opening 402 through which actuator 405 (see FIGS. 18 and 19) of cam driver 431 projects through to engage and operate cam 366.

Looking at FIG. 19, cam 366 is operated by cam driver 431 which consists of a cylindrical shaped member 409, a plunger 403, an actuator 405, and a conical shaped coil spring 407. The cam driver 431 engages and drives cam 366, first in a clockwise direction, then in a counter-clockwise direction each time plunger 403 is moved down. The open ended cylindrical shaped member 409 is an integral part of the frame 400, but is shown as a separate part for clarity. In the actual device, member 409 projects upward from the top surface of floor member 401 of frame assembly 400. Member 409 contains a first opening 413 at its lower end and a second opening 415 at its upper end. The first opening 413 at the lower end of the cylindrical shaped member 409 is sufficiently large to avoid obstructing or interfering with clearance opening 399 located in cover plate 404 when cover plate 404 is coupled to the bottom surface of floor member 401. The cylindrical shaped member 409 supports an internal ridge 417 located between openings 413, 415.

To assemble the cam driver (FIG. 19) plunger 403 is inserted through opening 399 in the floor member 401 and into member 409. Plunger 403 slidably fits within member 409. The outside diameter of plunger 403 is slightly smaller than the diameter of opening 415 in the upper end of cylindrical shaped member 409 to allow plunger 403 to move up and down in opening 415 without binding. Plunger 403 has a skirt 433 which forms an external, outwardly projecting ridge 429. Shoulder 417 in cylindrical shaped member 409 and ridge 429 on plunger 403 engage each other to keep plunger 403 captive within member 409.

Actuator 405 is then inserted through opening 399 and into plunger 403. Actuator 405, which can be composed of a metal such as brass or steel, or of a plastic having suitable characteristics, is a shaft 421 having a generous radius at one end 422 and first 423 and second 425 collars at the other end. Collar 423 is smaller in diameter than collar 425 and collar 423 has a diameter slightly larger than the inside diameter of the apex of conical spring 407 and fits into and frictionally engages the apex end of spring 407. The end of collar 425 is located within opening 428 of plunger 403 and contacts internal projection 427.

Thereafter, spring 407 is inserted through opening 399 in the floor member 401 and onto shaft 421 of the actuator 405. Spring 407 has a conical shape, the apex of which is wrapped around and frictionally engages collar 423 and the base of spring 407 has a diameter that is large enough to extend beyond clearance opening 399 in cover plate 404 when said plate 404 is secured to the bottom surface of the floor member 401 to avoid interfering with shaft 421 as it moves up and down and pivots back and forth in rectangular clearance opening 399. Thereafter, cover plate 404 is positioned to cover opening 402 in the floor member 401 and is securely coupled to the bottom surface of the floor member 401 with adhesive or the like. Clearance opening 402 in the cover plate 404 can have a long dimension along the length of the switch and a small dimension along the width of the switch. The small dimension of opening 399 is slightly larger than the diameter of shaft 421 to permit the shaft 421 to move in opening 399 without binding and the long dimension of opening 399 allows shaft 421 to engage and freely rock back and forth while operating cam 366 without binding.

Referring to FIG. 18, cylindrical shaped member 409 which is an integral part of the floor member 401 and projects upward from said floor member is shown as being separated from said floor member for clarity only. If desired, a small projection 406 which extends upward from the floor member 401 of frame assembly 400 and of the same material as the floor member 401 can be provided to engage the lower end of a helical helper spring 408 (see FIG. 24) which can be used, if desired, to help urge the rocker paddle 111 to its out position. In normal use, spring 407, acting on plunger 403 through actuator 405 provides sufficient force to urge paddle 111 away from frame assembly 400. However, in those instances where additional force may be desired, helper spring 408 can be provided. The outside diameter of the projection 406 (see FIGS. 14 and 24) is slightly larger than the inside diameter of helical helper spring 408 and is inserted into the lower end of the helical helper spring. The upper end of helical helper spring 408 can be located within and held captive in a pocket 410 (see FIGS. 17 and 24) located on subplate 412. Subplate 412 is secured to the underside of the rocker paddle 111 by adhesive and/or by plastic locking projections which extend from the underside of the rocker paddle 111, pass through openings 429 in the subplate and are then staked over, or the like.

Referring to FIG. 17, there is shown an exploded perspective view of the bottom of base assembly 300, frame assembly 400 and rocker paddle 111 of a single pole switch. Referring to the frame assembly 400 which can be a unitary member formed of a suitable plastic, two projections 414 which are a part of the cover plate 404 extend out from the bottom surface of the floor 401 are positioned to contact the top surface of the axel support shaft formed by the aligned cylindrical projections 368 of the cam 366. Projections 414 help prevent the cylindrical projections 368 from moving out of their bearing surfaces in the side walls of the longitudinal slider receiving channel. Also projecting downward from the bottom surface of the frame assembly 400 is slider hold down projection 416 which slidably contacts hold down projection 326 on slider 320. Projection 416, by contacting projection 326 on slider 330, prevents slider 320 from being pushed up and out of channel 304 by the upward force of flat cam shaped leaf spring 352 pushing up on cam follower 324.

Subplate 412, which is attached to the underside of rocker paddle 111, is a unitary member of a plastic material having two hook shaped members 418 formed thereon which project down from the bottom surface. The hook shaped members 418 are positioned to engage hooks 396 (see FIG. 14) on frame assembly 400. Hooks 418, when engaged by hooks 396, allow the rocker paddle 111 to pivot about studs 420 rotatably coupled to openings 424 toward and away from the frame assembly 400 and, at the same time, prevent the subplate 412 and attached rocker paddle 111 from being separated from the frame assembly 400. If desired, a downward extending ring can be provided on the subplate 412 which is aligned with projection 406 on the frame assembly 400 to hold the ends of helical helper spring 408 in position when a helper spring is used. The inside diameter of ring 410 should be slightly larger than the outside diameter of the helical helper spring to permit the end of the helper spring to be placed within ring 410.

Two arms 422 which project beyond the rear end of the subplate 412 each supports a circular stud 420, one on the outside surface of each arm, which are axially aligned with each other to form a common axel. The circular studs 420 snap into openings 424 in the frame assembly 400 to form a hinge about which the subplate 412 and the rocker paddle 111 pivot relative to the frame and base assemblies. The subplate 412 is secured to the bottom surface of the rocker paddle 111 with an adhesive and/or plastic locking projections or the like to form a unitary assembly.

The switch here disclosed has an on-off indicator 112 such as a light to indicate to a user when the switch is in its conducting state and in its non-conducting state. The light can be of a color or white. In practice, a blue light was found to be preferred. Referring to FIGS. 21A and 21B, there is shown a top plan view and a bottom perspective view of a Printed Circuit Board (PCB) 430 which fits within frame assembly 400. Located on the top surface (FIG. 21A) of the PCB 430 is resistor 432, diode 434 and LED 441 connected to spring terminals 436, 438. Referring to FIG. 14, frame assembly 400 fits on top of base assembly 300 and has openings for spring terminals 436, 438 to project through the frame assembly and make contact with plate 313 of the stationary terminal assembly 312 and plate 380 of the brush terminal assembly 346 to supply power to the PCB. The LED 441 on the PCB indicates the conductive state of the switch by being "on" or "off". In operation, LED 441 is "on" when the contacts of the switch are open, and the LED is "off" when the contacts of the switch are closed. FIG. 21B shows the conductive paths between the spring terminals and the electrical components.

Referring now to FIG. 23, there is shown a light pipe 440 which is connected to the underside of the rocker paddle 111 (see FIG. 22) to optically connect the LED on the PCB to an opening in the lower edge of the rocker paddle 111. One end 442 of the light pipe, which is positioned to receive light from the LED, has a spherical face 443 for receiving light from the LED, and the other end 446 of the light pipe has a diffuser texture exit surface 448 which is the indicator 112 in the edge of the rocker paddle 111 for indicating to a user the conductive state of the switch. The light pipe can have any desired serpentine shape to provide flexibility when positioning the PCB having the LED within the switch. In another embodiment, the indicator 112 can be located to be at any place on the rocker paddle 111.

Referring to FIG. 24, as the switch is assembled, the helper spring 338 is inserted into chamber 340, flat cam shaped leaf spring 352 is placed into spring chamber 354 and slider 320 is placed into longitudinal channel 304 and above leaf spring 352. The end 342 of the slider 320 faces the helper spring 338 and the triangular shaped cam follower 324, which projects from the bottom of the slider, slidably engages the top surface of flat cam shaped leaf spring 352. Cylindrical projections 368 of cam 366 are placed within bearing surface openings 378 in side walls 319, 321 of longitudinal channel 304 with cam follower 370 being positioned within rectangular funnel shaped slot opening 322 of slider 320. Stationary terminal assembly 312 is positioned in the opening 309, and brush terminal assembly 346 is positioned within opening 384. As the brush terminal assembly 346 is being placed in position, the yieldable contact arm 344 is moved backward against the force of the spring arm and is positioned within slot 329 located between the hold down projection 326 and the brush terminal control projection 327 of slider 320. At this time all the various components are within the switch base 300.

Referring now to the frame assembly 400 (see FIG. 18) and the cam driver 431 (see FIG. 19) which is coupled to and is an integral part of the frame assembly. Cam driver 431 has a plunger 403 which is positioned within cylindrical shaped member 409 by inserting the plunger 403 through the bottom opening 413 of the cylindrical shaped member 409 which projects upward from the top surface of the floor member 401 until the outwardly extending ridge 429 formed by the projecting skirt 433 engages inwardly projecting shoulder 417 in cylindrical shaped member 409. Thereafter, actuator 405 is inserted through the bottom opening of the cylindrical shaped member 409 and into the plunger 403 until the top convex surface of collar 425 contacts internal projection 427 which extends downward from the inside surface of the top of the plunger 403. The convex top surface of collar 425 is provided to allow the actuator 405 to more easily rock back and forth as it moves down and contacts cam 366. Conical shaped coil spring 407 is now placed around the actuator 405 with the apex of the coil spring being positioned around the collar 423. At this time the cover plate 404 is attached to the bottom surface of the floor member 401 and positioned to allow the shaft 421 to extend through the opening 399. The PCB board is now positioned on to the floor member 401 with the spring contacts 436, 438 extending thru the openings in the floor member 401 to make electrical contact with stationary terminal assembly 312 and brush terminal assembly 346.

The frame assemblage 400, which includes the PCB having the LED, resistor, diode and spring terminals 436, 438, is now placed over the switch base assembly 300 and the ground/mounting strap 123 is attached to base assembly 300 with screws, drive pins, rivets or the like to connect the ground/mounting strap 123, switch base assemblage and frame assemblage together. In the embodiment shown, when the rocker paddle 111 is attached to the frame 400, the conical shaped coil spring 407, acting through the plunger 403, exerts an upward force on the rocker paddle 111 and, in addition, spring 407 urges the plunger to its extended out position. The subplate 412 has a cutout 441 through which the plunger 403 passes to contact the underside of the rocker paddle 111. Thus, the top surface of the plunger 403 contacts the bottom surface of the rocker paddle 111 and it is the upward force of the spring 407 which biases the paddle to its outward position and which a user must overcome when pressing on the paddle. In some instances, it may be desirable to have a switch which requires a greater force to operate. If a greater force is desired, it can be obtained with helical spring 408 where the lower end is placed over projection 406 on the frame and the top is placed within the pocket 410 of the subplate. The light pipe 440 is attached to the underside of the subplate and the end 443 is located to receive light from the LED and the end 446 is positioned in the opening in the bottom edge of the paddle and is the indicator which shows the conductive state of the switch. The projections 420 on the arms 422 of the subplate 412 are snapped into the openings 424 in the frame assembly 400 to form the hinge about which the rocker paddle 111 and the frame assembly 400 pivot relative to each other. Thereafter the rocker paddle 111 which includes the subplate 412, is pressed down toward the frame assembly until hooks 418 engage hooks 396. At this time the bottom or underside of the paddle contacts the top surface of the plunger 403 and the application of finger pressure on the rocker paddle will move it toward the frame assembly against the force of spring 407 to drive the shaft 421 of the actuator 405 down through opening 402 to engage the cam eccentric surfaces 372, 374 and operate cam 366.

FIG. 24 is a sectional view of a single pole switch where the contacts of the switch are closed and the switch is in its conducting state. The next time the rocker paddle is pressed, actuator 405, acting against the force of spring 407, is urged to move down to contact the ramp of cam 366 and slide toward the right and enter pocket 372. Continued pressing on the paddle causes the actuator 405 to continue to move down and rotate cam 366 clockwise about cylindrical projections 368. This causes cam follower 370 to rotate in a clockwise direction and move slider 320 to the left. As slider 320 moves to the left, the triangular shaped cam follower 324 moves out of depression 360 of the flat cam shaped leaf spring and across the right support section 359 toward the centrally located apex 358. As the slider continues to move to the left, triangular shaped cam 324 deflects leaf spring 352 downward because projection 326 on slider 320, in cooperation with slider hold down projection 416, prevents the slider 320 from moving upward. As the triangular shaped cam 324 moves over the top of apex 358 of the cam shaped leaf spring and toward the left support section 359 of the apex, the leaf spring starts to spring back to its original unstressed up position. This upward movement of the leaf spring, acting on the shaped cam follower 324, helps drive the cam follower 324 and the slider 320 to the left until the cam follower 324 comes to rest in depression 362. At this time the contacts of the switch are separated from each other and the switch is in its off state. Thus, the cam shaped leaf spring 352, in combination with the cam follower 324 helps to move the slider to either the left or right depressions 362, 360 to help open and close the contacts. The next time that the rocker paddle is depressed, actuator 405 will enter pocket 374 of the cam to cause it to rotate in a counter-clockwise direction which will cause cam follower 324 on the slider to depress the leaf spring as it moves to the right. As the cam follower 324 continues to move to the right and as it passes apex 358, the depressed leaf spring starts to spring up to return to its original position. This upward movement of the leaf spring, in combination with the counterclockwise rotation of the cam 366 causes the cam follower 324 to move toward the right until it reaches depression 360 at which time the switch contacts are closed and the switch is in its on state. Continued pressing and releasing the rocker paddle of the switch alternately opens and closes the contacts of the switch. The state of conduction of the switch is displayed to a user by the absence or presence of light at the indicator 112 in the edge of rocker paddle 111. The light can be from an LED, a neon lamp or a pilot light on the PCB which is connected to the stationary and brush terminal assemblies. When the contacts of the switch are closed, there is no potential difference across the lamp and the lamp will remain dark. When the contacts of the switch are open, there will be a potential difference across the lamp and the lamp will be lit.

Figure 25A:
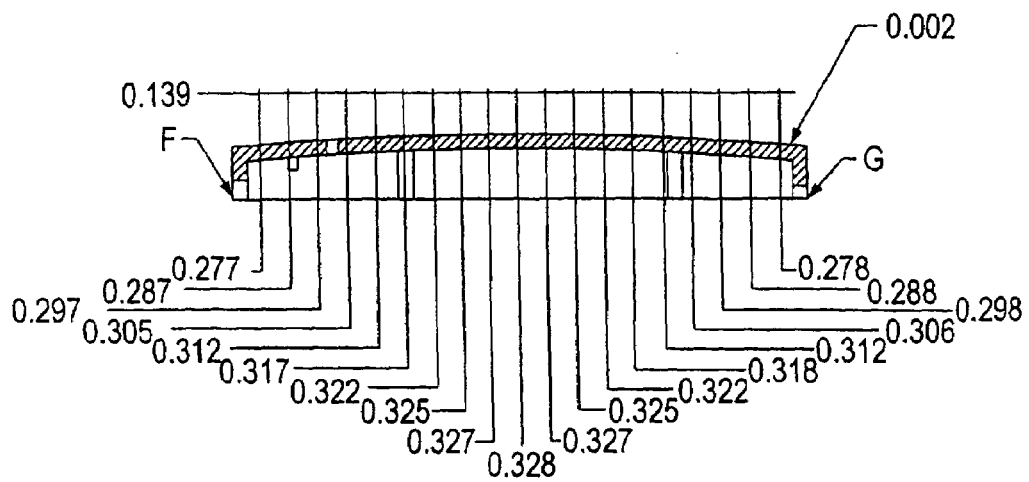
FIGS. 25A–25C are sectional views along the lines 25A—25A, 25B—25B, 25C—25C of the paddle of FIG. 14.
Figure 25B:
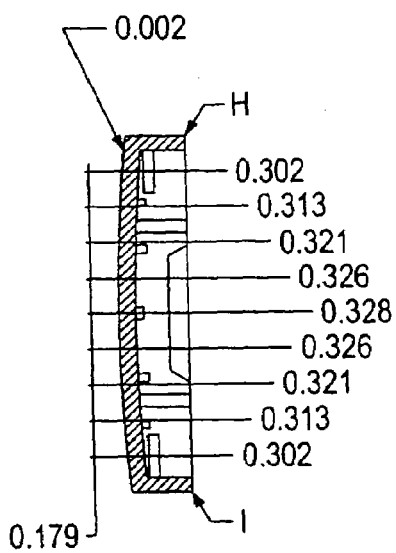
Figure 25C:
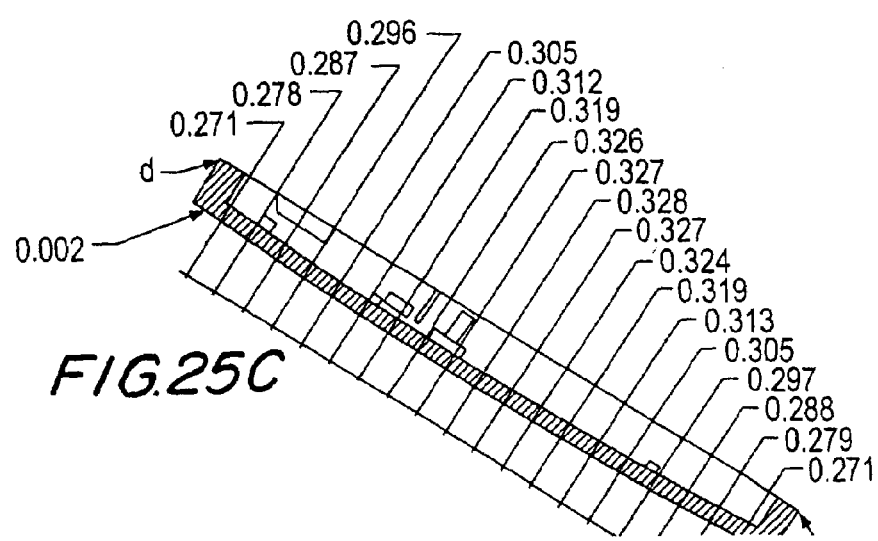

Referring to FIGS. 25A, 25B and 25C, there is shown sectional views of the rocker paddle of the switch of FIG. 14. FIG. 25A is a section along the line 25A—25A of FIG. 14; FIG. 25B is a section along the line 25B—25B of FIG. 14; and, FIG. 25C is a section along the line 25C—25C of FIG. 14. The width of the paddle is substantially 1.80 inches and the length of the paddle is substantially 2.77 inches. The face of the paddle has a vertical axis along its length and a horizontal axis along its width where the face of the paddle along its vertical axis has a surface of positive first differential comprised of a combination of splines drawn between points of varying distances from a datum plane and zero second differential where the rate of height increase of the individual splines is constant. The horizontal axis has a surface of a positive first differential and negative second differential comprised of a combination of splines drawn between points of varying distance from a datum plane. Referring to FIG. 25A, the surface along line 25A—25A lies between two profile boundaries substantially 0.139 inches apart, perpendicular to a datum plane equally disposed about the true profile and positioned with respect to a datum plane. The basic dimensions and the profile tolerance establish a tolerance zone to control the shape and size of the surface. The surface is substantially 2.77 inches in length. Within that length, a surface is defined by the dimensions of about twenty equidistant points which are about 0.139 inches apart. Each dimension indicates that point's distance to a datum plane, the back, flat surface of the rocker paddle 111. Moving from left to right in FIG. 25A, the dimensions increase from about 0.277 to about 0.328 inches at the center, and then decreases to about 0.278 inches at the right end. This progression defines a surface of increasing and then decreasing height where the points are connected by individual splines. The points are not connected by a single arc and the rate at which the surface height increases in not constant. The rate of height increase of the individual splines decreases from left to right to the center, and then increases from the center to the right end. Thus, the second differential of the surface is negative from each end toward the center. That is that the difference between some of the points distance dimension from an end toward the center decreases. Thus, from an end to the center, the surface has a contour of positive first differential and negative second differential, comprised of a combination of splices drawn between points of varying distance from a datum plane. This description substantially describes the paddle's face along the lines 25A—25A, 25B—25B and 25C—25C of FIG. 14.

The section along line 25B—25B of FIG. 14 which runs along the horizontal center line of the paddle is shown in FIG. 25B and defines a surface having positive first differential and substantially negative second differential from an end to the center line. The second differential is substantially negative because not all successive points have a constant increase.

The section along line 25C—25C of FIG. 14 which runs along the diagonal of the paddle is shown in FIG. 25C and defines a surface having a positive first differential and substantially negative second differential from an end to the center line. The second differential is substantially negative because not all successive points have a constant increase.

FIGS. 25A–25C disclose, in detail, the dimensions of the paddle and, therefore, in the interest of brevity, the dimensions shown in the FIGS. 25A, 25B and 25C are not here repeated.

Figure 26:
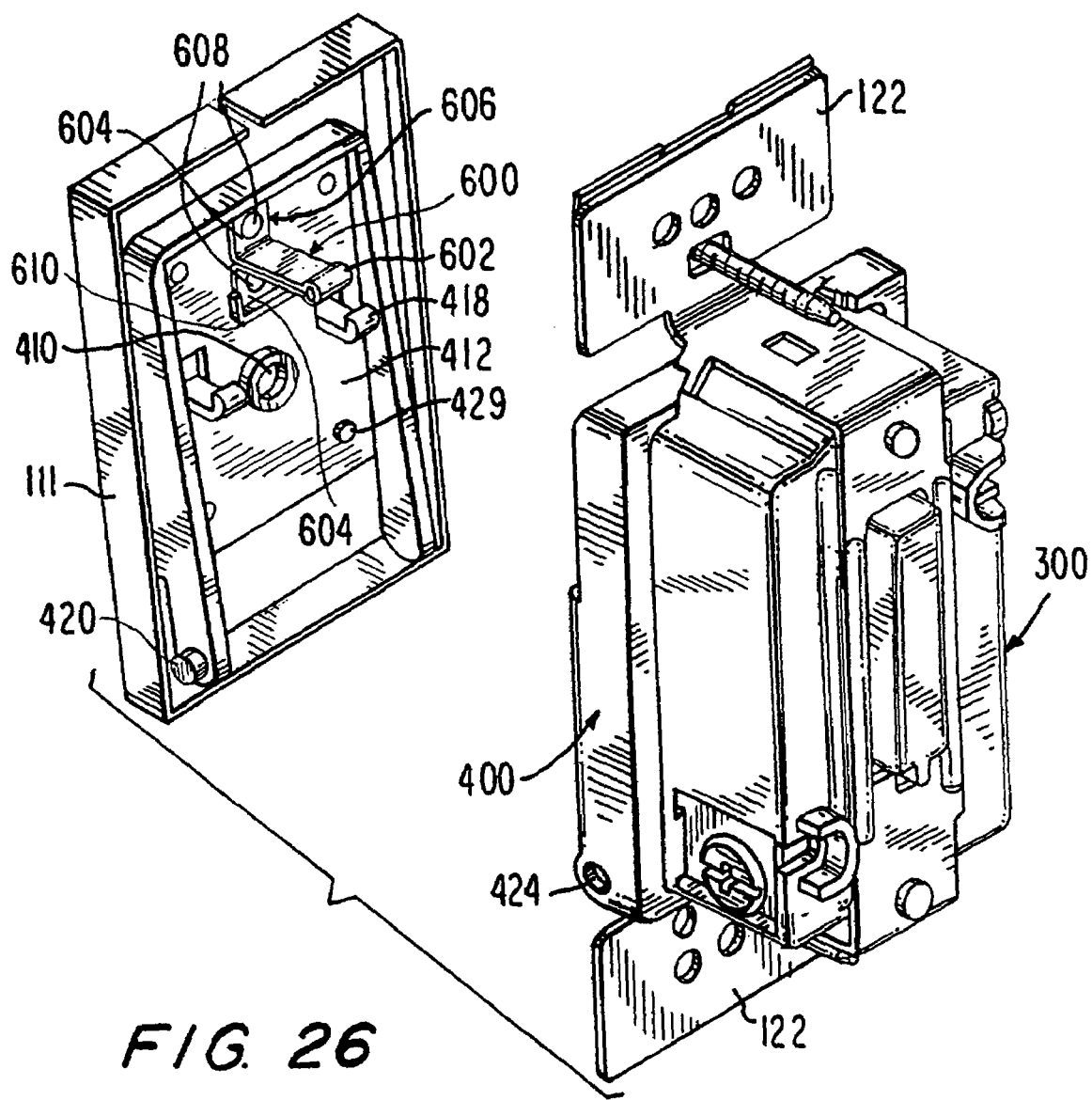
FIG. 26 is a perspective exploded view of the switch having another cam driver.
Figure 27:
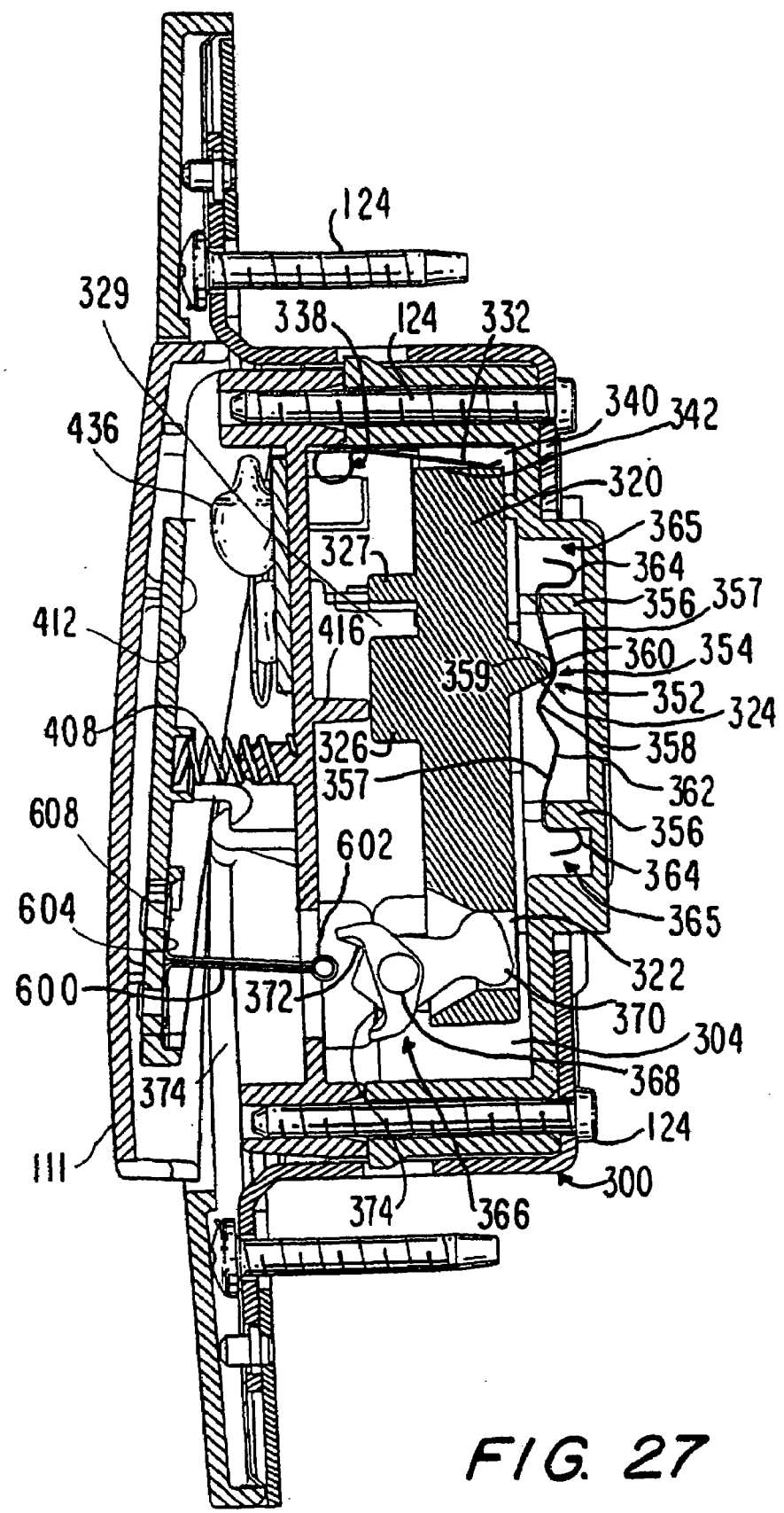
FIG. 27 is a sectional view along the line 24—24 of FIG. 3 where the cam driver is that shown in FIG. 26.

Referring to FIG. 26, there is shown an exploded view of the switch with another cam driver embodiment; and FIG. 27 is a sectional view along line 24—24 of FIG. 3 where the cam driver is that shown in FIG. 26. In this embodiment, the cam driver 431 shown in FIG. 19 is replaced with cam driver 600. Cain driver 600 is composed of a flat ribbon of semi-flexible material such as spring steel bent back upon itself at its center to form a blunt end 602 and having a generous radius which forms the blunt end 602 having a diameter which fits within the pockets 372, 374 of cam 366. The ends 606 of the cam driver are bent outward at 90 degrees to form two legs 604 which lie in the same plane and each of which has an opening 608 for receiving a holding member for attaching cam driver 600 to the subplate 412. In this embodiment, subplate 412 does not have cutout 433 (see FIG. 18), but is continuous to allow the cam driver 600 to be attached to the subplate. Cain driver 600 can be attached to the subplate with rivets, plastic projections which protrude from the subplate and pass through the openings 608 in the legs 604 which are deformed with heat to secure the cam driver to the subplate, or by any other method. In this embodiment, spring 408 is used to urge the paddle to its "up" at rest position. If desired, a channel 610 can be formed on the subplate 412 for positioning at least one of the legs 604. Except for the substitution of the cam driver 600 for the cam driver 431 disclosed in FIG. 19, and the absence of the cutout 433 in subplate 412, the construction and operation of the switch of the embodiment disclosed in FIGS. 26 and 27 is similar to that of the switch disclosed in FIGS. 14–24.

Figure 28:
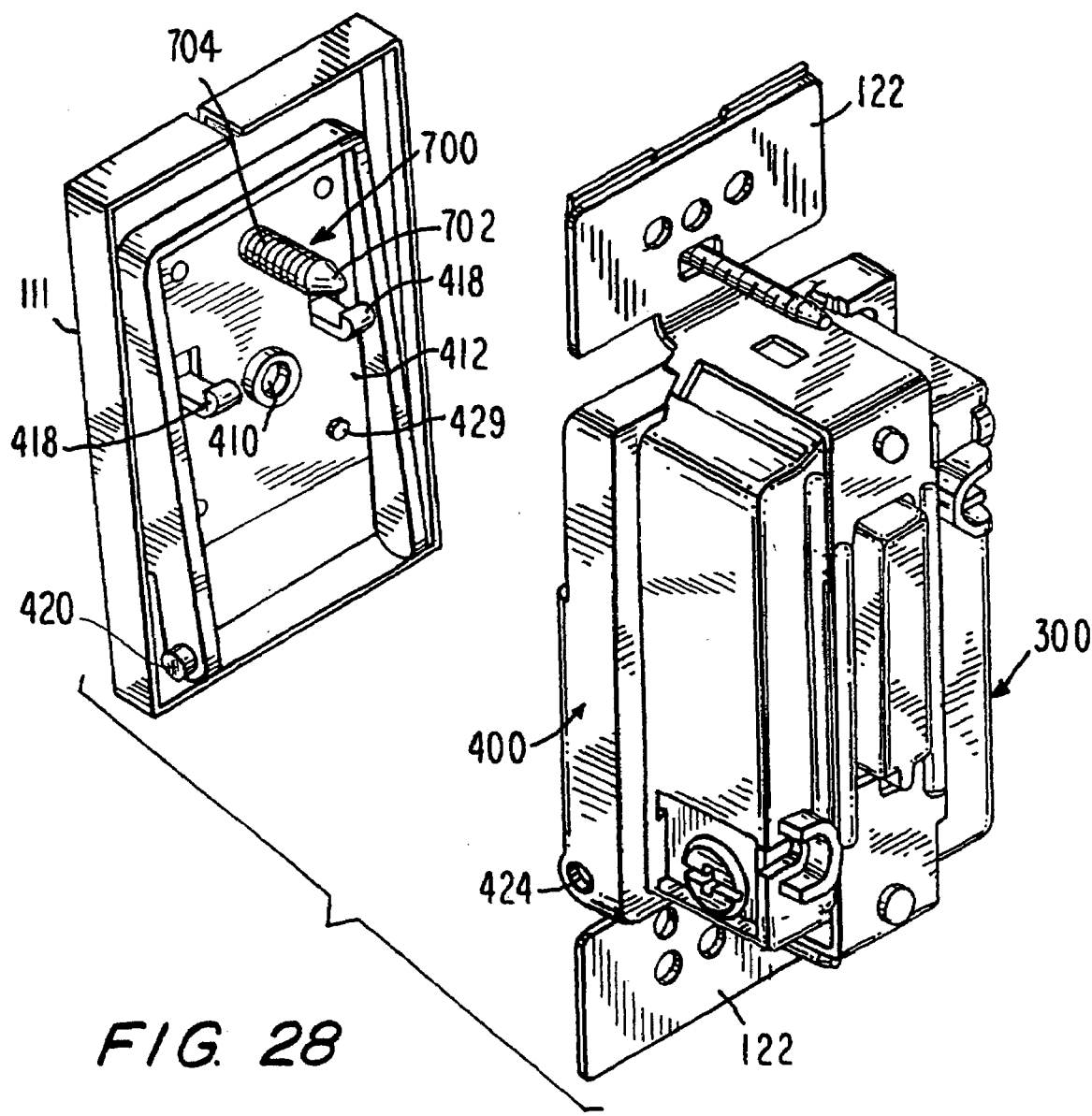
FIG. 28 is a perspective exploded view of the switch having still another cam driver.
Figure 29:
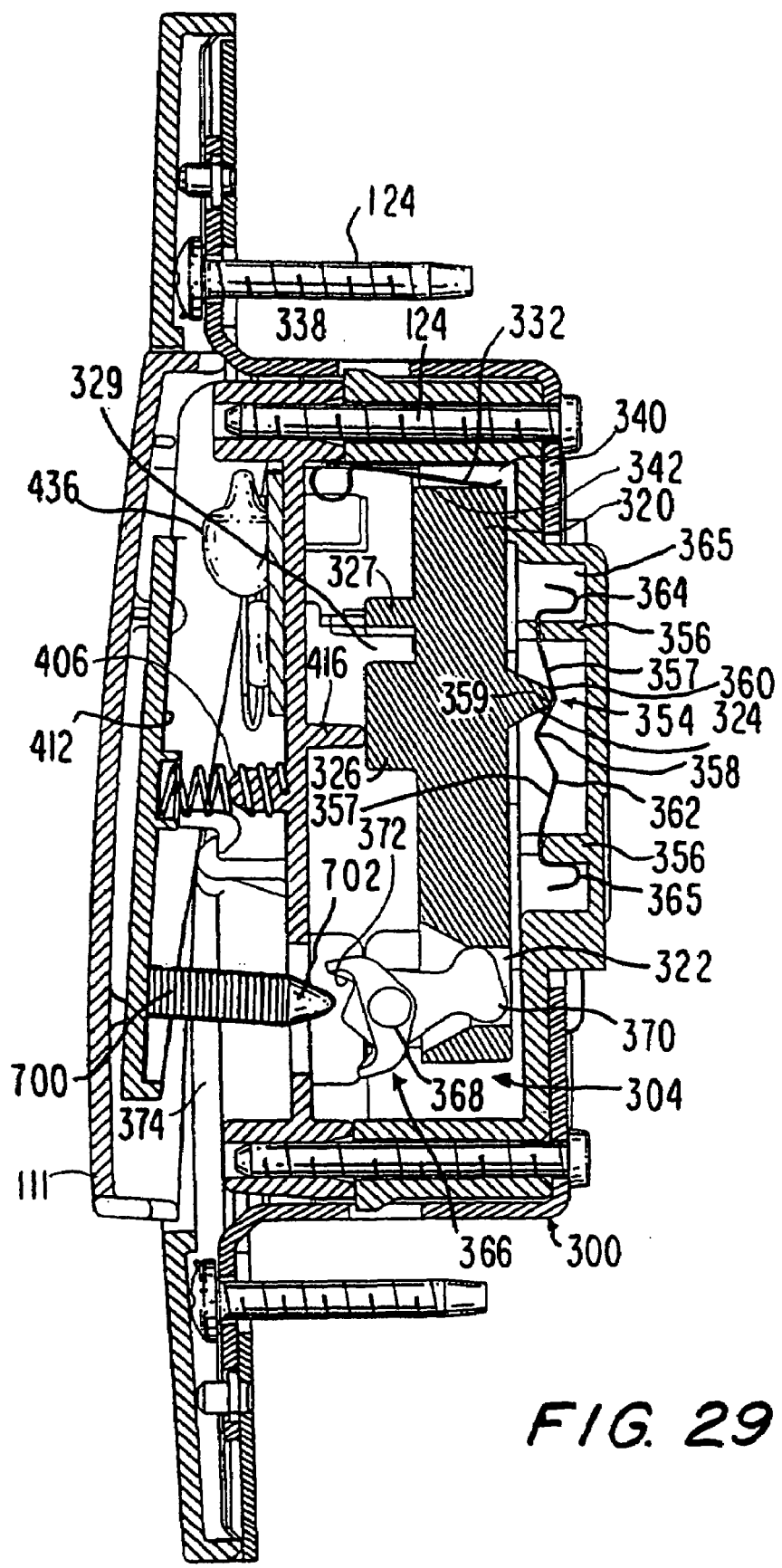
FIG. 29 is a sectional view along the line 24—24 of FIG. 3 where the cam driver is that shown in FIG. 28.

Referring to FIG. 28, there is shown an exploded view of the switch with still another cam driver embodiment, and FIG. 29, is a sectional view along line 24—24 of FIG. 3 where the cam driver is that of FIG. 28. In this embodiment, the cam driver 431 shown in FIG. 19 is replaced with a semi-flexible cam driver having a sharp end 700. Semi-flexible cam driver with sharp end 700 is composed of a closely wound helical spring 701 of, for example, piano wire coupled at one end to a tip 702 which has a front end having a conical shape and a back end having a cylindrical shape. The tip 702 can be of plastic, metal or the like. The outside diameter of the cylinder is slightly larger than the inside diameter of the spring 701 to enable it to be securely held by the spring 701 when inserted into the end of the spring, and is smaller than the diameter of the base of the conical shaped end to provide a shoulder which prevents the tip 702 from being pushed into spring 701. In this embodiment, subplate 412 does not have a cutout 441, but is continuous to provide support for the cam driver 700. Subplate 412 has a small cylindrical shaped projection which extends out from the bottom of the subplate and has a diameter that fits snugly into and securely holds the top end of the closely wound spring 701. The closely wound spring 701 is attached to the subplate by being pushed onto the projection on the subplate. The tip of the conical shaped end 702 has a small diameter which allows it to fit into pockets 372 and 374 of cam 366. In this embodiment, the spring 408 is used to urge the paddle to its "up" at rest position. Except for the substitution of the cam driver 700 with conical end for the cam driver 431 disclosed in FIG. 19, and the absence of the cutout 433 on subplate 412, the construction and operation of the switch of the embodiment disclosed in FIGS. 28 and 29 is similar to that of the switch disclosed in FIGS. 14–24.

Figure 30:
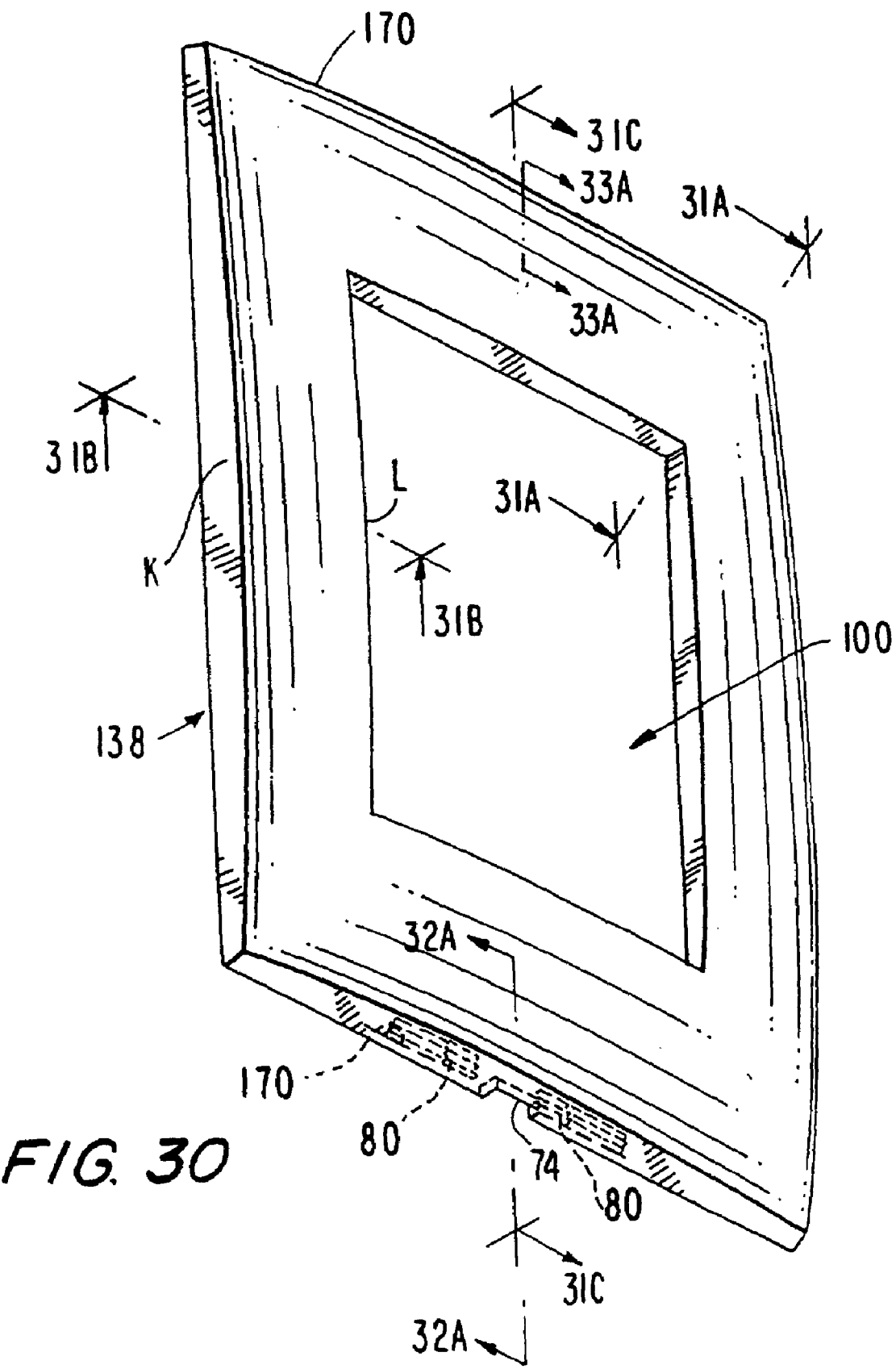
FIG. 30 is a front perspective view of a wall plate according to the present invention for accommodating a single wiring device.

FIG. 30 is a front perspective view of a wall plate for a single wiring device such as a switch or a receptacle. The width of the face of the wiring device is approximately 55% of the width of the wall plate along the horizontal axis and approximately 56% of the length of the wall plate along the vertical axis. When the wiring device is a receptacle, the contour along the width of the receptacle face is substantially flat in one plane and is complex along the length of the face of the receptacle with a substantially constant radius that is greater than 10 inches and less than 40 inches, a preferred radius being substantially 30.724 inches. The shape of the receptacle face is different from that of the switch to allow for the proper seating of an inserted plug. When the wiring device is a switch, its face has a vertical axis along its length and a horizontal axis along its width where the face of the rocker paddle along its vertical axis has a shape of positive first differential comprised of a combination of splines drawn between points of varying distances from a datum plane and zero second differential when the rate of height increase of the individual splines is constant. The horizontal axis has a surface of a positive first differential and negative second differential comprised of a combination of splines drawn between points of varying distance from a datum plane. The wall plate has a surface configuration which allows it to be placed around a switch or a receptacle, or both a switch and a receptacle placed side by side, and which blends with the wiring device, or wiring devices, even thou the surface configuration of the switch is different than that of the receptacle. Referring to FIG. 30, the wall plate is substantially 4.92 inches in length by 3.28 inches in width and has a single opening 100. When the wall plate of FIG. 30 is for more than a single wiring device, the opening 100 has no dividing members for receiving multiple wiring devices, either a switch which has no frame or a receptacle, or any combination of switches and receptacles. When the wall plate is for one wiring device, the dimensions of the wiring device is slightly less than 2.81 inches in length by 1.83 inches in width to fit within the opening 100. The width of the wall plate varies depending upon the number of wiring devices ganged together in side-by-side relationship. The front surface of the wall plate here disclosed has a complex/compound shape such that the surface at the opening for the wiring device is further from the wall than it is at the outer edge of the wall plate.

Figure 31A:
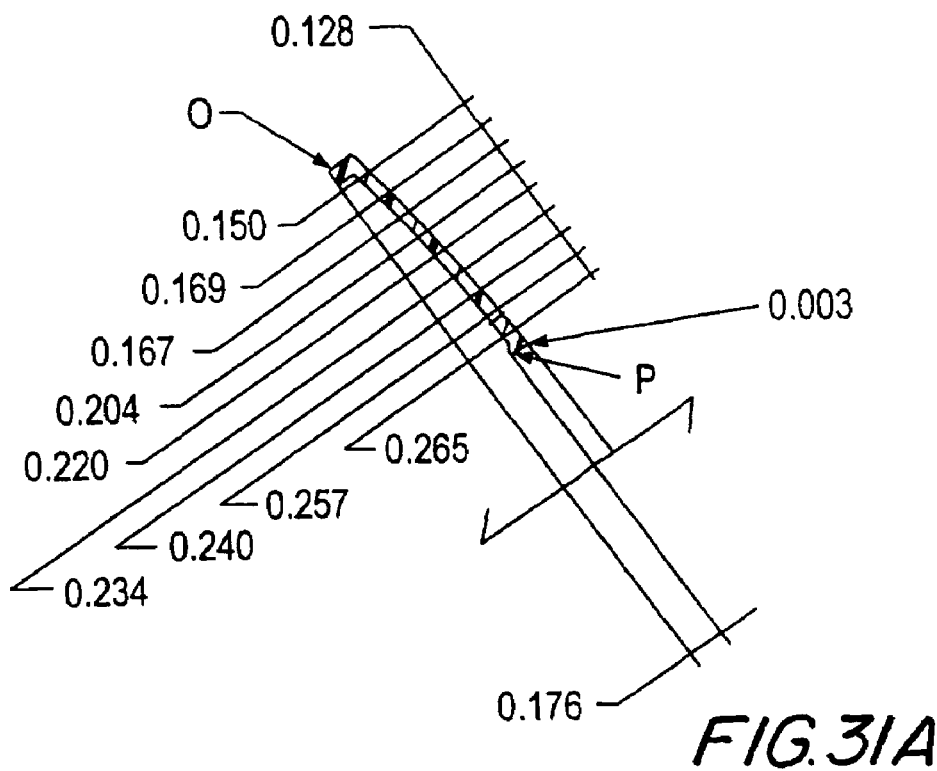
FIGS. 31A–31C are sectional views taken along the lines 31A—31A, 31B—31B and 31C—31C of the wall plate of FIG. 30.
Figure 31B:
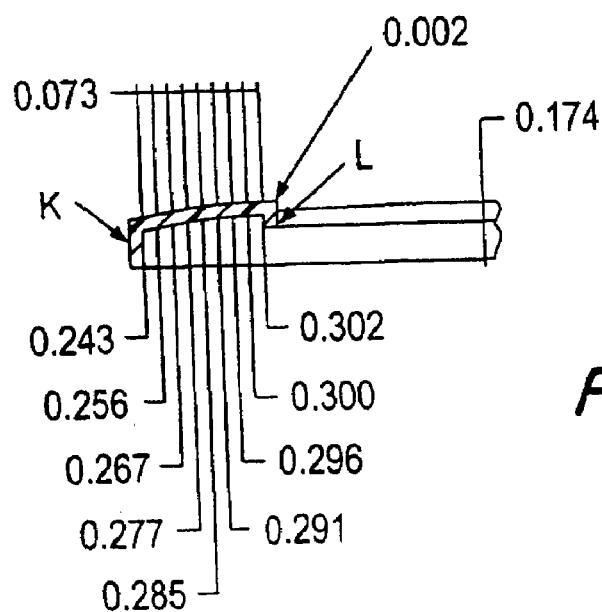
Figure 31C:
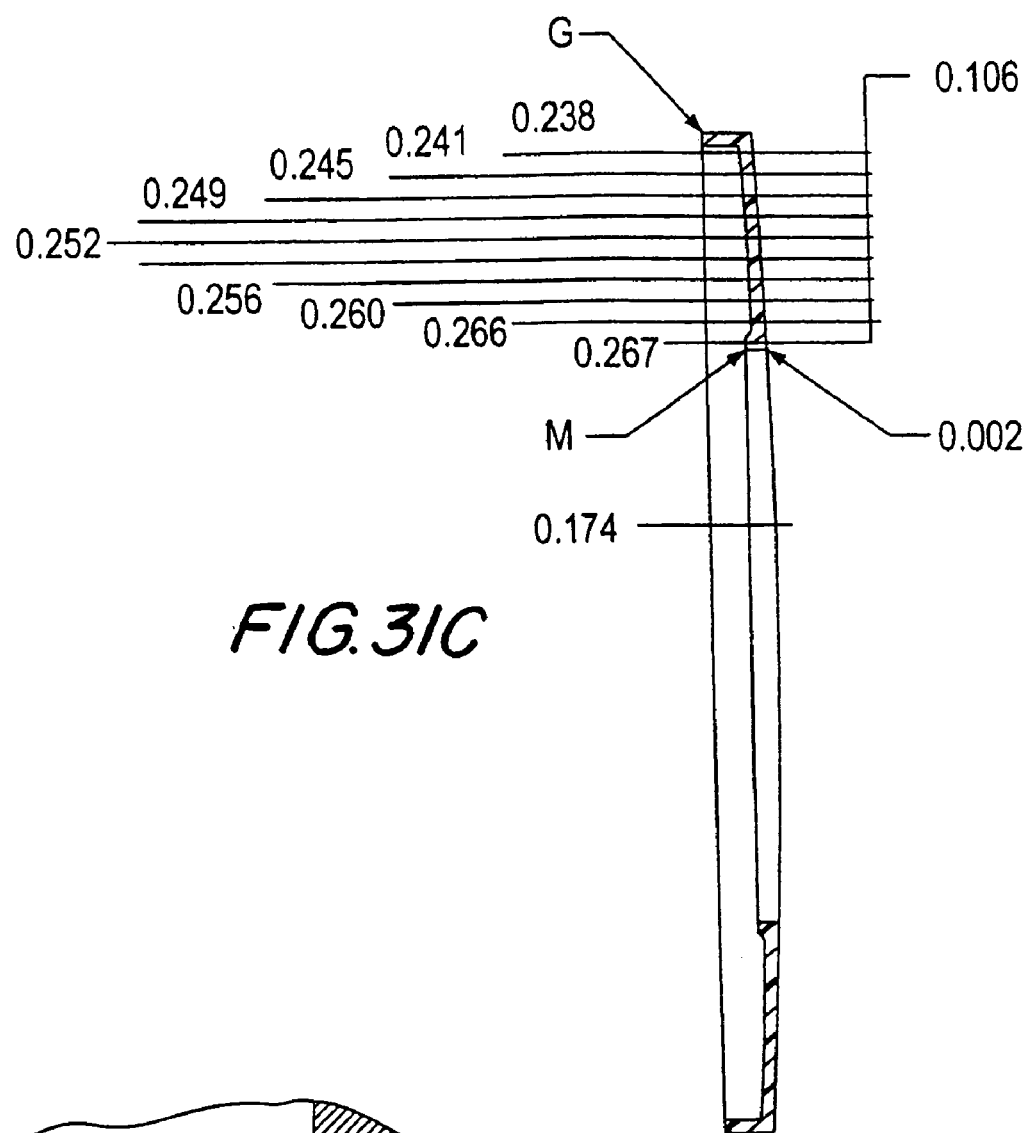

Referring to FIG. 31B which is a sectional view along the line 31B—31B of the wall plate of FIG. 30 along the horizontal centerline, from point K, the outer left edge, to point L, the inner edge of the opening for the wiring device. As shown in FIG. 31B, the surface lies between two profile boundaries substantially 0.002 inches apart, perpendicular to a datum plane, equally disposed about the true profile and positioned with respect to the datum plane. The basic dimensions of the profile establishes a tolerance zone which controls the shape and size of the surface. The surface is substantially 0.73 inches in width. Within this width, a shape is defined by the dimensions of ten equidistant points, more or less, which are approximately 0.073 inches apart. Each dimension indicates that point's distance to the datum plane, the back (flat) surface of the wall plate, which begins at point K. Moving from left to right, the dimensions increase from about 0.243 inches to about 0.302 inches. This progression defines a surface of increasing height, positive first differential, when the points are connected by individual splines. The points are not connected by a single arc and the rate at which the surface height increases is not constant. The rate of height increase of the individual splines decreases from left to right, and the second differential of the shape is negative. That is, the difference between the first and second point's distance dimension is larger than the difference between the second and the third, etc. Thus, the surface has a contour of positive first differential and negative second differential, comprised of a combination of splines drawn between points of varying distance from the datum plane. FIG. 31A is a sectional view along the line 31A—31A of FIG. 30; and FIG. 31C is a sectional view along the line 31C—31C of FIG. 30. FIGS. 31A; 31B and 31C show the wall plate for sections along lines 31A—31A, 31B—31B and 31C—31C of FIG. 30.

The section along line 31C—31C of FIG. 30 (see FIG. 31C), which runs along the vertical centerline of the wall plate defines a surface contour having a positive first differential and zero second differential, comprised of a combination of splines drawn between points of varying distance from a datum plane. The difference between any two sequential point dimensions is substantially 0.0037 inches and this surface has a zero second differential because the rate of height increase of the individual splines is constant.

Figure 32:
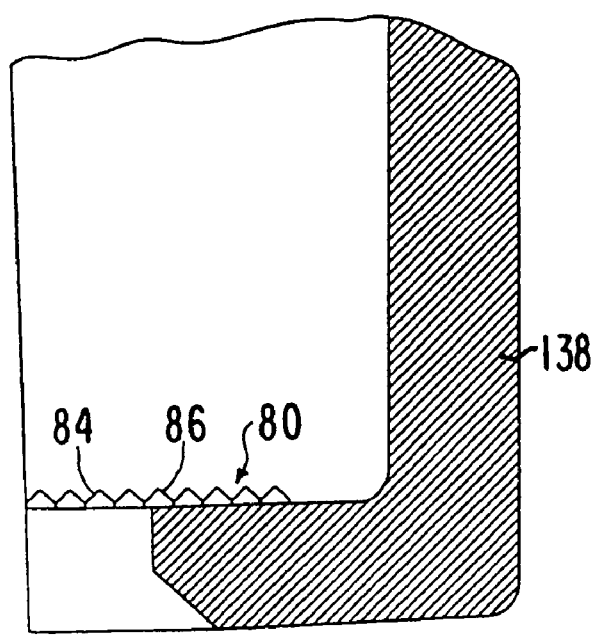
FIG. 32 is a sectional view of the bottom edge of the wall plate of FIG. 30 along the line 32A—32A.
Figure 33:
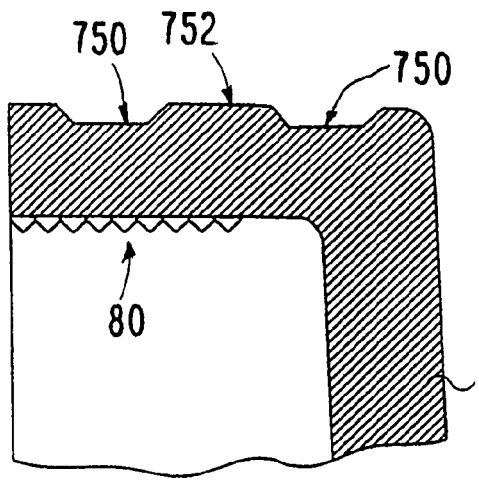
FIG. 33 is a sectional view of the top edge of the wall plate of FIG. 30 along the line 33A—33A.
Figure 34:
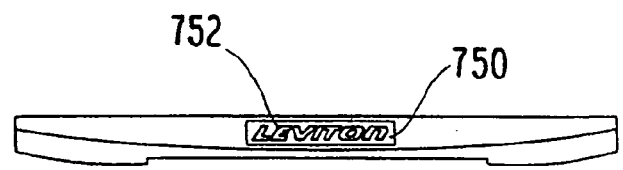
FIGS. 34, 34A are views of the top edge of the wall plate of FIG. 30.
Figure 34A:
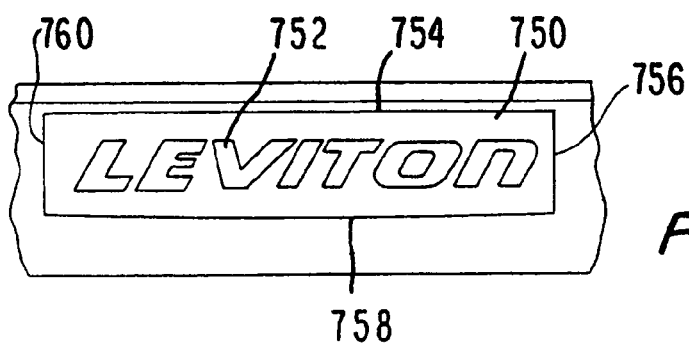

The wall plate 138 for a single wiring device shown in FIG. 30 includes, along the inside top edge, and the inside bottom edge, tooth shaped racks 80 for engagement with latching pawls 140 on the end 147 of the multi-function clips 130, 151. FIG. 32 is a sectional view of the bottom edge of the wall plate 138 along the line 32A—32A of FIG. 30; and FIG. 33 which is a sectional view of the top edge of the wall plate 138 along the line 33A—33A of FIG. 30. The top outside edge of the wall plate (see FIG. 33), has a recessed area 750 such as a channel having centrally located raised identifying nomenclature structure 752 such as letters of the alphabet, numbers and/or a symbol which can, for example, identify the manufacturer of the device. FIGS. 34, 34A show views of a portion of the top edge of the wall plate of FIG. 30 showing the channel and identifying nomenclature structure.

As shown in FIGS. 34 and 34A a channel 750 is in the top outside edge of the wall plate 138. The channel can be approximately three-quarters of an inch in length and have a width which is less than the width of the edge of the wall plate. As shown in FIGS. 33, 34 and 34A, channel 750 is a rectangular depression defined by four walls 754, 756, 758 and 760. Located within the channel is raised identifying structure 752 such as the name of the manufacturer, i.e., "LEVITON". The height of the raised identifying structure can be 0.010 of an inch where the top surface of the raised identifying structure is substantially flush with the surface of the top edge of the wall plate.

When the wiring device is a switch as is here shown, the surface of the rocker paddle of the switch is a continuation of contours of the wall plate, so that the surface of the wall plate complements the surface of the switch. When the wiring device is a receptacle, the contour along the width of the receptacle face is substantially flat in one plane and is complex along the length of the face of the receptacle with a substantially constant radius. The shape of the receptacle face is different from that of the switch to allow for the proper seating of an inserted plug. But, again, when the wiring device is a receptacle as is here shown, the surface of the wall plate complements the surface of the receptacle. The wall plate has no exposed mounting screws or other visible metal hardware. When the wall plate is placed around a wiring device, the only visible parts are the wall plate 138 and the wiring device, the switch or receptacle. No fastening means such as screws, etc. for holding the wall plate in place are visible.

Figure 35:
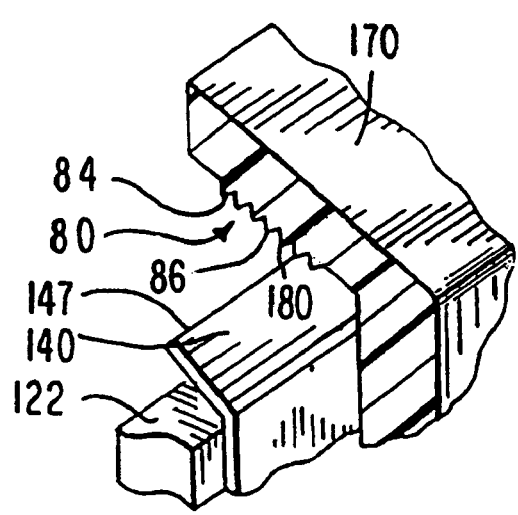
FIG. 35 is a fragmentary, enlarged perspective of the pawl of the multi-function clip engaging the tooth shaped rack of the wall plate.

To attach the wall plate 138 to a wiring device, the edges 147 of pawls 140 of the bottom and top multi-function clips 130, 151 engage tooth shaped racks 80 located on the inside surfaces of the top and bottom end walls 170 of wall plate 138. There are two tooth shaped racks 80 on the inside edge of each end wall 170 of the wall plate 138. Each tooth shaped rack 80 contains a number of teeth each having an inclined front face 84 and an inclined back face 86. Referring to FIG. 35, there is shown a fragmentary, enlarged perspective of the end 147 of the latching pawl 144 of the multi-function clip engaging the tooth shaped rack 80 of the wall plate 138. When attaching a wall plate to a wiring device, the wall plate is placed over the wiring device and pushed in toward the wall. As the wall plate moves toward the wall, the end 147 of latching pawl 140 of the multi-function clip engages the inclined front face 84 of a tooth, and the pawl 140 deflects as it moves past the tip of the first tooth. Once the end of the latching pawl 140 is past the tip of the first tooth, it returns to its initial position and takes a position between the inclined back face 86 of the tooth and the inclined front face of the next tooth. This operation is repeated as many times as is needed to position the top and bottom of wall plate 138 as close to the wall as possible. As tooth shaped racks 80 and pawls 140 at the top and bottom are independently operated, it is possible to position the wall plate 138 to closely follow the contour of the wall, even when the wall is not flat. This ability to follow the wall contour is appreciated when the wall plate 138 is large, such as a wall plate positioned around multiple wiring devices.

Figure 36:
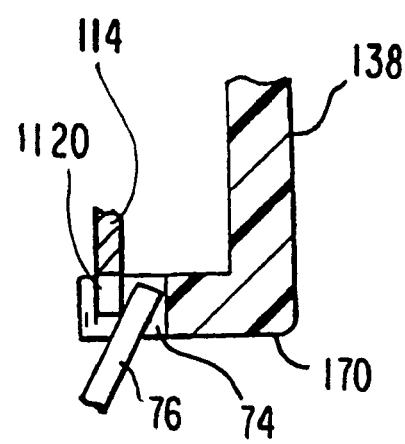
FIG. 36 is a fragmentary, enlarged sectional side view of the wall plate and tab of the alignment plate to indicate how the two components can be separated following latching.

Referring to FIG. 36, there is shown a fragmentary, enlarged sectional side view of the wall plate 138 and tab 120 of the alignment plate 14 to indicate how the two components can be separated following latching. Once the ends of latching pawl 140 are positioned in a valley between two teeth, it becomes difficult to dislodge the wall plate 138 from the wiring device(s) and the wall. To help in the removal of the wall plate, a slot 74 is formed in the bottom end 170 of wall plate 138 to provide access to tab 120. A small, flat tool blade such as a screw driver blade 76, or the like, can be moved through slot 74 in end 170 to contact both the outer surface of tab 120 and the back wall of slot 74. By moving the blade 76 using the back wall of slot 74 as a fulcrum, the force applied to tab 120 will separate wall plate 138 from the wiring device and the wall. As tool 76 can apply a great deal of force to tab 120, it is possible to separate the pawl 140 from engagement with the tooth shaped racks 80 and thus the wall plate from the wiring device and the wall.

Figure 37:
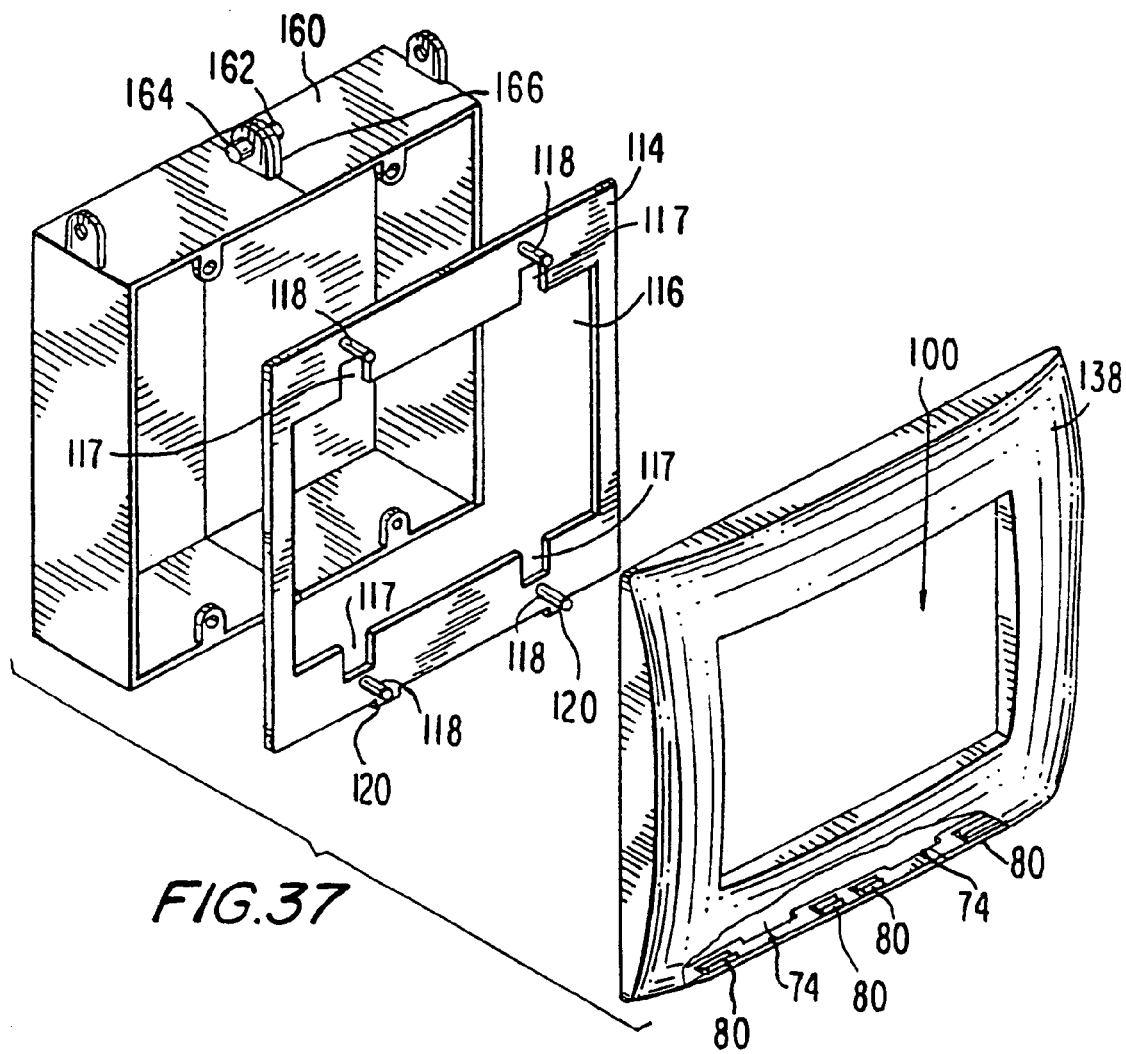
FIG. 37 is an exploded perspective view of a box, alignment plate and wall plate capable of accommodating two wiring devices, according to the present invention.

Referring to FIG. 37, there is shown an exploded view of a box, an alignment plate and a wall plate for two wiring devices. There is no partition or dividing member located in either the wall plate opening 100 or the alignment plate opening 116 to separate the two wiring devices from each other. The two wiring devices can be placed in a double ganged box 160 made up, for example, of two single boxes joined by fasteners 162 extending through the threaded apertures 164 of two joining ears 166. Alignment plate 114 has a single opening 116, four openings 117 and four alignment pins 118 for receiving the two wiring devices such as two switches, a receptacle and a switch, or two receptacles.

Wall plate 138 can have four tooth shaped racks 80 on the inside surface of the top and bottom end walls for receiving four latching pawls where the two center tooth shaped racks receive one pawl from each wiring device. Also, the alignment plate has two tabs 120, which are accessible via slots 74 in the bottom end wall of wall plate 138. The independent operation of the pawls 140 with their respective racks 80 allows the wall plate 138 to compensate somewhat for lack of flatness of a wall in which the wiring devices are installed.

Figure 38:
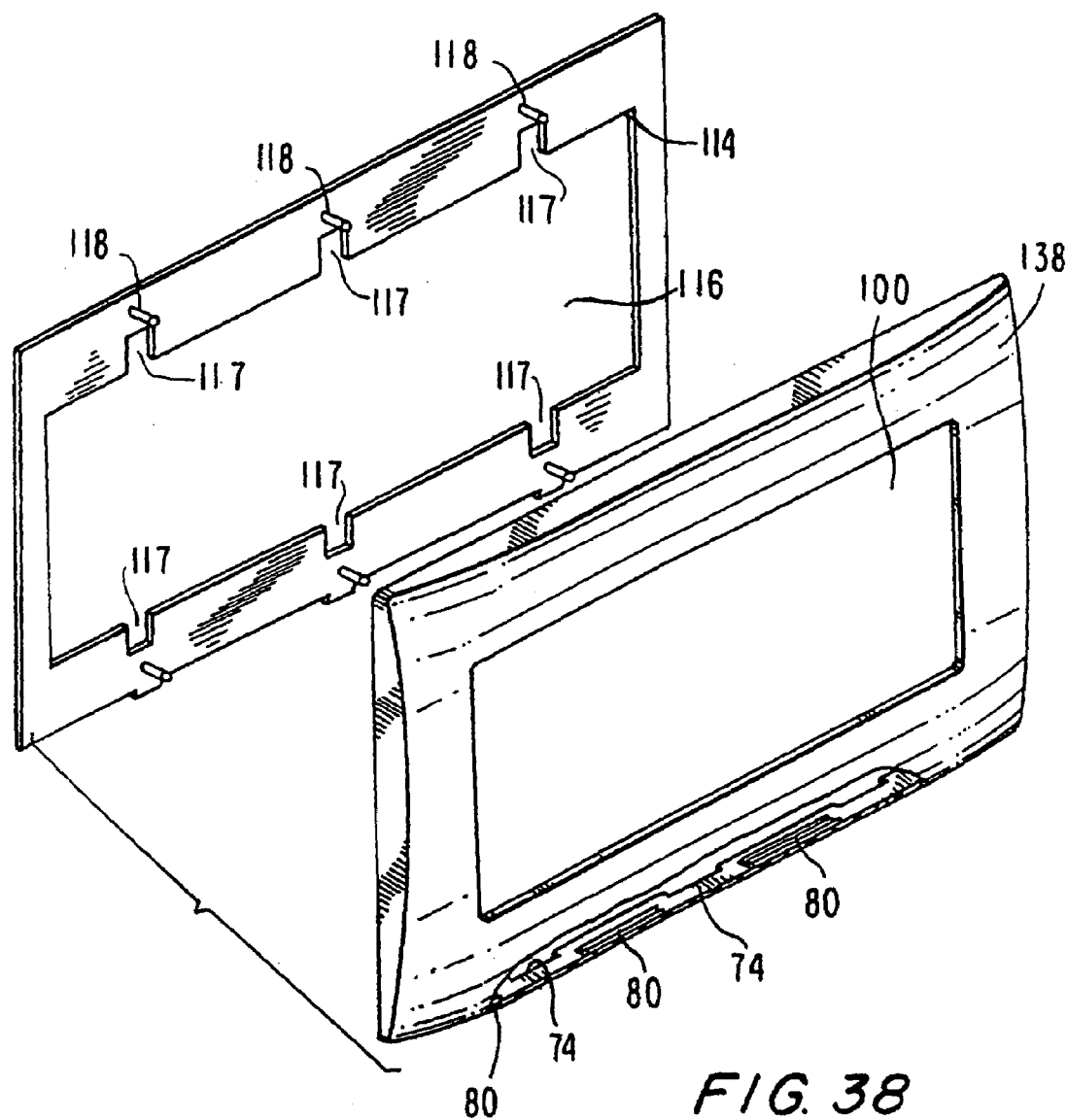
FIG. 38 is an exploded view of alignment plate and wall plate capable of accommodating three wiring devices.

Referring to FIG. 38, there is shown an exploded view of alignment plate 114 having a single opening 116 and a wall plate 138 for three wiring devices ganged together and mounted in three boxes (not illustrated). Wall plate 138 has a single opening 100 with no dividing or separating members for receiving three wiring devices positioned side by side and has three sets of tooth shaped racks 80 (one set for each wiring device) on the inside surface of the top and bottom end walls. The two end racks each receive a single latching pawl and the center racks receive two latching pawls. Alignment plate 114 has a single opening 116 with no dividing or separating members, three sets of openings 117 and three sets of alignment pins 118 for receiving three wiring devices.

Figure 39:
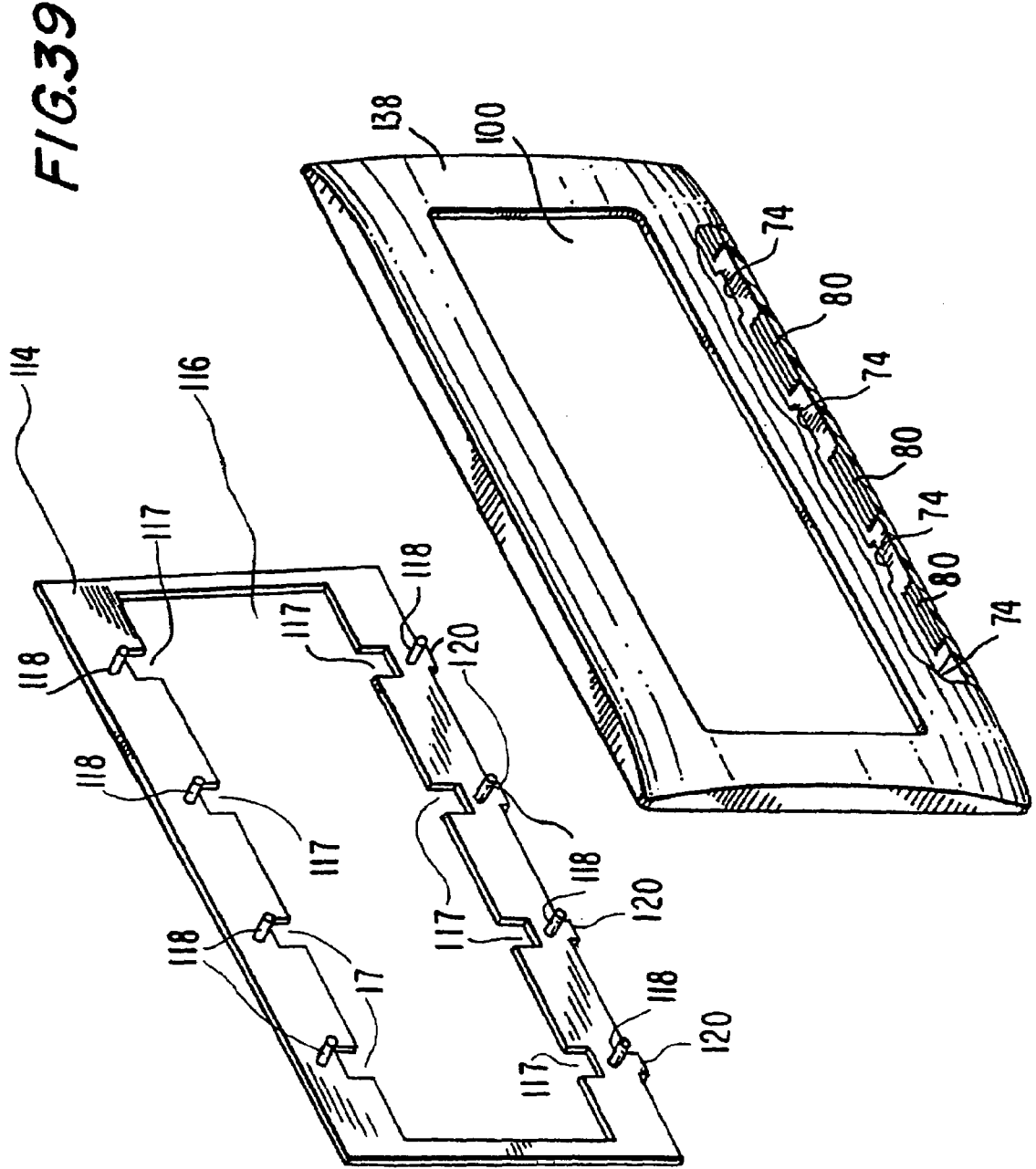
FIG. 39 is an exploded view of alignment plate and wall plate capable of accommodating four wiring devices.

Referring to FIG. 39, there is shown an exploded view of attachment plate 114 having a single opening 116 with no dividing or separating members for receiving four wiring devices and wall plate 138 for four wiring devices which are to be ganged together. Wall plate 138 has a single opening 100 with no dividing or separating members for receiving four wiring devices positioned side by side and the attachment plate 114 has a single opening 116 with no dividing or separating members for receiving four wiring devices positioned side by side, and four sets of openings 117 and four sets of alignment pins 118. The wall plate has four sets of tooth shaped racks 80 (one set for each wiring device) on the inside surface of the top and bottom end walls.

Figure 40:
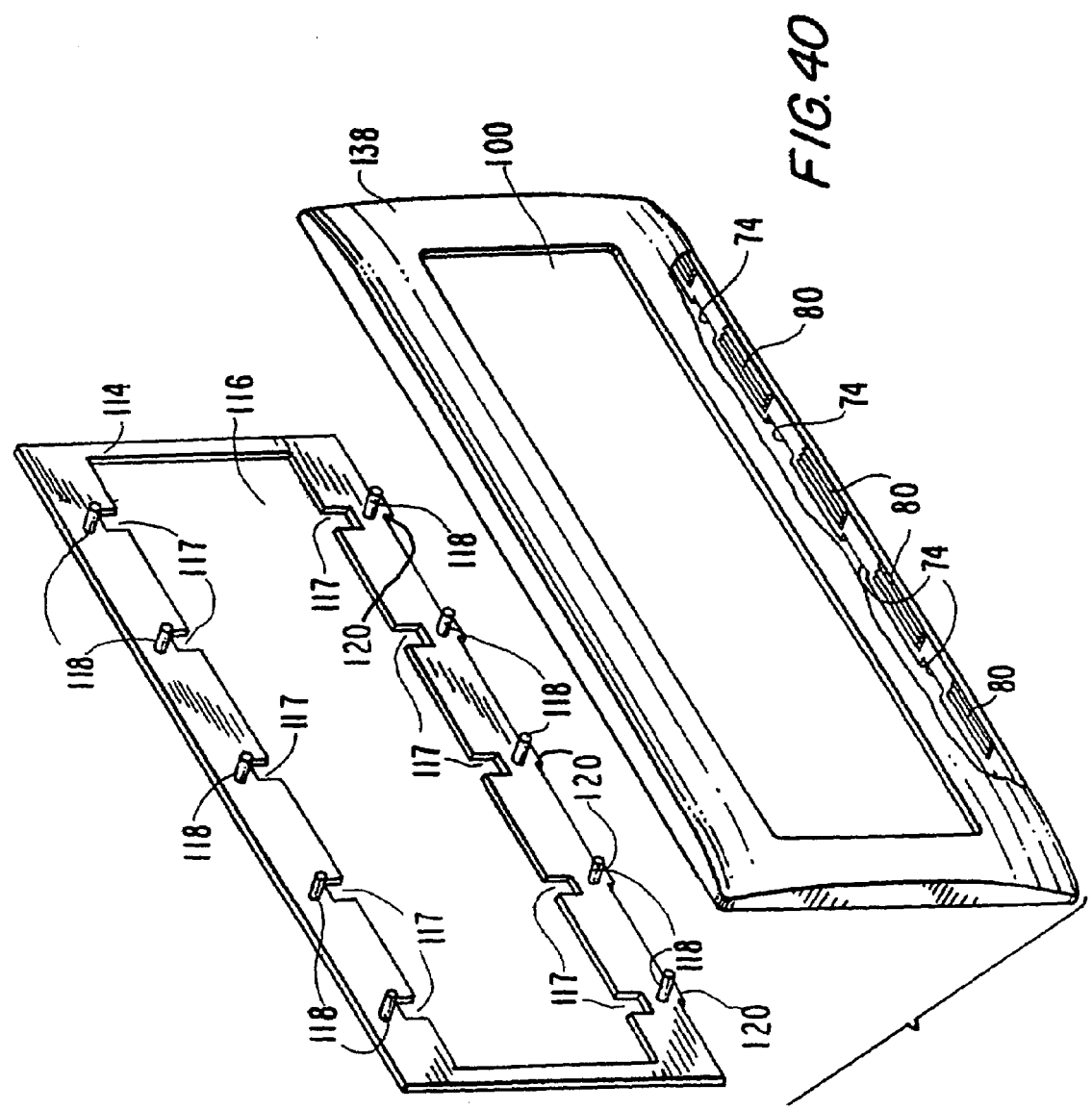
FIG. 40 is an exploded view of alignment plate and wall plate capable of accommodating five wiring devices.

Referring to FIG. 40, there is an exploded view of alignment plate 114 having a single opening 116 with no dividing or separating members for receiving five wiring devices and wall plate 138 for five wiring devices which are to be ganged together. Wall plate 138 has a single opening 100 with no dividing or separating members for receiving five wiring devices positioned side by side and the alignment plate 114 has a single opening 116 with no dividing or separating members for receiving five wiring devices positioned side by side, and five sets of openings 117 and five sets of alignment pins 118. The wall plate 138 has five sets of tooth shaped racks 80 (one set for each wiring device) on the inside surface of the top and bottom end walls.

Figure 41:
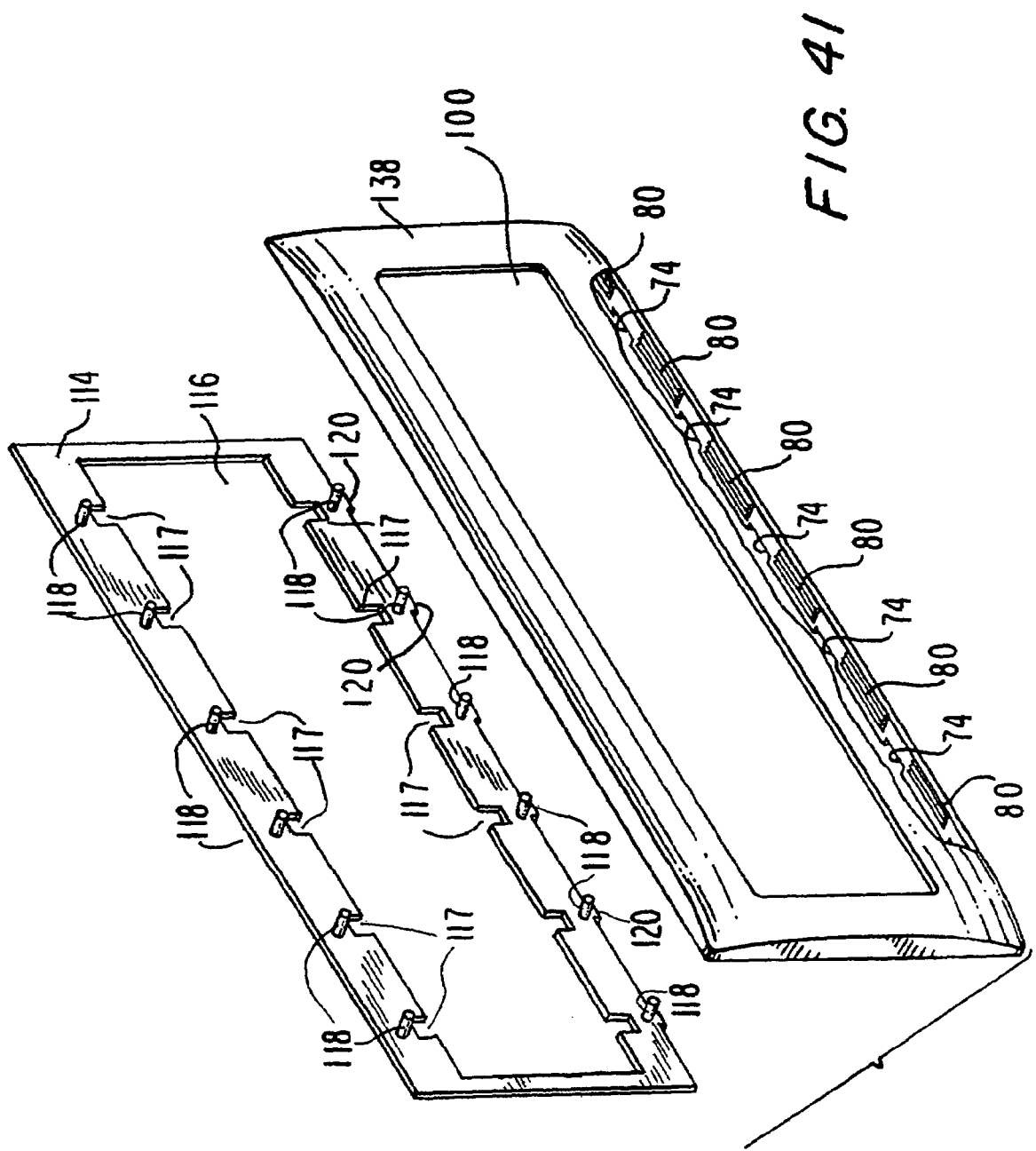
FIG. 41 is an exploded view of alignment plate and wall plate capable of accommodating six wiring devices.

Referring to FIG. 41, there is shown an exploded view of alignment plate 114 having a single opening 116 with no dividing or separating members for receiving six wiring devices and wall plate 138 for six wiring devices which are to be ganged together. Wall plate 138 has a single opening 100 with no dividing or separating members for receiving six wiring devices positioned side by side and the alignment plate 114 has a single opening 116 with no dividing or separating members for receiving six wiring devices positioned side by side, and six sets of openings 117 and six sets of alignment pins 118. The wall plate has six sets of tooth shaped racks 80 (one set for each wiring device) on the inside surface of the top and bottom end walls.

Each wall plate shown in the Figs. can be made of conductive material or of non-conductive material. Where the wall plate is made of non-conductive material such as plastic, a conductive coating can be sprayed, plated, etc. to the front, back or both the front and back surfaces of the wall plate to provide a conductive path from the wall plate to ground on the ground/mounting strap and/or the box through a conductive path. The conductive path can be from the wall plate, through the latching pawls 140 of the multi-function clips 130, 151, the alignment pins 118 on the alignment plate contacting the multi-function clips, and the threaded fasteners contacting the multi-function clips and the box; or it can be through the latching pawls 140 of the multi-function clips and the threaded fasteners contacting the multi-function clips to the ground terminal on the ground/mounting strap and/or the ground connected to the box.

The present invention contemplates a system wherein multiple electrical wiring devices in numbers not expressly set forth hereinabove may be utilized, without departing from the spirit or lawful scope of the invention.

While there have been shown and described and pointed out the fundamental novel features of the invention as applied to the preferred embodiments, it will be understood that various omissions and substitutions and changes of the form and details of the devices illustrated and in their operation may be made by those skilled in the art without departing from the spirit of the invention.

What is claimed is:

1. A wall plate and a wiring device, in combination, adapted for mutually co-acting to be in captive engagement wherein the wall plate comprises:

a frame having a vertical axis along its length, a horizontal axis along its width, a front surface, a back surface, a top edge having an inside wall, a bottom edge having an inside wall, and an opening which extends through said frame from said front to said back surfaces for receiving at least one wiring device, wherein the bottom of the circumferential edges of said frame to define a substantially flat datum plane for placement on a substantially flat wall, and said front surface of said frame is spaced from said substantially flat datum plane to provide said frame having a progressively thinner profile from the edge of the opening for the at least one wiring device to the circumferential edges of the frame along its vertical axis and its horizontal axis;

a first tooth shaped rack on the inside wall of the top edge of said frame to engage a first clip coupled to said wiring device; and a second tooth shaped rack on the inside wall of the bottom edge of said frame to engage a second clip coupled to said wiring device; and wherein the wiring device comprises:

a ground/mounting strap having first and second outwardly projecting ends;

said first clip having a bent end attached to the first outwardly projecting end of the ground/mounting strap wherein the bent end of the first clip extends beyond the first end of the strap; and said second clip having a bent end attached to the second outwardly projecting end of the ground/mounting strap wherein the bent end of the second clip extends beyond the second end of the strap;

wherein:

the first and second tooth shaped racks on the inside wall of the top and bottom edges of the frame is adapted to mutually co-act with and engage the bent ends on the first and second clips on the first and second ends of the ground/mounting strap to securely hold the frame and wiring device to each other in captive engagement.

2. The wall plate of claim 1 wherein the distance between said front surface and said substantially flat datum plane changes at a rate which is not constant.

3. The wall plate of claim 2 wherein a section along the vertical axis of the frame has a surface of positive first differential comprised of a combination of splines drawn between points of varying distance from said datum plane.

4. The wall plate of claim 3 wherein the section along the vertical axis of the frame has a surface of zero second differential comprised of splines drawn between points of varying distance from said datum plane when the rate of increase of the individual splines is constant.

5. The wall plate of claim 2 wherein a section along the horizontal axis from the circumferential edge of the frame to the edge of said opening for receiving at least one wiring device has a surface of a positive first differential and negative second differential, comprised of a combination of splines drawn between points of varying distance from the datum plane.

6. The wall plate of claim 2 wherein a section along the vertical axis of the frame has a front surface of positive first differential, comprised of splines drawn between points of varying distance from said datum plane, and a section along the horizontal axis from the circumferential edge of the frame to the opening for receiving the at least one wiring device.

7. The wall plate of claim 6 wherein the section along the horizontal axis from the circumferential edge of the frame to the edge of the opening for receiving the at least one wiring device has a front surface of negative second differential, comprised of a combination of splines drawn between points of varying distance from the datum plane.

8. The wall plate of claim 7 wherein the section along the vertical axis of the frame has a front surface of zero second differential comprised of splines drawn between points of varying distance from the datum plane when the rate of increase of the individual splines is constant.

* * * * *